United States Patent [19]
Takahashi et al.

[11] Patent Number: 5,999,877
[45] Date of Patent: Dec. 7, 1999

[54] TRAFFIC FLOW MONITOR APPARATUS

[75] Inventors: Kazuya Takahashi, Hitachi; Tadaaki Kitamura, Nishiibaraki-gun; Yoshiyuki Satoh, Hitachi, all of Japan

[73] Assignee: Hitachi, Ltd., Tokyo, Japan

[21] Appl. No.: 08/841,402

[22] Filed: Apr. 30, 1997

[30] Foreign Application Priority Data

| May 15, 1996 | [JP] | Japan | 8-119911 |
| Sep. 26, 1996 | [JP] | Japan | 8-254546 |
| Mar. 28, 1997 | [JP] | Japan | 9-077301 |

[51] Int. Cl.$^6$ .............................. G08G 1/09; G06K 9/00
[52] U.S. Cl. .................... 701/117; 340/905; 340/995; 340/942; 340/916; 364/438; 364/436; 348/149
[58] Field of Search ........................ 701/117; 340/905, 340/916, 942, 995; 364/438, 436; 348/149

[56] References Cited

U.S. PATENT DOCUMENTS

| 4,847,772 | 7/1989 | Michalopoulos et al. | 364/436 |
| 5,313,295 | 5/1994 | Taniguchi et al. | 348/149 |
| 5,396,283 | 3/1995 | Taniguchi et al. | 348/149 |
| 5,509,082 | 4/1996 | Toyama et al. | 382/104 |
| 5,590,217 | 12/1996 | Toyama | 382/104 |
| 5,598,338 | 1/1997 | Taniguchi et al. | 701/117 |
| 5,638,116 | 6/1997 | Shimoura et al. | 348/118 |
| 5,699,056 | 12/1997 | Yoshida | 340/905 |
| 5,739,848 | 4/1998 | Shimoura et al. | 348/119 |
| 5,847,755 | 12/1998 | Wixson et al. | 348/149 |

FOREIGN PATENT DOCUMENTS

| 0567059A1 | 4/1993 | European Pat. Off. . |
| 0 567 059 | 10/1993 | European Pat. Off. . |
| 43 00 650 | 7/1994 | Germany . |
| 2-166598 | 6/1990 | Japan . |
| 5-298591 | 11/1993 | Japan . |
| 5-298594 | 11/1993 | Japan . |
| 6-030417 | 2/1994 | Japan . |
| 7-210795 | 8/1995 | Japan . |
| 6-324179 | 11/1996 | Japan . |
| WO88/06326 | 8/1988 | WIPO . |

OTHER PUBLICATIONS

A Study of length of queue measurement algorithm using Image Processing (General Meeting of Institute of Electronics and Communication Engineering of Japan; D–423, p. 149, 1995; Hisanori Yokosuka et al.

*Primary Examiner*—William A. Cuchlinski, Jr.
*Assistant Examiner*—Olga Hernandez
*Attorney, Agent, or Firm*—Kenyon & Kenyon

[57] ABSTRACT

A traffic flow monitor apparatus which can monitor a traffic flow at high precision over a wide range from the position near a TV camera to the distant position regardless of traffic conditions. An image analysis area crossing a road of an overlooked road image received every predetermined cycle is analyzed, the characteristic portion of the front (rear) portion of the vehicle is registered as a template, the vehicle is tracked by a pattern-matching process while updating the template, and the size of the template is reduced (enlarge) depending on a change in apparent width of a lane during template updating. Since the characteristic portion of the front (rear) portion of the vehicle is registered, and the vehicle is tracked by the pattern-matching process, no reference image of a road portion on which no vehicle exists is required, and influence of approaching or overlapping of another vehicle can be reduced. A traffic flow can be monitored at high precision regardless of deserted traffic or crowded traffic. Since the size is reduced (enlarged) during template updating, a vehicle can be stably tracked by using a template having an appropriate size in the range from the near position to the distant position.

35 Claims, 33 Drawing Sheets

FIG.4

| INDEX 1 | INDEX 2 | INDEX N |
|---|---|---|
| TRACKING STATE FLAG | TRACKING STATE FLAG | TRACKING STATE FLAG |
| IN-TRACKING FLAG | IN-TRACKING FLAG | IN-TRACKING FLAG |
| INITIAL REGISTRATION TIME | INITIAL REGISTRATION TIME | INITIAL REGISTRATION TIME |
| INITIAL REGISTRATION COORDINATES | INITIAL REGISTRATION COORDINATES | INITIAL REGISTRATION COORDINATES |
| LATEST IMAGE INPUT TIME | LATEST IMAGE INPUT TIME | LATEST IMAGE INPUT TIME |
| IMAGE INPUT TIME 1 CYCLE BEFORE | IMAGE INPUT TIME 1 CYCLE BEFORE | IMAGE INPUT TIME 1 CYCLE BEFORE |
| ⋮ | ⋮ | ⋮ |
| IMAGE INPUT TIME p CYCLES BEFORE | IMAGE INPUT TIME p CYCLES BEFORE | IMAGE INPUT TIME p CYCLES BEFORE |
| COORDINATES ON LATEST IMAGE | COORDINATES ON LATEST IMAGE | COORDINATES ON LATEST IMAGE |
| VEHICLE DETECTION COORDINATES 1 CYCLE BEFORE | VEHICLE DETECTION COORDINATES 1 CYCLE BEFORE | VEHICLE DETECTION COORDINATES 1 CYCLE BEFORE |
| ⋮ | ⋮ | ⋮ |
| VEHICLE DETECTION COORDINATES p CYCLES BEFORE | VEHICLE DETECTION COORDINATES p CYCLES BEFORE | VEHICLE DETECTION COORDINATES p CYCLES BEFORE |
| LATEST EXISTENCE LANE | LATEST EXISTENCE LANE | LATEST EXISTENCE LANE |
| VEHICLE EXISTENCE LANE 1 CYCLE BEFORE | VEHICLE EXISTENCE LANE 1 CYCLE BEFORE | VEHICLE EXISTENCE LANE 1 CYCLE BEFORE |
| ⋮ | ⋮ | ⋮ |
| VEHICLE EXISTENCE LANE q CYCLES BEFORE | VEHICLE EXISTENCE LANE q CYCLES BEFORE | VEHICLE EXISTENCE LANE q CYCLES BEFORE |
| INSTANTANEOUS SPEED | INSTANTANEOUS SPEED | INSTANTANEOUS SPEED |

| Y COORDINATE | TEMPLATE X-DIRECTION SIZE | TEMPLATE Y-DIRECTION SIZE |
|---|---|---|
| SCREEN UPPER LIMIT | | |
| ⋮ | ⋮ | ⋮ |
| SCREEN LOWER LIMIT | | |

FIG.19A

| TIME(SECOND) | t1 t2 t3 t4 t5 t6 t7 t8 t9 t10 t11 ---- |
|---|---|
| INSTANTANEOUS SPEED FIELD | p1 p2 p3 p4 p5 p6 p7 p8 p9 p10 p11 ---- |
| FILTER PROCESSING SPEED FIELD | - - q3 q4 q5 q6 q7 q8 q9 q10 q11 ---- |

FIG.19B

| TIME | t3 t4 ---- t60 t61 t62 t63 t64 t65 t66 t67 ---- |
|---|---|
| FILTER PROCESSING SPEED FIELD | p3 p4 ---- p60 p61 p62 p63 p64 p65 p66 p67 ---- |
| 1-MINUTE AVERAGE SPEED FIELD | - - - - - r62 r63 r64 r65 r66 r67 ---- |

FIG.19C

| TIME(SECOND) | t1 t2 t3 t4 t5 t6 t7 t8 t9 t10 t11 ---- |
|---|---|
| INSTANTANEOUS SPEED FIELD | 12 15 10 10 9 9 48 11 9 8 1 ---- |
| FILTER PROCESSING SPEED FIELD | - - 10 10 10 9 9 11 11 9 8 ---- <br> WINDOW WIDTH 3 |
| 1-MINUTE AVERAGE SPEED FIELD | - - 10 10 10 10 10 11 11 10 10 ---- <br> AVERAGE VALUE FOR PAST 1 MINUTE |

FIG.23

| INDEX 1 | INDEX 2 | INDEX N |
|---|---|---|
| TRACKING STATE FLAG | TRACKING STATE FLAG | TRACKING STATE FLAG |
| INITIAL REGISTRATION TIME | INITIAL REGISTRATION TIME | INITIAL REGISTRATION TIME |
| INITIAL REGISTRATION COORDINATES | INITIAL REGISTRATION COORDINATES | INITIAL REGISTRATION COORDINATES |
| LATEST IMAGE INPUT TIME | LATEST IMAGE INPUT TIME | LATEST IMAGE INPUT TIME |
| IMAGE INPUT TIME 1 CYCLE BEFORE | IMAGE INPUT TIME 1 CYCLE BEFORE | IMAGE INPUT TIME 1 CYCLE BEFORE |
| ⋮ | ⋮ | ⋮ |
| IMAGE INPUT TIME p CYCLES BEFORE | IMAGE INPUT TIME p CYCLES BEFORE | IMAGE INPUT TIME p CYCLES BEFORE |
| COORDINATES ON LATEST IMAGE | COORDINATES ON LATEST IMAGE | COORDINATES ON LATEST IMAGE |
| VEHICLE DETECTION COORDINATES 1 CYCLE BEFORE | VEHICLE DETECTION COORDINATES 1 CYCLE BEFORE | VEHICLE DETECTION COORDINATES 1 CYCLE BEFORE |
| ⋮ | ⋮ | ⋮ |
| VEHICLE DETECTION COORDINATES p CYCLES BEFORE | VEHICLE DETECTION COORDINATES p CYCLES BEFORE | VEHICLE DETECTION COORDINATES p CYCLES BEFORE |
| LATEST EXISTENCE LANE | LATEST EXISTENCE LANE | LATEST EXISTENCE LANE |
| VEHICLE EXISTENCE LANE 1 CYCLE BEFORE | VEHICLE EXISTENCE LANE 1 CYCLE BEFORE | VEHICLE EXISTENCE LANE 1 CYCLE BEFORE |
| ⋮ | ⋮ | ⋮ |
| VEHICLE EXISTENCE LANE q CYCLES BEFORE | VEHICLE EXISTENCE LANE q CYCLES BEFORE | VEHICLE EXISTENCE LANE q CYCLES BEFORE |
| INSTANTANEOUS SPEED | INSTANTANEOUS SPEED | INSTANTANEOUS SPEED |

FIG.28

| INDEX 1 | INDEX 2 | INDEX N |
|---|---|---|
| TRACKING STATE FLAG | TRACKING STATE FLAG | TRACKING STATE FLAG |
| IN-TRACKING FLAG | IN-TRACKING FLAG | IN-TRACKING FLAG |
| INITIAL REGISTRATION TIME | INITIAL REGISTRATION TIME | INITIAL REGISTRATION TIME |
| INITIAL REGISTRATION COORDINATES | INITIAL REGISTRATION COORDINATES | INITIAL REGISTRATION COORDINATES |
| LATEST IMAGE INPUT TIME | LATEST IMAGE INPUT TIME | LATEST IMAGE INPUT TIME |
| IMAGE INPUT TIME 1 CYCLE BEFORE | IMAGE INPUT TIME 1 CYCLE BEFORE | IMAGE INPUT TIME 1 CYCLE BEFORE |
| ⋮ | ⋮ | ⋮ |
| IMAGE INPUT TIME p CYCLES BEFORE | IMAGE INPUT TIME p CYCLES BEFORE | IMAGE INPUT TIME p CYCLES BEFORE |
| COORDINATES ON LATEST IMAGE | COORDINATES ON LATEST IMAGE | COORDINATES ON LATEST IMAGE |
| VEHICLE DETECTION COORDINATES 1 CYCLE BEFORE | VEHICLE DETECTION COORDINATES 1 CYCLE BEFORE | VEHICLE DETECTION COORDINATES 1 CYCLE BEFORE |
| ⋮ | ⋮ | ⋮ |
| VEHICLE DETECTION COORDINATES p CYCLES BEFORE | VEHICLE DETECTION COORDINATES p CYCLES BEFORE | VEHICLE DETECTION COORDINATES p CYCLES BEFORE |
| LATEST EXISTENCE LANE | LATEST EXISTENCE LANE | LATEST EXISTENCE LANE |
| VEHICLE EXISTENCE LANE 1 CYCLE BEFORE | VEHICLE EXISTENCE LANE 1 CYCLE BEFORE | VEHICLE EXISTENCE LANE 1 CYCLE BEFORE |
| ⋮ | ⋮ | ⋮ |
| VEHICLE EXISTENCE LANE q CYCLES BEFORE | VEHICLE EXISTENCE LANE q CYCLES BEFORE | VEHICLE EXISTENCE LANE q CYCLES BEFORE |
| INSTANTANEOUS SPEED | INSTANTANEOUS SPEED | INSTANTANEOUS SPEED |
| INSTANTANEOUS SPEED VALID FLAG | INSTANTANEOUS SPEED VALID FLAG | INSTANTANEOUS SPEED VALID FLAG |
| ZONE MEASUREMENT COMPLETION FLAG | ZONE MEASUREMENT COMPLETION FLAG | ZONE MEASUREMENT COMPLETION FLAG |
| LANE CHANGE FLAG | LANE CHANGE FLAG | LANE CHANGE FLAG |
| ABNORMAL SPEED FLAG | ABNORMAL SPEED FLAG | ABNORMAL SPEED FLAG |

FIG.30

| BUFFER NUMBER \ LANE | 1 | 2 | 3 | 4 |
|---|---|---|---|---|
| 1 | OFF<br>0.0/43<br>2.0/12 | OFF<br>1.1/140<br>0.8/35 | OFF<br>0.8/110<br>1.0/12 | OFF<br>5.1/43<br>2.1/12 |
| 2 | OFF<br>2.4/48<br>2.4/5 | ON<br>1.1/100<br>0.8/-40 | OFF<br>0.8/105<br>1.0/-5 | OFF<br>6.9/83<br>1.8/40 |
| 3 | OFF<br>4.4/43<br>1.4/-5 | OFF<br>1.1/106<br>0.8/6 | OFF<br>1.1/128<br>2.8/23 | OFF<br>9.0/78<br>2.1/-5 |
| 4 | OFF<br>5.8/45<br>2.4/2 | OFF<br>1.1/101<br>0.8/-5 | ON<br>1.1/96<br>0.8/-32 | OFF<br>11.1/90<br>2.1/12 |
| 5 | OFF<br>8.8/48<br>3.0/3 | OFF<br>1.1/103<br>0.8/2 | OFF<br>0.8/108<br>1.0/12 | OFF<br>13.1/87<br>2.0/-3 |
| 6 | OFF<br>10.8/38<br>2.0/-10 | OFF<br>1.1/93<br>1.8/-10 | OFF<br>0.8/106<br>1.0/-2 | OFF<br>14.1/92<br>1.0/5 |

INVALID FLAG
PASSING TIME (SECOND) / PASSING SPEED (km/h)
TIME DIFFERENCE (SECOND) / SPEED DIFFERENCE (km/h)

TRAFFIC FLOW MONITOR APPARATUS

BACKGROUND OF THE INVENTION

1. Field of the Invention

The present invention relates to a traffic flow monitor apparatus for monitoring a traffic flow by using an image received by a TV camera for photographing automobiles running on a road and, more particularly, to a traffic flow monitor apparatus for recognizing a traffic flow while tracking vehicles one by one.

The present invention also relates to a means for detecting a stop state, as a matter of course, and a low-speed running state being free from a stop state on a highway as traffic jam.

2. Description of the Related Art

As a conventional traffic flow monitor apparatus, traffic flow monitor apparatuses described in U.S. Pat. No. 4,847,772, Japanese Unexamined Patent Publication No. 2-166,598, Japanese Unexamined Patent Publication No. 5-298,591, and Japanese Unexamined Patent Publication No. 6-030,417 are known. Of these publications, each of U.S. Pat. No. 4,847,772 and Japanese Unexamined Patent Publication No. 2-166,598 proposes a system in which the image of a road portion on which no vehicle exists is used as a reference image, and, when the luminance distribution of a newly input image is sufficiently different from the luminance distribution of the reference image, it is determined that a vehicle exists on the road portion. On the other hand, each of Japanese Unexamined Patent Publication No. 5-298,591 and Japanese Unexamined Patent Publication No. 6-030,417 proposes a system in which an object detected in a detection area formed on a screen is initially registered as a template, and, subsequently, a vehicle is tracked by correlation calculation to detect traffic jam.

As a conventional traffic flow monitor apparatus, for example, "Examination of Procession Length Measurement Algorithm using Image Processing" (General Meeting of Institute of Electronics and Communication Engineering of Japan: D-423: p.149, 1995) is proposed. In this apparatus, an image is differentiated to check the presence/absence of a vehicle, and the stop of the vehicle is determined on the basis of this frame and the next frame. In this case, when a vehicle exists and is stopped, traffic jam is determined.

In the above related art, in U.S. Pat. No. 4,847,772 and Japanese Unexamined Patent Publication No. 2-166,598, a reference image of a road portion on which no vehicle exists must be registered, and the reference image must be updated depending on a change in shadow or brightness. However, on a crowded road, the registration and updating of the reference image cannot be easily performed, and measurement precision is degraded.

In Japanese Unexamined Patent Publication No. 5-298,591, regardless of the presence/absence of a vehicle, a template having a predetermined size at a predetermined position, i.e., a position spaced apart from a TV camera by a predetermined distance, is registered, and an actual vehicle is tracked. In this system, the size of the template and the size of the actual vehicle are different from each other with movement of the vehicle, and high-precision tracking cannot be performed. In addition, it is difficult to determine whether the shadow of the vehicle or another vehicle which adjacently runs is tracked.

Further, in Japanese Unexamined Patent Publication No. 6-030,417, a plurality of vehicle images are held as templates in advance, and correlation calculation between each image and all the templates is executed each time an image is input. Therefore, in order to obtain a high correlation value, a large number of templates which are different in size, shape, and luminance must be prepared. Therefore, an amount of correlation calculation when the image is input, thereby preventing high-speed processing.

On a highway, when a large number of vehicles run at a low speed, traffic jam must be determined. For this reason, speed measurement is inevitably performed to determine traffic jam. However, in the conventional method, speed measurement cannot be performed, and a vehicle running at a low speed cannot be detected. In the conventional method, movement of a vehicle cannot be detected by the difference between frames for the following reason. That is, even if vehicles run at equal speeds, outputs are different from each other according to the shapes or colors of the vehicles, and outputs are different from each other depending on the distances from a camera.

SUMMARY OF THE INVENTION

It is the first object of the present invention to provide a traffic flow monitor apparatus having good measurement precision which does not require a reference image of a road portion on which no vehicle exists, can easily discriminate an adjacently running vehicle from a shadow, and can reliably track a vehicle over the wide range from the position near a TV camera to the position distanced from the TV camera regardless of deserted traffic or crowded traffic.

It is the second object of the present invention to provide a traffic flow monitor apparatus which can detect a stop state, as a matter of course, and a low-speed running state being free from a stop state on a highway as traffic jam.

In order to achieve the first object, the present invention proposes a traffic flow monitor apparatus comprising image-pickup means for photographing a road in an overlooking manner, means for analyzing a luminance distribution of an image analysis area crossing a road of overlooked road images received every predetermined cycle, means for performing template registration to a luminance pattern of a part or whole of a vehicle in the image analysis area as a characteristic portion of the vehicle, tracking means for calculating the degree of similarity between the template and the luminance pattern of the overlooked road image by correlation calculation to track a luminance pattern having a high degree of similarity as a vehicle which is subjected to template registration, and monitor means for monitoring zigzag running, a suddenly change in speed, excessively low-speed running, excessively high-speed running, and the like on the basis of a change in vehicle position in the overlooked road images received every predetermined cycle.

The traffic flow monitor apparatus comprises means for calculating, on the basis of a movement distance of a vehicle moving between two images having a time difference not shorter than a predetermined period of time of the over-looked road images received every predetermined cycle, an instantaneous speed of the vehicle, and the monitor means monitors a suddenly change in speed, excessively low-speed running, excessively high-speed running, and the like on the basis of the instantaneous speed.

The means for performing template registration to the characteristic portion of the vehicle can have a plurality of templates corresponding to the inumber of vehicles to be monitored. In this case, the tracking means simultaneously tracks a plurality of vehicles which differently move by using the plurality of templates.

The tracking means has a tracking management table for each template, independently registers templates in columns of each tracking management table, independently adds or erases information to independently track different movements of the respective vehicles.

In any case, the traffic flow monitor apparatus can comprise means for holding a lane division line as a primary approximate expression or a polynomial approximate expression, means for calculating a lane to which the vehicle belongs by using a vehicle position in the overlooked road image received every predetermined cycle and the primary approximate expression or the polynomial approximate expression, and means for determining a change in lane by the change of the belonging lane.

The traffic flow monitor apparatus preferably comprises means for calculating a lane width on a screen at a position where a template is subjected to initial registration by using the primary approximate expression or the polynomial approximate expression to define the lane width as a reference lane width, calculating a lane width on a screen at a position after the template has moved by using the primary approximate expression or the polynomial approximate expression to define the lane width as a detection position lane width, and enlarging or reducing the size of the template in the initial registration such that a ratio of the detection position lane width to the reference lane width is equal to a ratio of the size of the template in initial registration to the size of the template after the template has moved, thereby determining the size of the template after the template has moved.

The traffic flow monitor apparatus can also comprise means for forming a measurement zone crossing the road of the overlooked road images received every predetermined cycle, counting vehicles passing through the measurement zone for each lane, and measuring an average speed of each vehicle passing through the measurement zone.

In the traffic flow monitor apparatus, means for arranging at least one road surface luminance pattern collation area for each lane on a road surface of the overlooked road images received every predetermined cycle, evaluating the degree of similarity between the road surface luminance pattern of the collation area which is held as a template in advance and an actual luminance pattern on the basis of correlation calculation between the road surface luminance pattern and the actual luminance pattern, determining that no vehicle exist in the collation area when the degree of similarity is high, and determining that a vehicle exists in the collation area when the degree of similarity is low may be added.

In this case, the traffic flow monitor apparatus can comprise means for measuring the length of the vehicle on the basis of relative positions of the collation area and the front and rear portions of the vehicle when the vehicle a passes through the collation area.

In order to achieve the above object, the present invention proposes a traffic flow monitor apparatus comprising a keyboard, a man-machine interface such as a display unit, a CPU having a main memory, image input means which receives an overlooked road image from image-pickup means under the control of the CPU to convert the image into a digital value, image processing means for processing the converted digital image under the control of the CPU, and an image memory for the digital image, wherein the image processing means is means for analyzing a luminance distribution in an image analysis area crossing a road of overlooked road images received every predetermined cycle, and the CPU serves as means for performing template registration to a luminance pattern of a part or whole of a vehicle in the image analysis area as a characteristic portion of the vehicle, tracking means for recognizing at least initial registration coordinates, initial registration time, latest image input time, a vehicle existence position in the latest image, a lane number in the vehicle in the latest image exists, time at which images are input in a plurality of cycles, a position of a vehicle pattern in the image input in the plurality of cycles for each vehicle and calculating the degree of similarity between the template and the luminance pattern of the overlooked road image by correlation calculation to track a luminance pattern having a high degree of similarity as a vehicle which is subjected to template registration, and monitor means for monitoring abnormal running such as zigzag running, a suddenly change in speed, excessively low-speed running, or excessively high-speed running, on the basis of a change in vehicle position in the overlooked road images received every predetermined cycle, recording time and position of occurrence of abnormal running and contents of the abnormal running, and informing of the time, position, and contents of the abnormal running.

According to any one of the above traffic flow monitor apparatuses, in a traffic flow monitor system in which a traffic flow monitor apparatus according to any one of claims 1 to 10 receives the overlooked road image through a video distributor to process the image, stores a traffic event or a traffic index such as an instantaneous speed or change in lane in a traffic event accumulation means, transmits the traffic event or the traffic index to a control room through traffic event communication means, and, on the control room side, video overlapping means causes the traffic event obtained through the traffic event communication means to overlap an overlooked road image obtained through the video distributor to display the resultant image on display means, the traffic flow monitor apparatus can monitor an instantaneous speed and a change in existence lane for each vehicle and transmits data such as detection time, detection position, and contents of a change in lane according to avoidance running or zigzag running of the vehicle and excessively low-speed or high-speed running of the vehicle to the control room to accumulate the data in a storage unit in the control room.

In this traffic flow monitor system, the image-pickup means is a color TV camera, the traffic flow monitor apparatus receives the overlooked road image as a monochrome image, and the display means in the control room is means for overlap-displaying a color image from the image-pickup means and monochrome monitor data generated by the traffic flow monitor apparatus on the basis of the monochrome image. In this manner, the processing load of the traffic flow monitor apparatus can be reduced.

In the present invention having the above arrangement, an image analysis area crossing a road of an overlooked road image received every predetermined cycle is analyzed, a portion such as the front or rear portion of a vehicle having a luminance distribution as characteristics is captured, vehicles are registered as templates one by one, and the vehicles are tracked while these templates are updated. For this reason, no reference image of a road portion on which no vehicle exists is required, and a process such as matching or integration using a plurality of templates is not required for one vehicle, and influence of approaching or overlapping of another vehicle can be reduced. Therefore, a vehicle can be tracked at a high speed regardless of deserted traffic or crowded traffic, and a traffic flow can be monitored at high precision.

In particular, since the size of a template is reduced or enlarged depending on a change in apparent width of a lane during template updating, stable vehicle tracking can be performed by using templates having appropriate sizes over a range from the position near the TV camera to the position distanced from the TV camera.

The second object is acehived by the following manner. A road image received every cycle is digitally processed, the characteristic portion of a passing vehicle or a vehicle group consisting of a plurality of vehicles is tracked by pattern matching, and the instantaneous speed of the passing vehicle is measured. Further, the road image is divided into areas by lanes and distances, an average value of the instantaneous speeds of vehicles existing in each area is calculated, and the presence/absence of traffic jam is determined on the basis of the magnitude of the average value.

More specifically, in order to achieve the second object, the present invention proposes a traffic flow monitor apparatus comprising means for digitally processing a road image received every predetermined cycle to track passing vehicles, means for measuring an instantaneous speeds of the passing vehicles, means for dividing the road image into small areas by lanes and distances and calculating a small-area speed representing an average speed of the passing vehicles in each small area, and means for determining the presence/absence of traffic jam and/or the degree of traffic jam for each small area on the basis of the magnitude of the small-area speed.

The passing vehicle tracking means is means for tracking a characteristic portion such as a portion having a large change in luminance of the passing vehicle by shading pattern matching.

The passing vehicle tracking means is means, having a plurality of templates, for simultaneously tracking a plurality of vehicles which differently move by using the plurality of templates.

The instantaneous speed measurement means is means for calculating an instantaneous speed of the vehicle on the basis of the vehicle moves between two images, having time different not longer than a predetermined period of time, of the road images received every predetermined cycles.

The small-area speed calculation means is means for holding a line division line as a primary approximate expression or a polynomial approximate expression, applying the primary approximate expression or the polynomial approximate expression to a vehicle position in the road images received every predetermined cycles, and calculating a lane to which the vehicle belongs.

The traffic flow monitor apparatus has tracking management tables for templates, independently registers the templates on columns of the tracking management tables, adds or erases information from each column, and independently monitor different movements of respective vehicles are independently monitored.

It is preferable that the passing vehicle tracking means is means for calculating a lane width on a screen at a position where a template is subjected to initial registration by using the primary approximate expression or the polynomial approximate expression to define the lane width as a reference lane width, calculating a lane width on a screen at a position after the template has moved by using the primary approximate expression or the polynomial approximate expression to define the lane width as a detection position lane width, enlarging or reducing the size of the template in the initial registration such that a ratio of the detection position lane width to the reference lane width is equal to a ratio of the size of the template in initial registration to the size of the template after the template has moved, thereby determining the size of the template after the template has moved.

The traffic jam determination means is means for calculating an average value of instantaneous speeds of all vehicles existing in the small area within a predetermined period of time to define the average value as a small-area speed, and determining the presence/absence of traffic jam or the degree of traffic jam for each small area on the basis of the magnitude of the small-area speed.

The traffic jam determination means is means for performing a smoothing process to the instantaneous speeds of vehicles existing in the small area within the predetermined period of time by using a filter, calculating an average value to define the average value as a small-area speed, and determining the presence/absence of traffic jam or the degree of traffic jam for each small area on the basis of the magnitude of the small-area speed.

The traffic jam determination means can also be means for calculating a weighting average value for giving a weight which is proportional to the newness of measurement time to the instantaneous speed to define the average value as a small-area speed, and determining the presence/absence of traffic jam or the degree of traffic jam for each small area on the basis of the magnitude of the small-area speed.

In any one of the traffic flow monitor apparatuses, the traffic jam determination means, when areas which are determined as traffic jam areas with respect to lanes are adjacent to each other, measures the length of the connected traffic jam areas to define the length as the length of traffic jam.

In order to achieve the second object, the present invention proposes a traffic flow monitor apparatus comprising a keyboard, a man-machine interface such as a display unit, a CPU having a main memory, image input means which receives an overlooked road image from image-pickup means under the control of the CPU to convert the image into a digital value, image processing means for processing the converted digital image under the control of the CPU, and an image memory for the digital image, wherein the image processing means is means for arranging at least one image analysis area crossing a road of the road image received every predetermined cycle, and analyzing a luminance distribution in the image analysis area, and the CPU serves as means for performing template registration to a luminance pattern of a front portion or a rear portion of a vehicle in the image analysis area or a luminance pattern of a part or whole of the vehicle in the image analysis area as a characteristic portion of the vehicle, passing vehicle tracking means for searching the vehicle pattern from an image received in a next cycle by a pattern matching process by using the template, updating the vehicle pattern as a new template, and recognizing at least initial registration coordinates, initial registration time, latest image input time, a vehicle existence position in the latest image, a lane number in which the vehicle in the latest image exists, time at which images are input in a plurality of cycles, a position of a vehicle pattern in the image input in the plurality of cycles for each vehicle, instantaneous speed measurement means for calculating an instantaneous speed of each vehicle, and means for arranging small areas divided by lanes and distances from a camera in the road, smoothing instantaneous speeds of vehicles existing in the small areas within a predetermined period of time by using a filter, calculating a weighted means value of loads which are proportional to the newness of the instantaneous speeds according to measurement time of the instantaneous speeds as small-area speeds of the small areas, and determining the presence/absence of traffic jam in each small area on the basis of the magnitude of the small-area speeds.

The display unit is means for displaying the arrangement of the small areas to cause the arrangement of the small areas to overlap the road image or a schematic view, and changing a small area portion determined as a small area portion having traffic jam in luminance or color to display a traffic jam length or a traffic jam end.

In the present invention having the above arrangement, the characteristic portion of a vehicle or a vehicle group is tracked by pattern matching to measure an instantaneous speed, and a small-area speed is calculated for each small area. For this reason, a stop state can be detected as traffic jam, as a matter of course. In particular, a low-speed running state free from a stop state on a highway can also be detected as traffic jam.

In addition, since a measured small-area speed is multiplied by a median filter and subjected to an averaging process for past one minute or several minutes, the small-area speed and traffic jam can be stably determined.

In averaging of small-area speeds, when weighting is performed depending on the newness of the measured small-area speeds, response to a traffic state change such as occurrence or elimination of traffic jam is high.

In order to achieve the second object, the present invention proposes a traffic flow monitor apparatus comprising template registration means for holding a luminance pattern of a front portion or a rear portion of a vehicle existing in road images received by image-pickup means every predetermined cycle as a template of the vehicle, tracking means for performing a pattern matching process to the template and the luminance pattern to track the vehicle, instantaneous speed measurement means for measuring an instantaneous speed of the vehicle on the basis of a reception interval between the road images and a movement distance of the vehicle between the road images, and overlapping measurement correction means for, when at least two vehicles pass, calculating a passing time difference and a speed difference between the two vehicles, determining that different portions of one vehicle are tracked by a plurality of templates when the passing time difference is not larger than a predetermined time difference and when the speed difference is not smaller than a predetermined speed difference, and making only one template related to the vehicle valid and the other templates invalid.

The overlapping measurement correction means is means for making, of the plurality of templates, only a template in which the instantaneous speed is the lowest speed valid, and the other templates invalid.

The predetermined time difference and the predetermined speed difference are preferably proportional to the instantaneous speed.

The traffic flow monitor apparatus can comprises means for arranging a belt-like measurement zone crossing a road of the overlooked road image and counting vehicles for each lane to which the vehicle in tracking belongs when the vehicle passes through the measurement zone, means for measuring a zone speed of the vehicle on the basis of a difference between time at which the vehicle flows into the measurement zone and time at which the vehicle flows our of the measurement zone, a buffer for recording flow-out times and zone speeds of the vehicle in order of flowing of the vehicle into a lane in which the vehicle flows out of the measurement zone, means for recording, in the buffer, the flow-out time and zone speed of the vehicle, and a difference between flow-in time of a vehicle which is previously recorded by one in the same lane as that of the above vehicle and flow-out time of the vehicle as a "time difference", and means for recording, in the buffer, a difference between the zone speed of the vehicle and a zone speed of a vehicle which is previously recorded by one in the same lane as that of the above vehicle as a "speed difference".

In this case, the flow-out time and zone speed of the vehicle, a time difference, a speed difference, and a 1-bit invalid flag are stored in the buffer, and the invalid flag is turned on when the time difference is small and the speed difference is large, and the invalid flag is turned off except when the time difference is small and the speed difference is large.

The traffic flow monitor apparatus comprises means for erasing vehicle information recorded on the buffer in order of oldness, counting passing vehicles, recording the number of passing vehicles and the zone speed on a recording unit, and/or transmitting the number of passing vehicles and the zone speed to a control room.

In any case, the traffic flow monitor apparatus may comprises means for, of vehicles having the small time difference and the large speed difference, making only a vehicle having the lowest zone speed valid, and making the other vehicles invalid to except the other vehicles from measurement targets.

The traffic flow monitor apparatus comprises means for calculating passing vehicles leaving from a near position on the overlooked road image except for a vehicle preceding a vehicle having the invalid flag which is ON in the buffer, recording the number of passing vehicles and the zone speed on the recording unit, and/or transmitting the number of passing vehicles and the zone speed to the control room. In contrast to this, the traffic flow monitor apparatus comprises means for calculating passing vehicles approaching a near position on the overlooked road image except for a vehicle having the invalid flag which is ON in the buffer, recording the number of passing vehicles and the zone speed on the recording unit, and/or transmitting the number of passing vehicles and the zone speed to the control room.

The traffic flow monitor apparatus comprises means for recording a lane number to which the vehicle belongs during the vehicle tracking on the tracking management table, means for comparing a past belonging lane number and a present belonging lane number with each other, means for determining that a change in lane is made when the lane numbers are different from each other, means for determining a low-speed running vehicle when the instantaneous speed obtained by the instantaneous speed measurement means is not higher than a predetermined speed, and means for determining an avoidance-running vehicle when a low-speed running vehicle makes a change in line.

In the present invention having the above arrangement, the traffic flow monitor apparatus comprises means for calculating, on the basis of a movement distance of a vehicle moving between two images having a time difference not shorter than a predetermined period of time of the overlooked road images received every predetermined cycle, an instantaneous speed of the vehicle, and the monitor means monitors a suddenly change in speed, excessively low-speed running, excessively high-speed running, and the like on the basis of the instantaneous speed.

The means for performing template registration to the characteristic portion of the vehicle can have a plurality of templates corresponding to the number of vehicles to be monitored. In this case, the tracking means simultaneously tracks a plurality of vehicles which differently move by using the plurality of templates.

The tracking means has a tracking management table for each template, independently registers templates in columns of each tracking management table, independently adds or erases information to independently track different movements of the respective vehicles, thereby preventing overlapping counting.

In any case, the traffic flow monitor apparatus can comprise means for holding a lane division line as a primary approximate expression or a polynomial approximate expression, means for calculating a lane to which the vehicle belongs by using a vehicle position in the overlooked road image received every predetermined cycle and the primary approximate expression or the polynomial approximate expression, and means for determining a change in lane by the change of the belonging lane.

The traffic flow monitor apparatus preferably comprises means for calculating a lane width on a screen at a position where a template is subjected to initial registration by using the primary approximate expression or the polynomial approximate expression to define the lane width as a reference lane width, calculating a lane width on a screen at a position after the template has moved by using the primary approximate expression or the polynomial approximate expression to define the lane width as a detection position lane width, and enlarging or reducing the size of the template in the initial registration such that a ratio of the detection position lane width to the reference lane width is equal to a ratio of the size of the template in initial registration to the size of the template after the template has moved, thereby determining the size of the template after the template has moved.

With respect to traffic jam determination, there is proposed a traffic flow monitor apparatus comprising means for dividing the road image into small areas by lanes and distances and calculating a small-area speed representing an average speed of the passing vehicles in each small area, and means for determining the presence/absence of traffic jam and/or the degree of traffic jam for each small area on the basis of the magnitude of the small-area speed.

The small-area speed calculation means is means for holding a line division line as a primary approximate expression or a polynomial approximate expression, applying the primary approximate expression or the polynomial approximate expression to a vehicle position in the road images received every predetermined cycles, and calculating a lane to which the vehicle belongs.

The traffic jam determination means is means for calculating an average value the instantaneous speeds of all vehicles existing in a small area within a predetermined period of time to define the average value as a small-area speed, and determining the presence/absence of traffic jam or the degree of traffic jam for each small area on the basis of the magnitude of the small-area speed.

The traffic jam determination means can also be means for performing a smoothing process to the instantaneous speed of a vehicle existing in the small area within the predetermined period of time by using a filter, calculating an average value to define the average value as a small-area speed, and determining the presence/absence of traffic jam or the degree of traffic jam for each small area on the basis of the magnitude of the small-area speed.

The traffic jam determination means may also be means for calculating a weighting average value for giving a weight which is proportional to the newness of measurement time to the instantaneous speed to define the average value as a small-area speed, and determining the presence/absence of traffic jam or the degree of traffic jam for each small area on the basis of the magnitude of the small-area speed.

In any one of the traffic flow monitor apparatuses, the traffic jam determination means, when areas which are determined as traffic jam areas with respect to lanes are adjacent to each other, measures the length of the connected traffic jam areas to define the length as the length of traffic jam.

The display unit is means for displaying the arrangement of the small areas to cause the arrangement of the small areas to overlap the road image or a schematic view, and changing a small area portion determined as a small area portion having traffic jam in luminance or color to display a traffic jam length or a traffic jam end.

In the present invention, the characteristic portion of a vehicle is tracked by pattern matching to measure an instantaneous speed, and a small-area speed is calculated for each small area. For this reason, a stop state can be detected as traffic jam, as a matter of course. In particular, a low-speed running state free from a stop state on a highway can also be detected as traffic jam.

In addition, since a measured small-area speed is multiplied by a median filter and subjected to an averaging process for past one minute or several minutes, the small-area speed and traffic jam can be stably determined.

In averaging of small-area speeds, when weighting is performed depending on the newness of the measured small-area speeds, response to a traffic state change such as occurrence or elimination of traffic jam is high.

BRIEF DESCRIPTION OF THE DRAWINGS

FIG. 4 is a view showing an example of the arrangement of tracking management tables used in the traffic flow monitor apparatus according to the present invention.

FIGS. 19(a) to 19(c) are views showing the speed field of a small area, a filter processing speed field, and a one-minute average speed field on an overlooked road image of the traffic flow monitor apparatus according to the present invention.

FIG. 23 is a view showing an example of tracking management tables in the traffic flow monitor apparatus according to Embodiment 2 of the present invention.

FIG. 28 is a view showing an example of tracking management tables in the traffic flow monitor apparatus according to Embodiment 3 of the present invention.

FIG. 30 is a view showing a method of arranging measurement data in a buffer of the traffic flow monitor apparatus according to Embodiment 3.

DESCRIPTION DETAILED

Embodiment 1

A traffic flow monitor apparatus according to Embodiment 1 of the present invention will be described below with reference to FIGS. 1 to 9.

Figure 3:
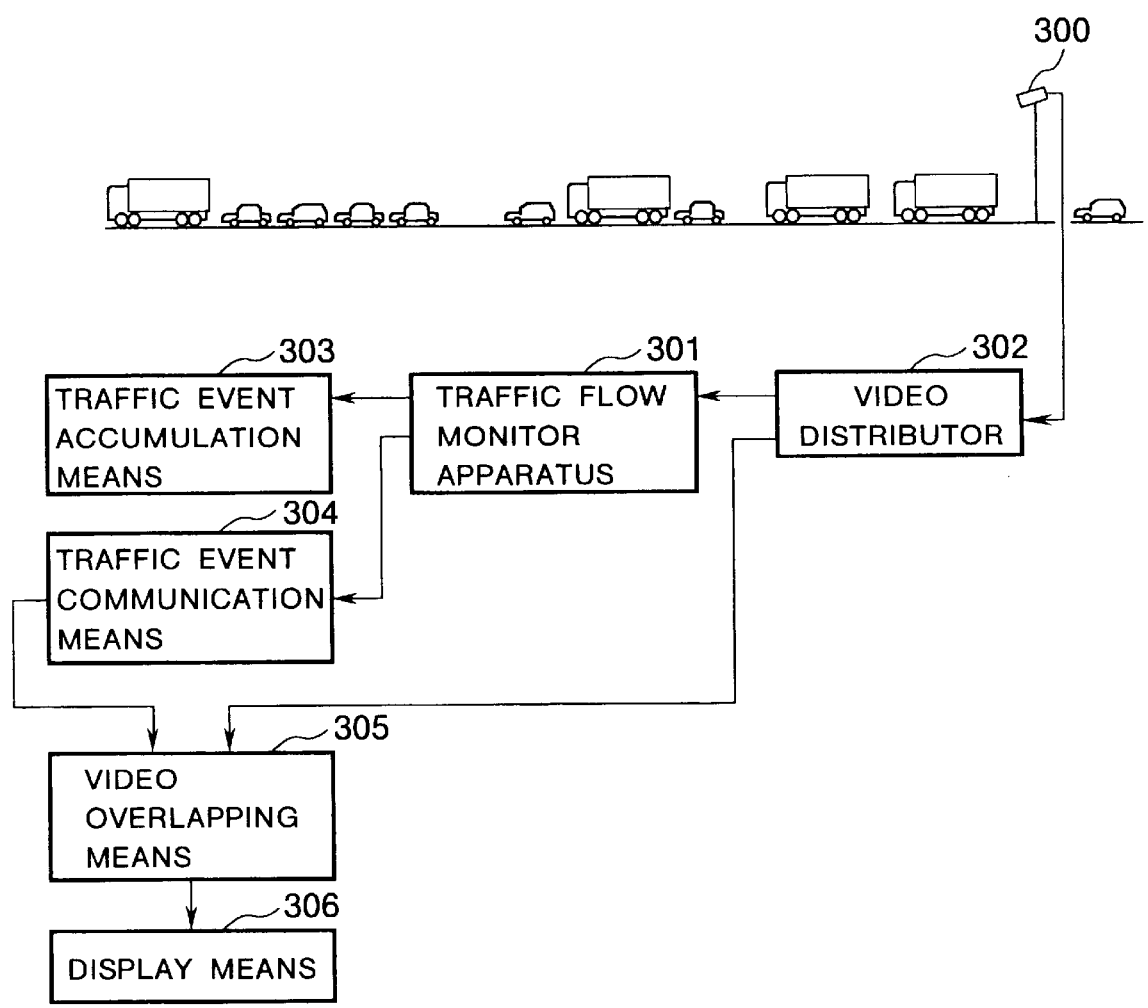
FIG. 3 is a block diagram showing an example of a system arrangement of a traffic flow monitor system to which Embodiment 1 is to be applied.

FIG. 3 is a block diagram showing an example of a system arrangement of a traffic flow monitor system to which the present invention is to be applied. In the traffic flow monitor system, a traffic flow monitor apparatus 301 of Embodiment 1 receives a road overlooked image photographed by a TV camera 300 set on the upper portion of a pole built along the road through a video distributer 302 to perform image processing, traffic indexes such as an instantaneous speed and a lane change or traffic events are stored in a traffic event accumulation means 303, and the traffic indexes and traffic events are transmitted to a control room through the traffic event communication means 304. In the control room, a video piling means 305 causes the traffic events obtained through the traffic event communication means 304 to overlap on the overlooked road image obtained through the video distributer 302 to display the image on a display means 306. In this case, on the control room side, an alarm device can be operated depending on the traffic indexes and the traffic events obtained through the traffic event communication means 304.

Figure 2:
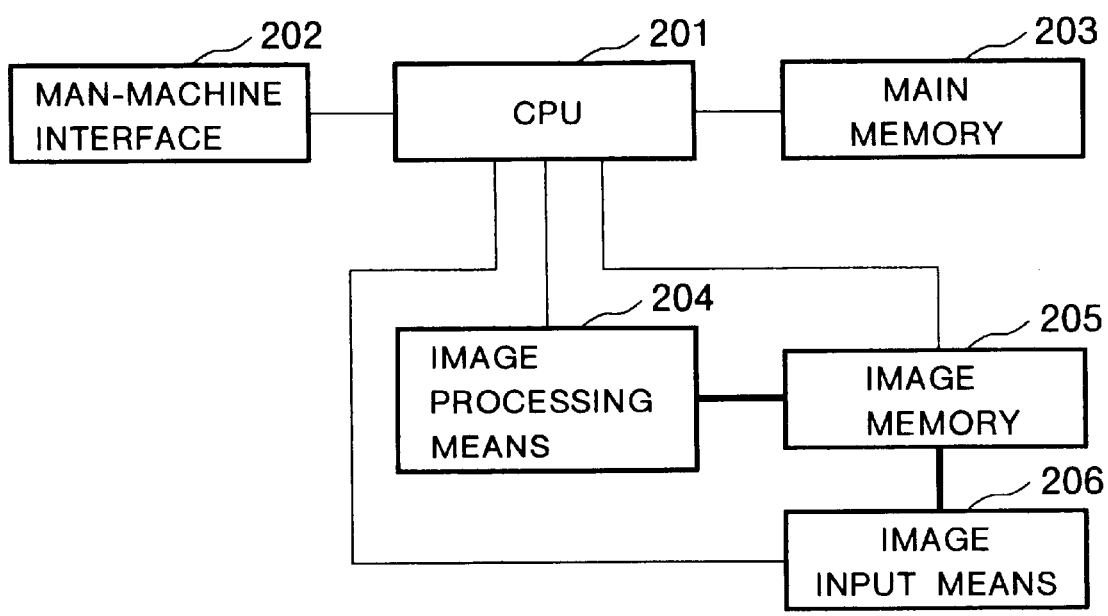
FIG. 2 is a block diagram showing the arrangement of the traffic flow monitor apparatus according to the present invention.

FIG. 2 is a block diagram showing the arrangement of the traffic flow monitor apparatus according to Embodiment 1 of the present invention. The traffic flow monitor apparatus according to Embodiment 1 comprises a CPU 201, a man-machine interface 202 used to allow an operator to operate the CPU 201, a main memory 203 serving as a memory for storing a program of the CPU 201 therein and also serving as an operation memory, an image processing means 204 for processing an image under the control of the CPU 201, an image input means 206 for receiving an image under the control of the CPU 201 to convert the image into a digital value, and an image memory 205 which holds the digital image obtained by the image input means 206 and also serves as an operation memory for the image processing means 204. The image processing means 204 image-analyzes an image analysis area (to be described later), detects a luminance pattern of a characteristic portion of the front or rear portion of a vehicle or a luminance pattern of some or all of characteristic portions, and performs a pattern matching process by using the luminance pattern as a template.

Figure 1:
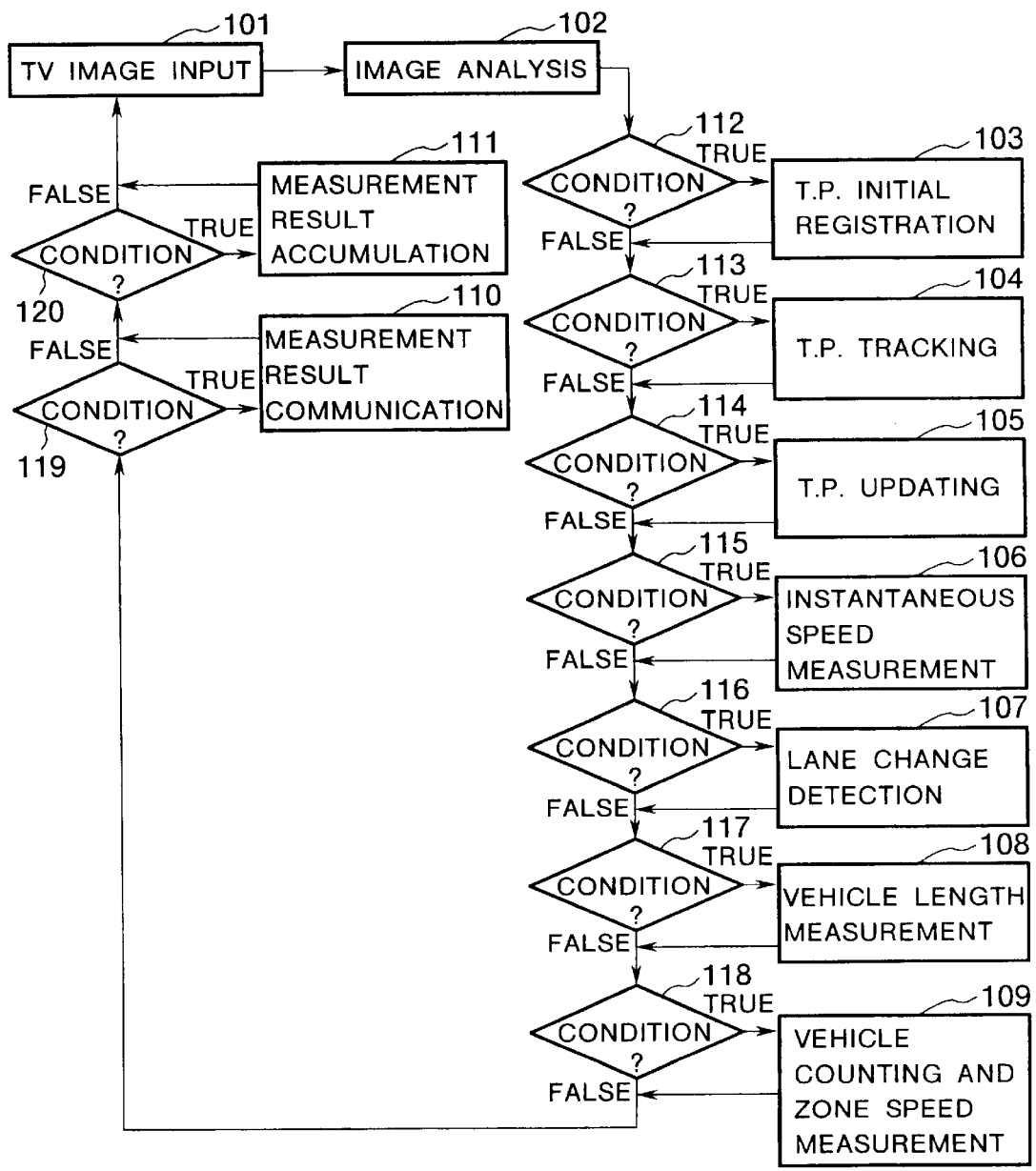
FIG. 1 is a view showing an example of a processing procedure of a traffic flow monitor apparatus according to Embodiment 1 of the present invention.

FIG. 1 is a view showing an example of a processing procedure of a traffic flow monitor apparatus according to Embodiment 1 of the present invention. Basically, TV image input 101 and image analysis 102 are cyclically repeated. Meanwhile, there are condition branches 112 to 120. When a predetermined condition is satisfied, the control branches to template initial registration (T.P. initial registration) 103, template tracking (T.P. tracking) 104 similar to vehicle tracking, template updating (T.P. updating) 105, instantaneous speed measurement 106, lane change detection 107, vehicle length measurement 108, vehicle counting and zone speed measurement 109, measurement result communication 110, and measurement result accumulation 111. The condition branches 112 to 120 will be described later together with the process of the traffic flow monitor apparatus according to Embodiment 1.

FIG. 4 is a view showing an example of the arrangement of tracking management tables used in the traffic flow monitor apparatus according to Embodiment 1. Any one of INDEX 1 to INDEX N is given to each target object, one column is allocated to the object to recognize the state of the object. More specifically, when a vehicle is to be tracked, operations from template initialization to updating of an in-tracking template are performed using the same column.

A "tracking state flag" of each column indicates whether the column is being used in vehicle tracking. If the flag is 0, the column is unused, and the column can be used for new vehicle tracking. If the flag is 1, the flag indicates that template initial registration is completed. For this reason, the template is subjected to the template tracking 104 and the template updating 105. If the "tracking state flag" is 2, the flag indicates the state in which a template initial registration candidate is held. In this case, a template cutting candidate area in "initial registration coordinates" is subjected to template initial registration in the template initial registration 103, and the "tracking state flag" is set to 1. If an "in-tracking flag" is 1, the flag indicates that a vehicle is being tracked. If the "in-tracking flag" is 0, the flag indicates that vehicle tracking is ended or stopped.

"Initial registration time" indicates time at which an image used in initial registration is input. "Latest image input time" and "coordinates on latest image" indicate time at which the latest image is input and pattern detection coordinates as a vehicle on the latest image, respectively. Either of them is valid if the "tracking state flag" is 1. A "latest existence lane" holds a lane number to which a vehicle in tracking, i.e., "coordinates on latest image" belongs. Input times at which p images from "image input time 1 cycle before" to "image input time p cycles before" and the vehicle detection coordinates of the p images from "vehicle detection coordinates 1 cycle before" to "vehicle detection coordinates p cycles before" are used in calculation of an instantaneous speed. The details of the calculation will be described later. The vehicle existence lanes of q images from "vehicle existence lane 1 cycle before" to "vehicle existence lane q cycles before" are used to determine zigzag running of a vehicle or running for avoiding an obstacle. The details of the vehicle existence lanes will be described later.

A processing procedure of the traffic flow monitor apparatus according to Embodiment 1 will be described below in detail.

In the TV image input 101 in FIG. 1, the traffic flow monitor apparatus 301 in FIG. 3 receives overlooked road images from the TV camera 300 at predetermined cycles through the video distributer 302, converts the overlooked road images into digital data, and holds the digital data in the image memory 205.

In the image analysis 102, the traffic flow monitor apparatus 301 in FIG. 3 forms an image analysis area crossing the road in an image with respect to an image held in the image memory 205 in the TV image input 101, analyzes a luminance distribution in the area, captures the characteristic portion of a front or rear portion of a vehicle or some or all of characteristic portions, i.e., a front grill, a windshield, headlights, and tail lamps as template initial registration areas.

Figure 5:
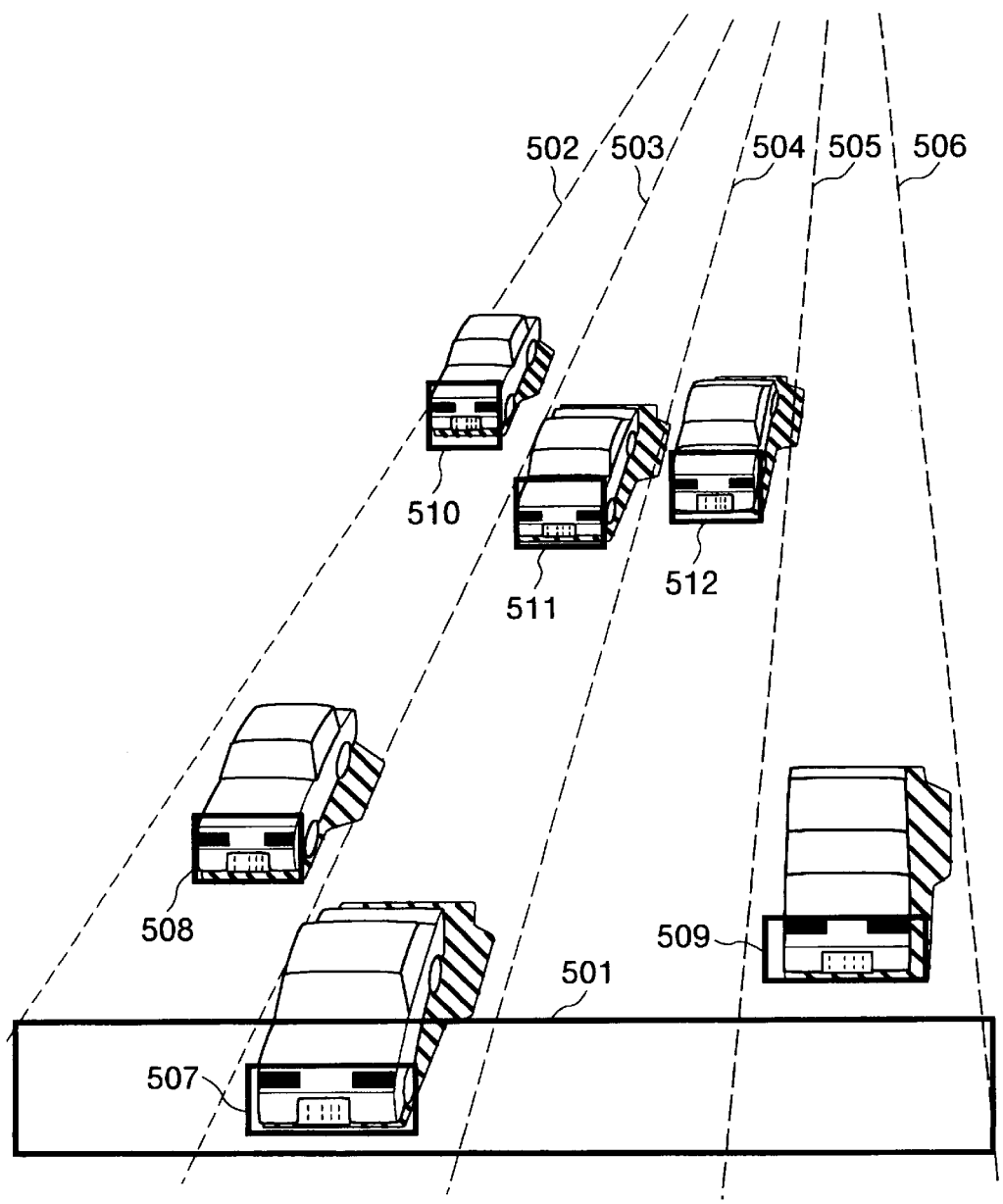
FIG. 5 is a view showing an example of an overlooked road image of a four-lane road photographed by the traffic flow monitor apparatus according to the present invention.

FIG. 5 is a view showing an example of an overlooked road image of a four-lane road photographed by the traffic flow monitor apparatus in FIG. 2. An image analysis area 501 illustrated at the lower portion of the drawing is set to cross the road. In the four-lane road, the first, second, third, and fourth lanes which are divided by the lane division lines 502 to 506 are arranged from the left side of the drawing. The lane division lines 502 to 506 are held in the main memory 203 in FIG. 2 as a primary approximate expression or a polynomial approximate expression. Here, for example, it is assumed that the lane division lines 502 to 506 are held as primary equation 1 to equation 5. In these equations, x is a coordinate in the horizontal direction on the screen, and y is a coordinate in the vertical direction on the screen. In addition, a1, a2, a3, a4, and a5 are inclinations of the straight lines of the lane division lines 502 to 506, and b1, b2, b3, b4, and b5 are y-intercepts of the straight lines of the lane division lines 502 to 506.

$$x=(y-b1)/(a1) \quad (1)$$

$$x=(y-b2)/(a2) \quad (2)$$

$$x=(y-b3)/(a3) \quad (3)$$

$$x=(y-b4)/(a4) \quad (4)$$

$$x=(y-b5)/(a5) \quad (5)$$

Rectangular frames 507 to 512 of the rear portions of the vehicles in FIG. 5 indicate portions which are tracked by the pattern matching of the vehicles in tracking. In the image analysis 102 in FIG. 1, a template position is determined on the basis of the coordinates of a detected vehicle candidate, and the "tracking state flag" is set to 2.

The condition branch 112 becomes true if the "tracking state flag" is 2, control branches to the template initial registration 103 to check "initial registration coordinates". If the initial registration coordinates are not excessively close to the coordinates on the latest image in another column in tracking, the corresponding area of the image to be processed is cut by the initial registration coordinates, and the area is held in the image memory 205 as a template. In addition, image input time is recorded at "initial registration time", the "tracking state flag" is set to 1 to indicate that initial registration has been completed, and the "in-tracking flag" which indicates that control is tracking is set to 1.

When the "initial registration coordinates" are excessively close to the coordinates on the latest image of another column, no registration operation is performed, the "tracking state flag" and "in-tracking flag" are set to 0. With this process, the "initial registration coordinates" are not employed as a template.

The condition branches 113 and 114 become true if the "tracking state flag" and "in-tracking flag" are 1, and control branches to the template tracking 104 and the template updating 105.

In the template tracking 104, a pattern matching process is performed by the template of the corresponding column, vehicle detection coordinates are recorded as the "coordinates on latest image", and time at which the processed image is input is recorded as the "latest image input time". A lane to which the vehicle belongs is determined on the basis of the "coordinates on latest image", and the lane is recorded as the "latest existence lane" of this column. For example, when the coordinates on the latest image are (xp,yp), and equations 1 to 5 are used, the x-coordinates of the lane division lines 502 to 506 are expressed by equation 6 to 10. Note that xp1, xp2, xp3, xp4, and xp5 represent x-coordinates of the lane division lines 502 to 506.

$$xp1=(yp-b1)/(a1) \quad (6)$$

$$xp2=(yp-b2)/(a2) \quad (7)$$

$$xp3=(yp-b3)/(a3) \quad (8)$$

$$xp4=(yp-b4)/(a4) \quad (9)$$

$$xp5=(yp-b5)/(a5) \quad (10)$$

When the x-coordinates xp, xp1, xp2, xp3, xp4, and xp5 are compared with each other, a lane to which the vehicle belongs can be determined. In addition, the "image input time 1 cycle before" to the "image input time p cycle before" of the column, the "vehicle detection coordinates 1 cycle before" to the "vehicle detection coordinates p cycles before" of the column, and the "vehicle existence lane 1 cycle before" to the "vehicle existence lane p cycles before" of the column n are updated.

In the pattern matching process, when the template sticks out from the image, or the degree of similarity of matching is low, only the "in-tracking flag" of the column is set to 0 to indicate the end of the tracking operation. The column upon completion of the tracking operation is counted as a passing vehicle in the vehicle counting and zone speed measurement 109 (to be described later) to calculate a zone speed, and the "tracking state flag" of the tracking management table is set to 0. Therefore, the column is set in an initial state, and a new vehicle can be tracked.

In the pattern matching process in the template tracking 104, a target image is scanned by a template image, the difference between both the images or the degree of similarity between both the images is calculated, and a portion in the target image which is closest to the template image is found. As a method of calculating the difference, a met hod expressed by equation 11 is used. Note that D represents the difference between the target image and the template image at coordinates (x, y); m and n represent the number of pixels in the horizontal direction of the template and the number of pixels in the vertical direction of the template, respectively; x and y represent variables used when the target image is scanned by the template, respectively; and i and g are variables used when the difference is calculated, respectively. Coordinates (x, y) at which the difference D is minimum are the coordinates of the vehicle to be tracked.

$$D(x, y) = \sum_{i}^{m} \sum_{j}^{n} |f(x+i, y+j) - t(i, j)| \quad (11)$$

As a method of calculating the degree of similarity, a method using density normalization correlation represented by equation 12 is used. Symbol S represents correlation between the target image and the template image at the coordinates (x, y), and is set to a value ranging from 0 to 1. In general, when S is 0.7 or more, coincidence is determined; and when S is less than 0.7, incoincidence is determined. In equation 12, m and n represent the number of pixels in the horizontal direction of the template and the number of pixels in the vertical direction of the template, respectively; x and y represent variables used when the target image is scanned by the template, respectively; and i and j are variables used when the correlation is calculated, respectively. Coordinates (x, y) at which the correlation S is maximum are the coordinates of a vehicle to be tracked.

the vehicle on the screen increases or decreases. Therefore, the template size must be reset to an appropriate size in template updating.

FIGS. 6(*a*) and 6(*b*) are views for explaining an enlargement (reduction) process of a template size when a template is updated in the traffic flow monitor apparatus in FIG. 2. FIG. 6(*a*) shows a lane division line 1001, a lane division lane 1002, and template frames 1003 to 1009. Although the actual lane division lines 1001 and 1002 are parallel to each other, the lanes decrease in width upward on the screen. The template frames 1003 to 1009 are obtained such that a certain template frame is enlarged or reduced depending on the interval between the lane division line 1001 and the lane division lane 1002. For example, the size of the template registered near the TV camera 300, i.e, the lower portion of the screen is equal to that of the template frame 1003, and the template frames 1004, 1005, . . . , 1009 gradually increase in size toward the position distanced from the camera. The size of a template registered at the position distanced from the TV camera 300, i.e., on the upper portion of the screen is equal to that of the template frame 1009, and the template frames 1008, 1007, . . . , 1003 gradually decrease in size toward the position close to the camera.

When the template sizes corresponding positions on the screen, as shown in FIG. 6(*b*), are calculated in advance and held as a list, an amount of calculation for setting the template sizes can be reduced, and the processing speed can be made high.

As described above, in the traffic flow monitor apparatus, in order to sequentially reset the size of the template frame to an appropriate size in template updating, a vehicle can be tracked at high precision over the wide range from the position near the TV camera 300 to the position distanced from the TV camera 300.

In the condition branch 115 in FIG. 1, if the "tracking state flag" and the "in-tracking flag" are 1, control branches to the instantaneous speed measurement 106 to calculate the instantaneous speed of the vehicle in tracking.

Figure 7:
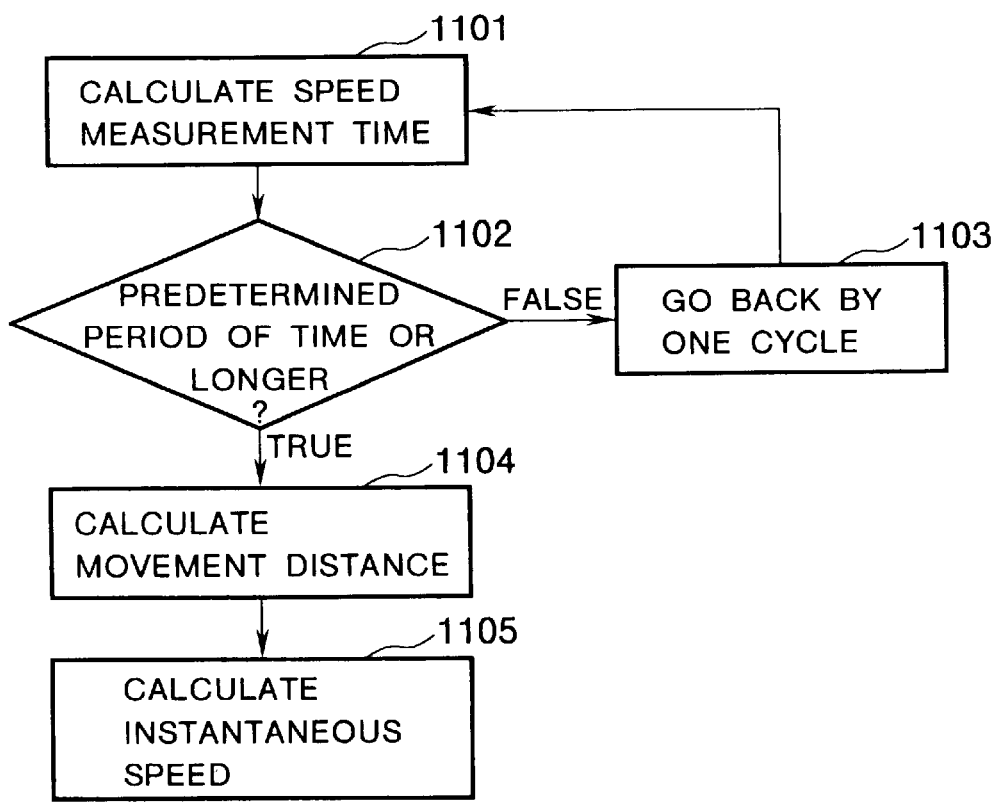
FIG. 7 is a flow chart for explaining a processing procedure for calculating an instantaneous speed in the traffic flow monitor apparatus according to the present invention.

FIG. 7 is a flow chart showing a procedure of calculating an instantaneous speed.

Step 1101: The difference between the "latest image input time" of the tracking management table in FIG. 4 and the "image input time 1 cycle before" is used to calculate a speed measurement time.

Step 1102: If the speed measurement time is shorter then a predetermined period of time, the flow goes back to by 1 cycle in step 1103, the flow returns to step 1101 to calculate the difference between the "latest image input time" in the tracking management table FIG. 4 and "image input time 2 cycles before", thereby calculating the speed measurement time. Similarly, the flow goes back to by the p cycles, so that $$S(x, y) = \frac{mn \sum_{i}^{m} \sum_{j}^{n} f(x+i, y+j) t(i, j) - \left(\sum_{i}^{m} \sum_{j}^{n} f(x+i, y+j)\right)\left(\sum_{i}^{m} \sum_{j}^{n} t(i, j)\right)}{\sqrt{\left[mn \sum_{i}^{m} \sum_{j}^{n} f(x+i, y+j)^2 - \left(\sum_{i}^{m} \sum_{j}^{n} f(x+i, y+j)\right)^2\right]\left[mn \sum_{i}^{m} \sum_{j}^{n} t(i, j)^2 - \left(\sum_{i}^{m} \sum_{j}^{n} t(i, j)\right)^2\right]}} \quad (12)$$

In the template updating 105, an image having a template size is cut from a position indicated by the coordinates on the latest image obtained in the template tracking 104, and the image is held in the image memory 205 in FIG. 2 as a new template. The vehicle may leave from a position near the TV camera 300 or approaches the TV camera 300 from a position distanced from the camera. Accordingly, the size of the speed measurement time is set to be the predetermined period of time or longer. On the other hand, when the speed measurement time is longer than the predetermined period of time, the flow shifts to step 1104.

Step 1104: The movement distance of a vehicle is calculated on the basis of the vehicle position on the image used for calculating the speed measurement time.

Step 1105: The instantaneous speed of the vehicle is calculated on the basis of the speed measurement time and the movement distance.

As described above, in the traffic flow monitor apparatus, the speed is measured in the movement distance within a period of time longer than the predetermined period of time. For this reason, the instantaneous speed can be obtained at stable precision. Here, the predetermined period of time is preferably set to several hundred milliseconds with respect to a vehicle located near the TV camera 300, and the predetermined period of time is properly set to several seconds with respect to a vehicle located at a position distanced from the TV camera 300.

In the condition branch 116 in FIG. 1 , the "tracking state flag" and "in-tracking flag" are 1, control branches to the lane change detection 107 to detect a change in lane of a vehicle in tracking.

In the lane change detection 107, a "vehicle existence lane q cycles before" is searched on the basis of the "latest existence lane" and the "vehicle existence lane" of the column in the tracking management table in FIG. 4 to check the presence/absence of the change in lane.

At the condition branch 117, if the "tracking state flags" and the "in-tracking flag" are 1, control branches to the vehicle length measurement 108 to measure the length of the vehicle.

Figure 8A:
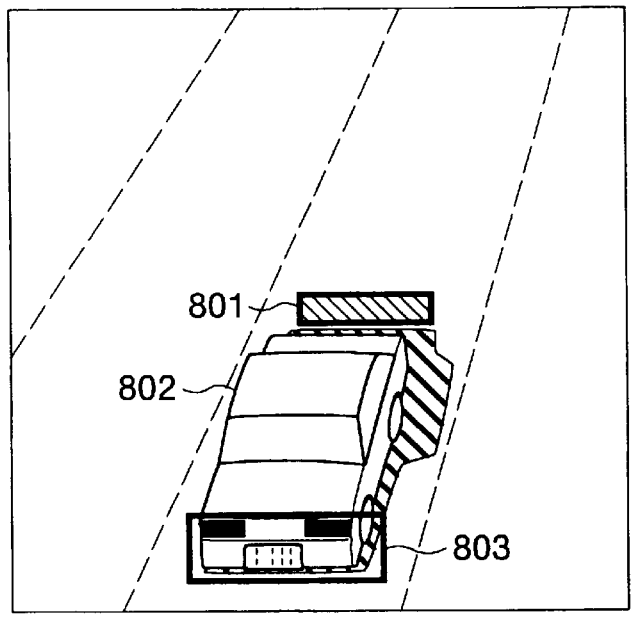
FIGS. 8(a) and 8(b) are views showing a procedure for measuring the length of a vehicle while tracking the vehicle leaving from a position near a camera in the traffic flow monitor apparatus according to the present invention.
Figure 8B:
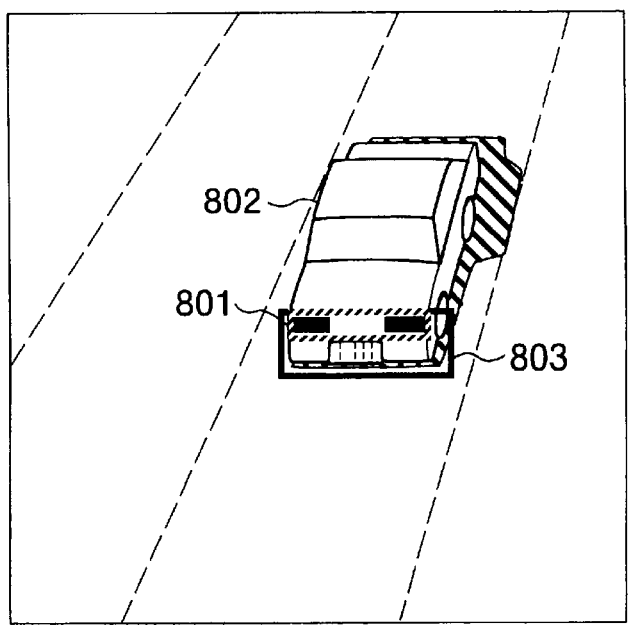

FIGS. 8(*a*) and 8(*b*) are views showing a method of measuring the length of a vehicle while tracking the vehicle leaving from a position near the TV camera 300 in the traffic flow monitor apparatus according to the present invention. FIGS. 8(*a*) and 8(*b*) show a road luminance pattern collation area 801, a running vehicle 802, and a portion 803 tracked by pattern matching. One or more road luminance pattern collation areas 801 are set for each vehicle to cross the lanes, hold the luminance distribution on the road as a template in advance, and calculate correlation between an input image and the template every time a new image is input. As shown in FIG. 8(*a*), when the road luminance pattern collation area 801 is not covered with the vehicle 802, the correlation value becomes high. As shown in FIG. 8(*b*), the moment the road luminance pattern collation area 801 is covered with the vehicle 802, the correlation value becomes low. The length of the vehicle 802 can be calculated on the basis of the road luminance pattern collation area 801 at the moment the correlation value becomes low and the position of the portion 803 tracked by pattern matching.

Figure 9A:
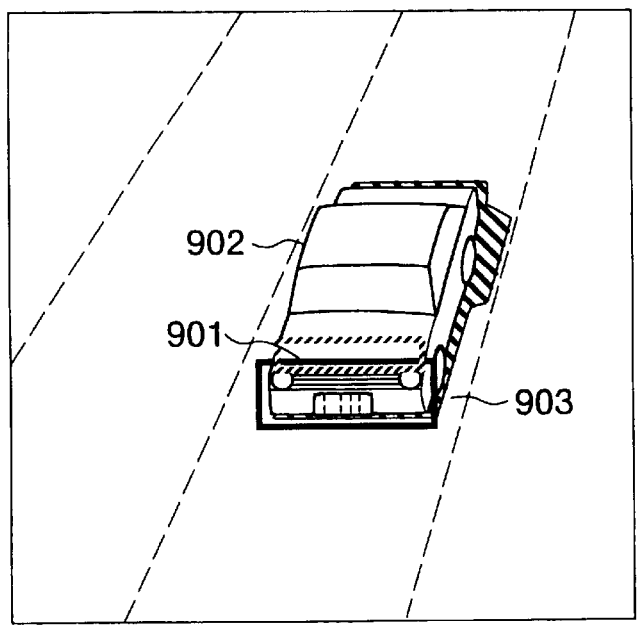
FIGS. 9(a) and 9(b) are views showing a procedure for measuring the length of a vehicle while tracking the vehicle approaching the camera from a position distanced from the camera in the traffic flow monitor apparatus according to the present invention.
Figure 9B:
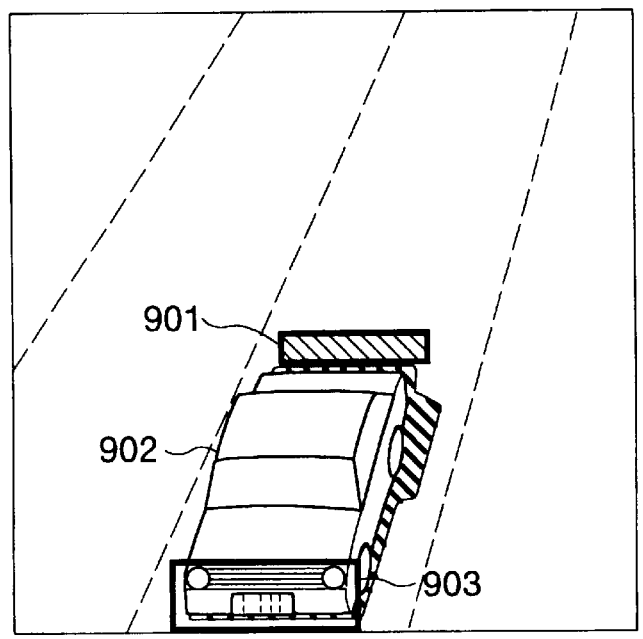

FIGS. 9(*a*) and 9(*b*) are views showing a method of measuring the length of a vehicle while tracking the vehicle approaching the TV camera 300 from a position distanced from the camera in the traffic flow monitor apparatus according to the present invention. FIGS. 9(*a*) and 9(*b*) show a road luminance pattern collation area 901, a running vehicle 902, and a portion 903 tracked by pattern matching. One or more road luminance pattern collation areas 901 are set for each vehicle to cross the lanes, hold the luminance distribution on the road as a template in advance, and calculate correlation between an input image and the template every time a new image is input. As shown in FIG. 9(*a*), when the road luminance pattern collation area 901 is covered with the vehicle 902, the correlation value becomes low. As shown in FIG. 9(*b*), the moment the road luminance pattern collation area 901 appears from behind the vehicle 902 the correlation value becomes high.

The length of the vehicle 902 can be calculated on the basis of the road luminance pattern collation area 901 at the moment the correlation value becomes high and the position of the portion 903 tracked by pattern matching. According to the above methods of measuring a vehicle length, even if start and stop of the vehicle are repeated on the road luminance pattern collation areas 801 and 901, measurement precision is not influenced.

In the condition branch 118 in FIG. 1, if the "tracking state flag" and the "in-tracking flag are 1, and the total movement distance of the vehicle exceeds a predetermined distance, control branches to the vehicle counting and zone speed measurement 109 to count vehicles passing through each lane and calculate a zone speed.

The total movement amount can be calculated on the basis of the initial registration coordinates and coordinates on latest image of the corresponding column in the tracking management table in FIG. 4. A total tracking time can be calculated on the basis of the initial registration time and latest image input time of the corresponding column in the tracking management table. The zone speed can be measured as an average speed on the basis of the total movement distance and the total tracking time. In addition, on the basis of the latest existence lane of the corresponding column in the tracking management table, the number of vehicles passing through the corresponding lane can be calculated.

If the condition branches 119 and 120 in FIG. 1 are true, controls branch to the measurement result communication 110 and the measurement result accumulation 111 to accumulate and communicate the various traffic events and traffic indexes which have been measured. The condition branches 119 and 120 have different conditions depending on the timings of communication and accumulation. For example, communication and accumulation are performed every predetermined time, passage of the predetermined period of time is used as the condition. When communication and accumulation are performed in a method of an event driving type, an abnormal instantaneous speed or the occurrence or end of a lane change or vehicle tracking is used as the condition.

In the embodiment in FIG. 2 , an image for calculation in the CPU 201 need not be a color image. When a monochrome image is used, an amount of transmitted image information and a calculation amount in the CPU 201 become small, and high-speed processing can be performed. Therefore, a color image from the TV camera 300 is directly transmitted as an image displayed for visual recognition of an operator in the control room, and a monochrome image can be received as an image for calculation in the CPU 201.

According to Embodiment 1 of the present invention, characteristic portions such as the front or rear portion of a vehicle is captured and tracked by pattern matching. For this reason, a reference image of a portion of the road in which no vehicle exists is not required, and the tracking is not influenced by approaching of another vehicle and overlapping between these vehicles. For this reason, in light traffic as a matter of course, even in heavy traffic, a traffic flow can be monitored at high precision. When a template is updated, a template size is enlarged or reduced by using the interval between lane division lines. For this reason, vehicles can be stably tracked by using a template having an appropriate size in the range from the near position to the distant position.

Embodiment 2

A traffic flow monitor apparatus according to Embodiment 2 of the present invention will be described below with reference to FIGS. 1 to 23.

Figure 11:
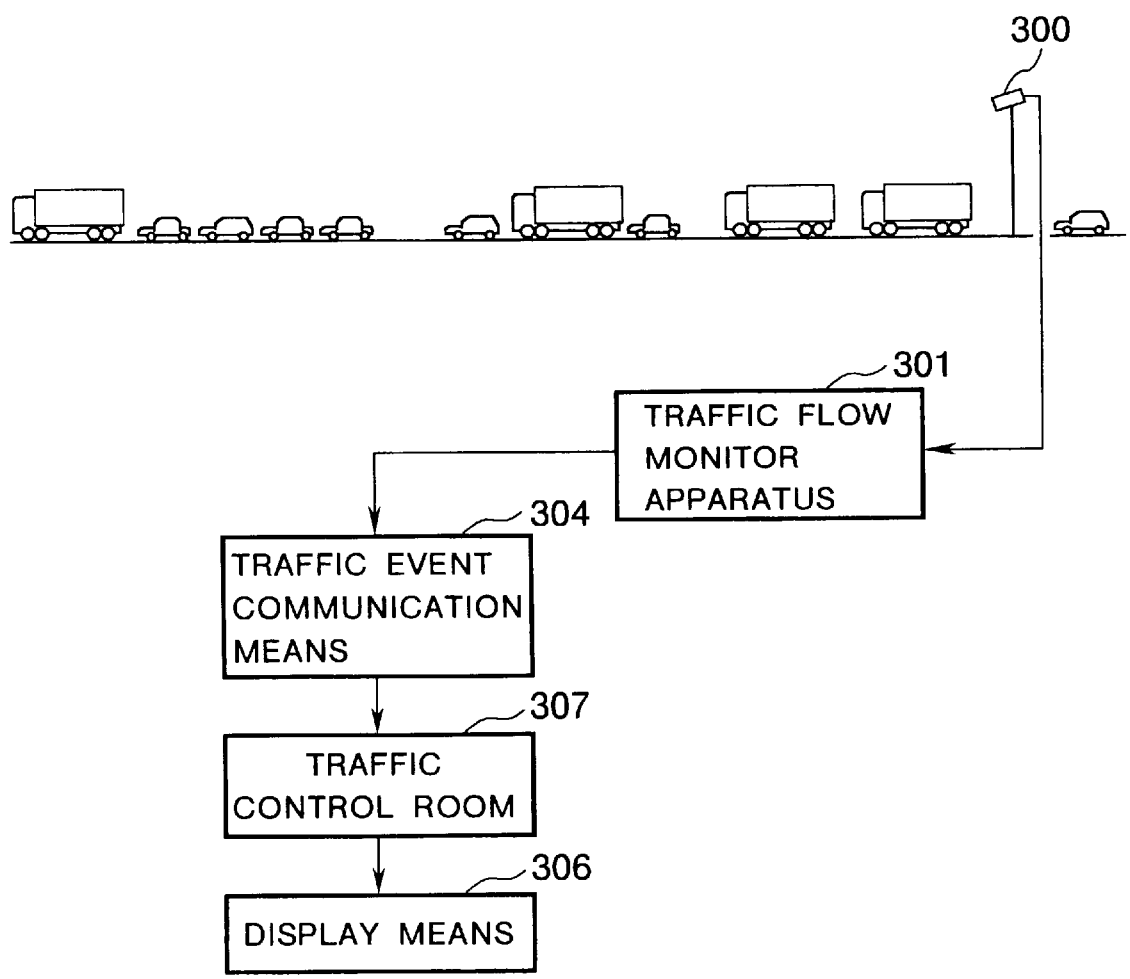
FIG. 11 is a block diagram showing an example of a system arrangement of a traffic flow monitor system to which Embodiment 2 or 3 is to be applied.

FIG. 11 is a block diagram showing an example of a system arrangement of a traffic flow monitor system to which the present invention is to be applied. A traffic flow monitor apparatus 301 in Embodiment 2 processes an overlooked road image photographed by a TV camera 300 set on the upper portion of a pole built along the road, measures an average speed of small areas classified for lanes, determines the presence/absence of traffic jam, transmits a traffic jam determination result to a traffic control room 307 through a traffic event communication means 304, and/or displays the result on a display means 306.

FIG. 2 is a block diagram showing the arrangement of the traffic flow monitor apparatus according to Embodiment 2 of the present invention. The traffic flow monitor apparatus 301 according to Embodiment 2 comprises a CPU 201, a man-machine interface 202 used to allow an operator to operate the CPU 201, a main memory 203 serving as a memory for storing a program of the CPU 201 therein and also serving as an operation memory, an image input means 206 for receiving an image under the control of the CPU 201 to convert the image into a digital value, an image processing means 204 for processing an image under the control of the CPU 201, and an image memory 205 which holds the digital image obtained by the image input means 206 and also serves as an operation memory for the image processing means 204. The image processing means 204 image-analyzes an image analysis area (to be described later), detects a luminance pattern of the front or rear portion of a vehicle, and performs a pattern matching process by using the luminance pattern as a template.

Figure 10:
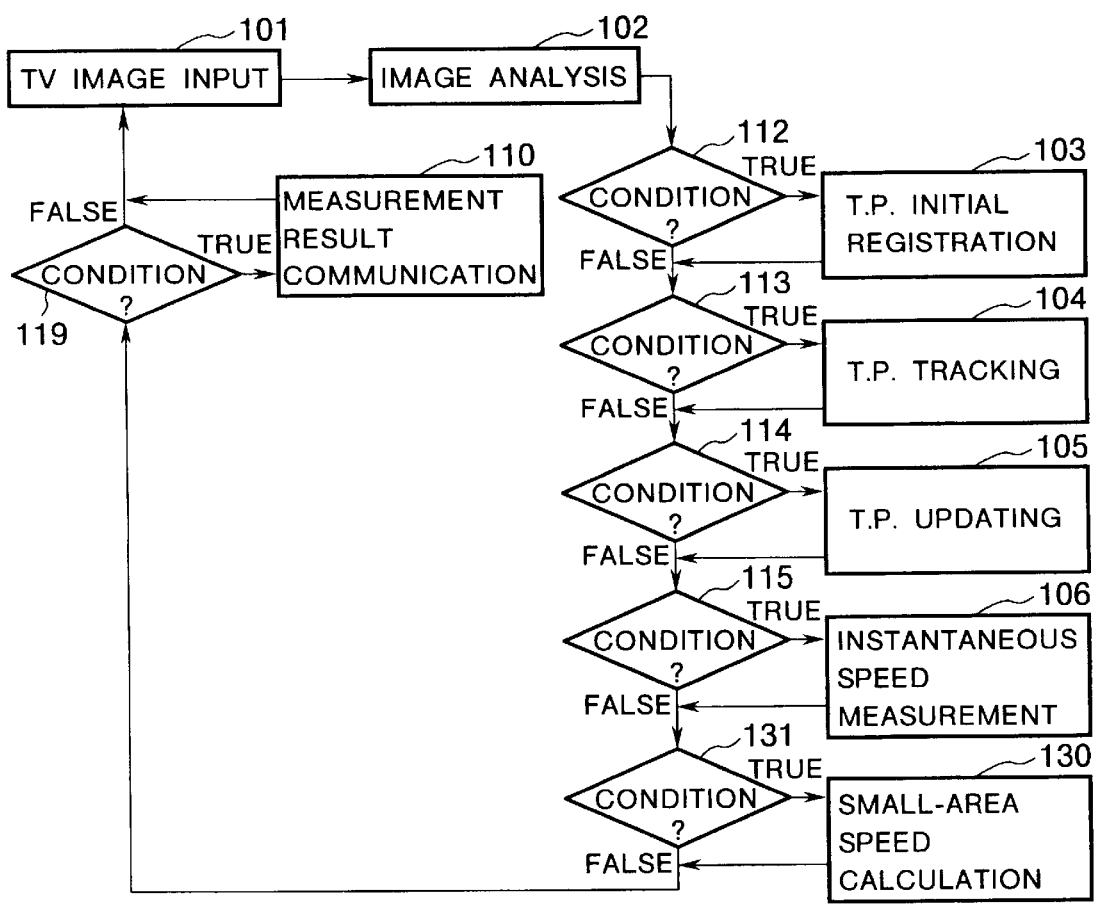
FIG. 10 is a flow chart showing an example of a processing procedure in a traffic flow monitor apparatus according to Embodiment 2 of the present invention.

FIG. 10 is a flow chart showing an example of a processing procedure in a traffic flow monitor apparatus according to Embodiment 2 of the present invention. In this processing procedure, basically, TV image input 101 and image analysis 102 are cyclically repeated. When predetermined conditions are satisfied every cycle through the condition branches 112 to 115, 113, and 119, template initial registration (T.P. initial registration) 103, vehicle template tracking (T.P. tracking) 104, template updating (T.P. updating) 105, instantaneous speed measurement 106, speed field calculation for each area 130, and measurement result communication 110 are executed. The condition branches 112 to 115, 131, and 119 will be described later together with a vehicle tracking process.

Figure 12:
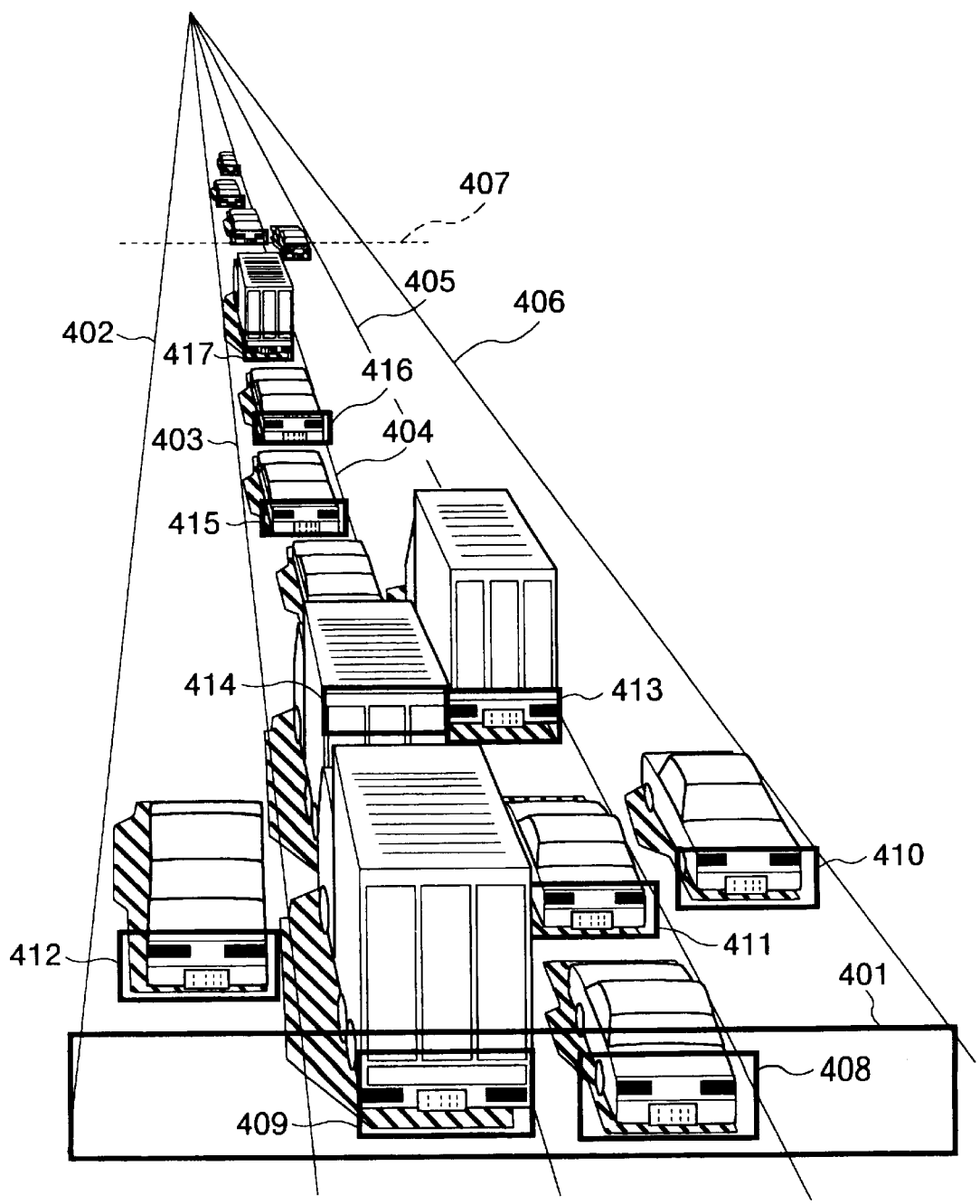
FIG. 12 is a view showing an example of an overlooked road image of a four-lane road.

FIG. 12 is a view showing an example of an overlooked road image of a four-lane road. More specifically, FIG. 12 shows a state in which the rear portion of a vehicle is initially registered in an image analysis area 401. Rectangular frames 408 to 417 indicate portions tracked by pattern matching. In this case, the four-lane road is divided by lane division lines 402 to 406 into the first, second, third, and fourth lanes which are arranged from the left side of the drawing. The lane division lines 402 to 406 are held in the main memory 205 in FIG. 2 as a primary approximate expression or a polynomial approximate expression. Here, for example, it is assumed that the lane division lines 402 to 406 are held as primary equation 1 to equation 5. In these equations, x is a coordinate in the horizontal direction on the screen, and y is a coordinate in the vertical direction on the screen. In addition, a1, a2, a3, a4, and a5 are inclinations of the straight lines of the lane division lines 402 to 406, and b1, b2, b3, b4, and b5 are y-intercepts of the straight lines of the lane division lines 402 to 406.

A tracking limit line 407 indicates a limit line of vehicle tracking performed by pattern matching. When a vehicle in tracking passes through the tracking limit line 407, the tracking is ended. This is because, when the vehicle is to be tracked over the tracking limit line, many matching errors and incorrect tracking occur. On the basis of the movement distances of the rectangular frames 408 to 417 and time information, the instantaneous speeds of vehicles passing through the position can be calculated.

Figure 13A:
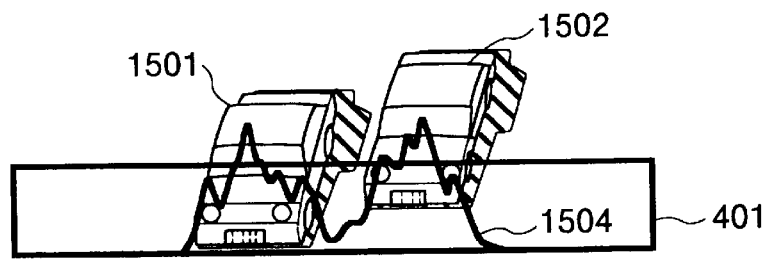
FIGS. 13(a) to 13(c) are views showing an example of an image analysis method for capturing the front or rear portion of a vehicle in an image analysis area.
Figure 13B:
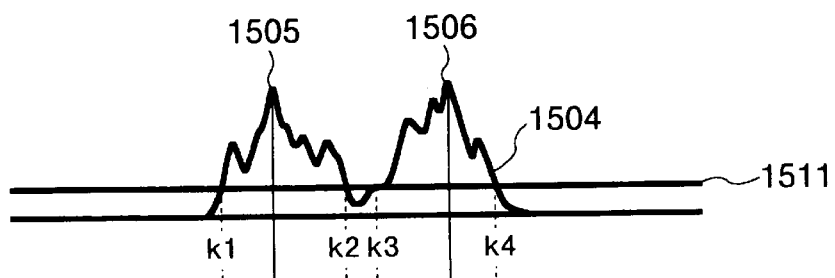
Figure 13C:
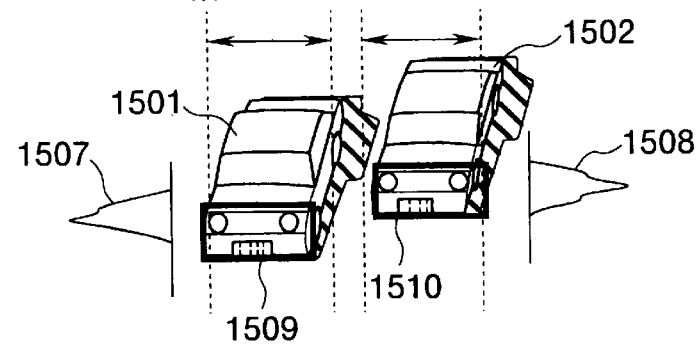

FIGS. 13(a) to 13(c) are views showing an example of an image analysis method for capturing the front or rear portion of a vehicle in the image analysis area 401, and show a waveform 1504 obtained when vehicles 1501 and 1502 enter the image analysis area 401. The waveform 1504 is made one-dimensional data such that data differentiated in the vertical direction in the image analysis area 401 are projected in the vertical direction to be added to each other. The one-dimensional data increases when the number of horizontal edges of the front or rear portion of the vehicle is large. When a threshold value 1511 is determined with respect to the waveform 1504, portions higher than the threshold value are indicated by k1 to k2 and k3 to k4. When a template which tracks the vehicle 1501 at the position having a maximum value 1505 in the zone between k1 and k2 as a center is cut, the horizontal position of an area 1509. When a template which tracks the vehicle 1502 at the position having a maximum value 1506 in the zone between k3 and k4 as a center is cut, the horizontal position of an area 1510 is determined. Positioning of the template cut area 1509 or 1510 in the vertical direction is performed in the following manner. That is, vertically differentiated images in the zone between k1 and k2 and the zone between k3 and k4 are projected in the horizontal direction to form waveforms 1507 and 1508, and the maximum values of the waveforms 1507 and 1508 are determined as centers.

This image analysis method is suitable for a situation having brightness at which a vehicle can be sufficiently seen. In contrast to this, when the body cannot be easily seen at night, and almost vehicles turn on lights, a method of capturing the pair of left and right lights of each vehicle is effective. When the pair of lights are to be captured, in the image analysis area 401, as a preprocess, a minimum value filter is multiplied several times, and the maximum value filter is multiplied the same number of times to calculate the difference between the image and the original image. When this preprocess is performed, light spreading by road reflection can be effectively removed.

Figure 14A:
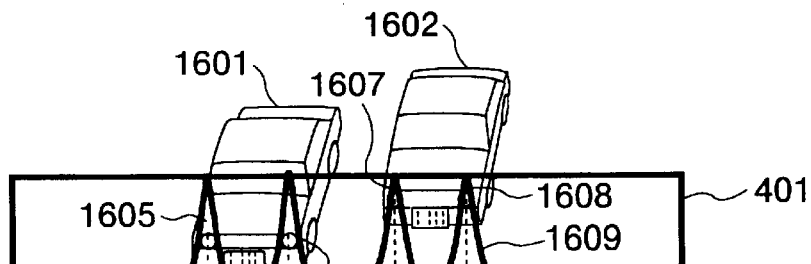
FIGS. 14(a) to 14(c) are views showing a process for capturing a pair of lights.
Figure 14B:
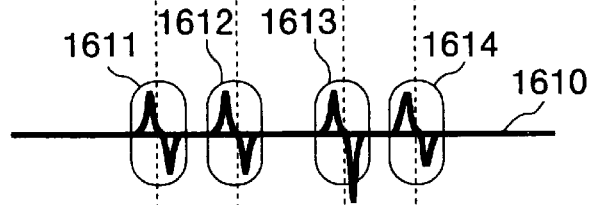
Figure 14C:
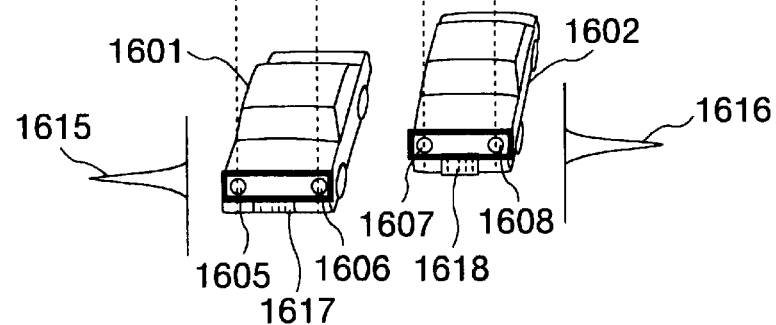

FIGS. 14(a) to 14(c) are views showing a process for capturing a pair of lights. FIG. 14(a) shows a state in which vehicles 1601 and 1602 enter the image analysis area 401. At night, only four lights 1605 to 1608 of two vehicles appear on an actual image. When the luminance distributions of the light image are projected and added to each other in the vertical direction in the image analysis area 401, a waveform 1609 can be obtained, and four peaks corresponding to the lights 1605 to 1609 are generated. At this time, when the above preprocess is performed, i.e., the minimum filter and the maximum filter are used, light spreading by road reflection can be effectively removed, and contrast among the four peaks can be increased. FIG. 14(b) shows a waveform obtained by differentiating the light 1609 in the horizontal direction once. Positive and negative peak pairs 1611 to 1614 are generated in correspondence with the lights 1605 to 1608. The horizontal coordinate of each light coincides with the coordinate of the zero crossing of each peak pair. FIG. 14(c) shows a process of confirming the vertical coordinate of a light whose horizontal coordinate is determined. For example, luminance is projected and added in the horizontal direction near the horizontal coordinate of a light 1617 to obtain a waveform 1615, and the peak of the waveform 1615 is set as a vertical coordinate. However, when the road is wet by rain, reflected light of the light appears in front of the vehicle, and the reflected light is easily picked up. For this reason, when the waveform 1615 is calculated, an addition area is preferably enlarged in excess in the vertical upper direction.

In the descriptions of the image processes in FIGS. 13 and 14, a vehicle is photographed from the back of the vehicle to perform image analysis of the characteristics of the rear portion of the vehicle. However, it is apparent that the vehicle may be photographed from the front of the vehicle to perform image analysis of the characteristics of the front portion of the vehicle.

Figure 15:
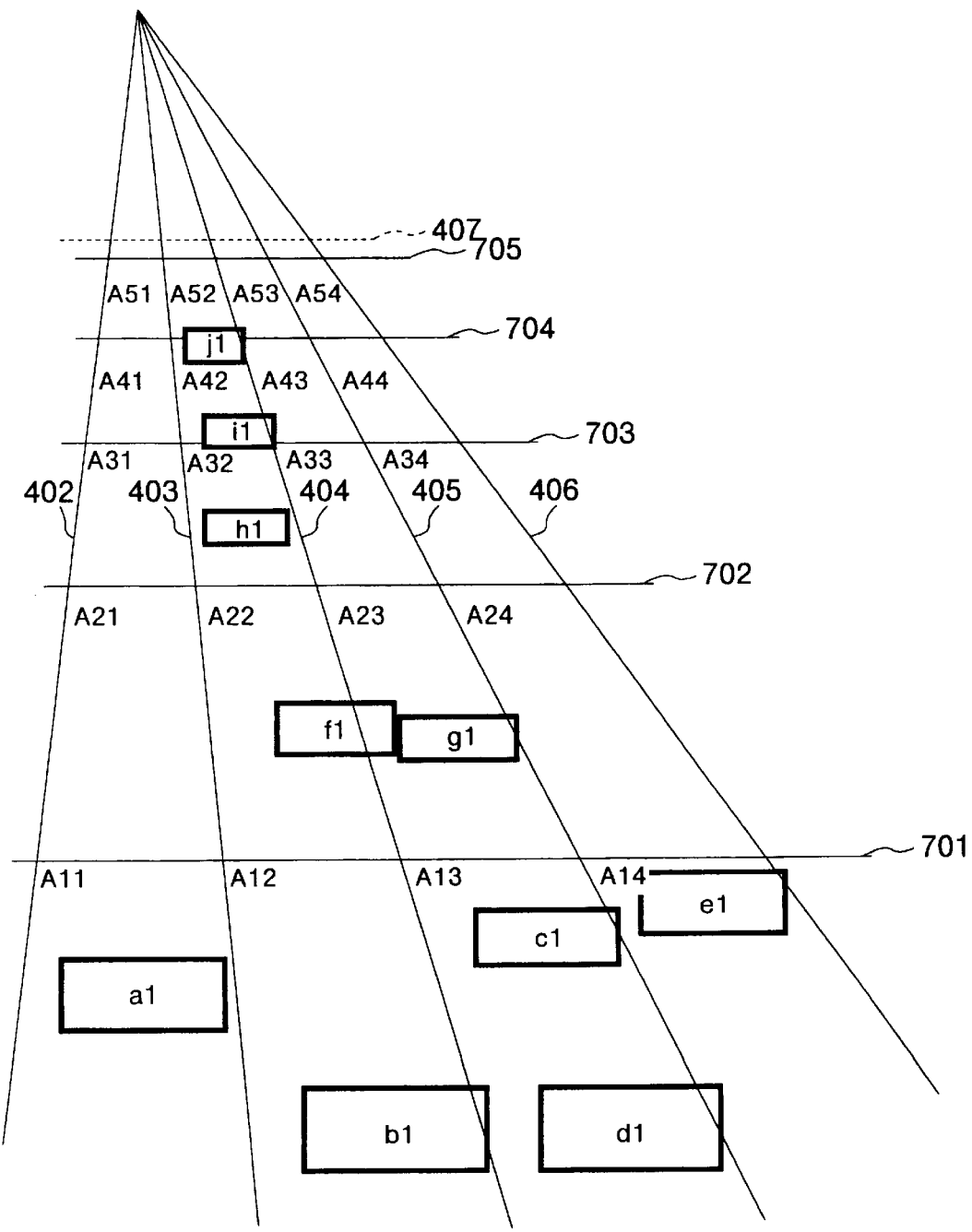
FIG. 15 is a view showing an example of the arrangement of small areas for calculating a speed field with respect to a vehicle which is subjected to image analysis and tracked.

FIG. 15 is a view for explaining a method of calculating the instantaneous speed and average speed of each small area. The instantaneous speed and average speed of the small area are amounts for evaluating the flow of a vehicle in the small areas. Subsequently, the instantaneous speed of a small area is called an instantaneous speed field, and the average speed of a small area is called a speed field of the small area. Small areas A11, A12, . . . , A53, and A54 are partitioned by lane division lines 402 to 406 and lines 701 to 705. FIG. 15 also shows the tracking limit line 407 and rectangular frames of portions where vehicles are tracked by pattern matching. The details of a procedure of calculating instantaneous speeds a1, b1, i1, and j1 of the rectangular frames will be described later. As in the small areas A11, A12, A14, A22, A23, and A32 in FIG. 15, one vehicle exists in one area, the instantaneous speed of the vehicle is defined as the instantaneous speed of the small area. More specifically, the instantaneous speed fields of the small areas are represented by a1, b1, e1, f1, g1, and h1, respectively. On the other hand, as in the small areas A13 and A42, when a plurality of vehicles exist in one area, the average value of the instantaneous speeds of the existing vehicles are defined as the instantaneous speed field of the small area. More specifically, the instantaneous speed field of the small area A13 is the average value between c1 and d1, and the instantaneous speed field of the small area A42 is the average value between i1 and j1.

Figure 16:
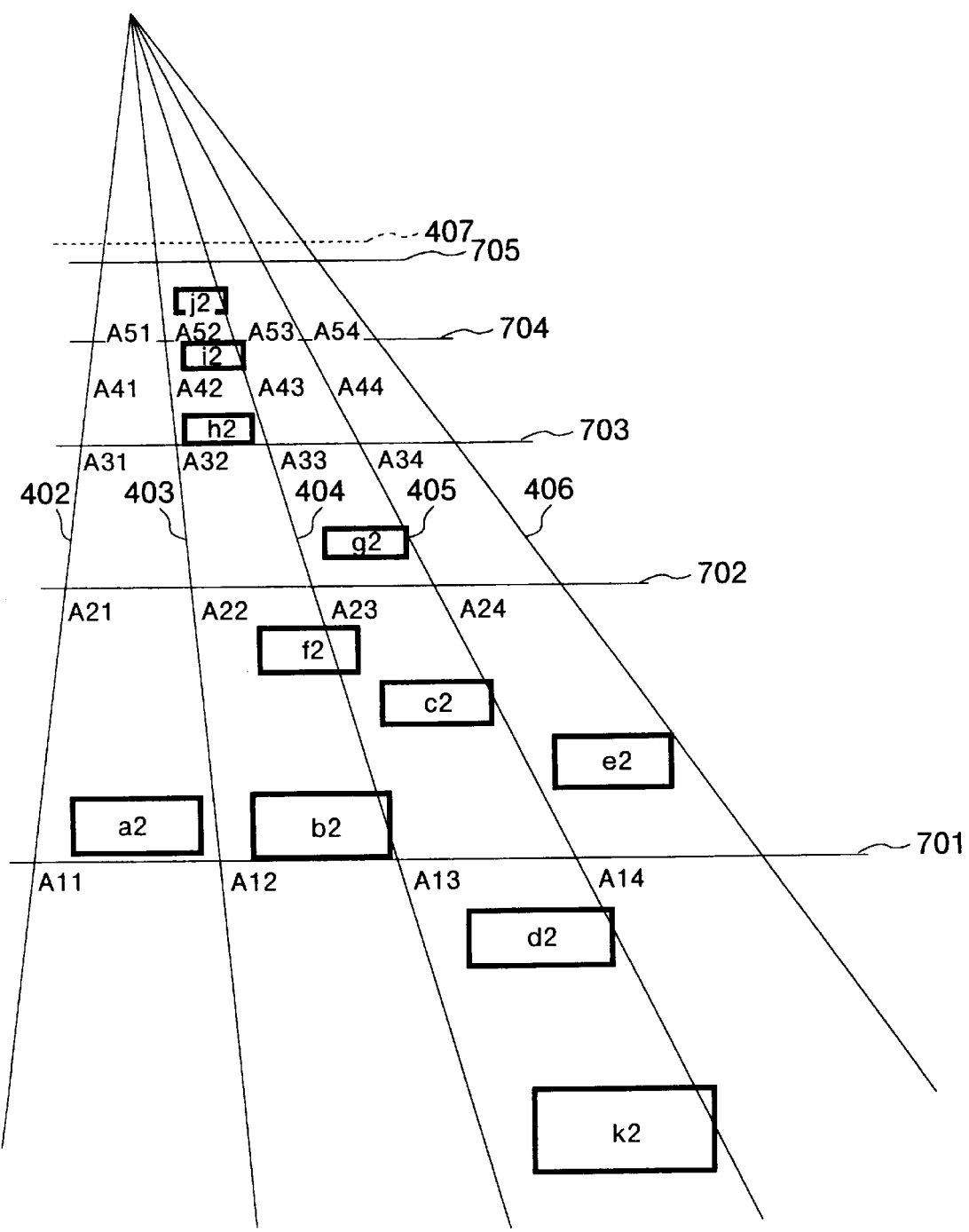
FIG. 16 is a view showing a state obtained several seconds after the state shown in FIG. 15.

FIG. 16 is a view showing the arrangement of small areas and rectangular frames in tracking several seconds after. In this case, the instantaneous speed fields of the small areas A21, A23, A24, A33, and A52 are updated to a2, c2, e2, g2, and j2, respectively, and the instantaneous speed fields of the small areas A13, A22, and A42 are updated to the average between d2 and k2, the average between b2 and f2, and the average between h2 and i2. As in the small areas A11 and A12, when no rectangular frame in tracking exists, the instantaneous speed field which has been used is held.

Figure 17:
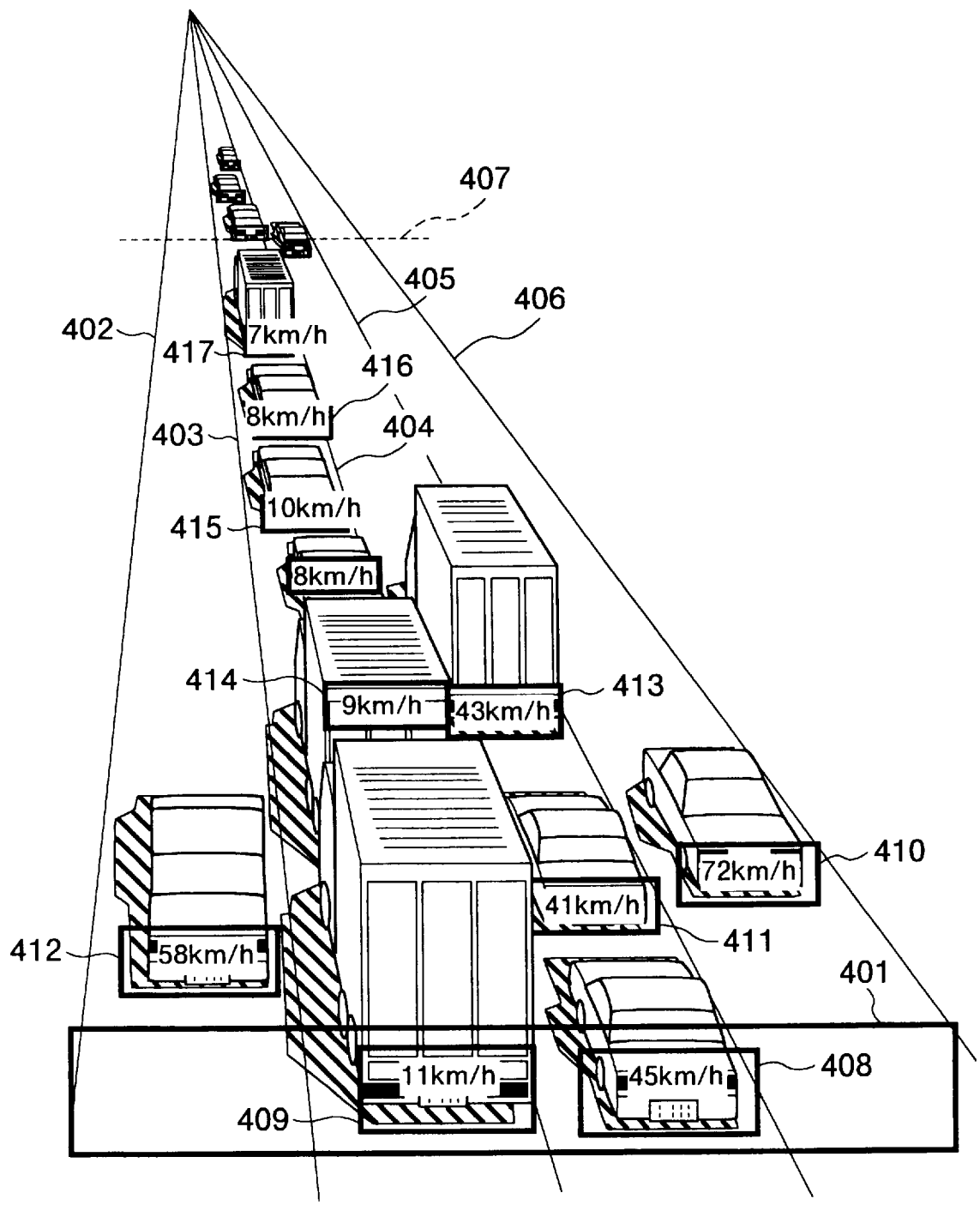
FIG. 17 is a view showing an example in which the speed fields of vehicles overlapping the overlooked road image of the four-lane road in FIG. 12 are displayed.
Figure 18:
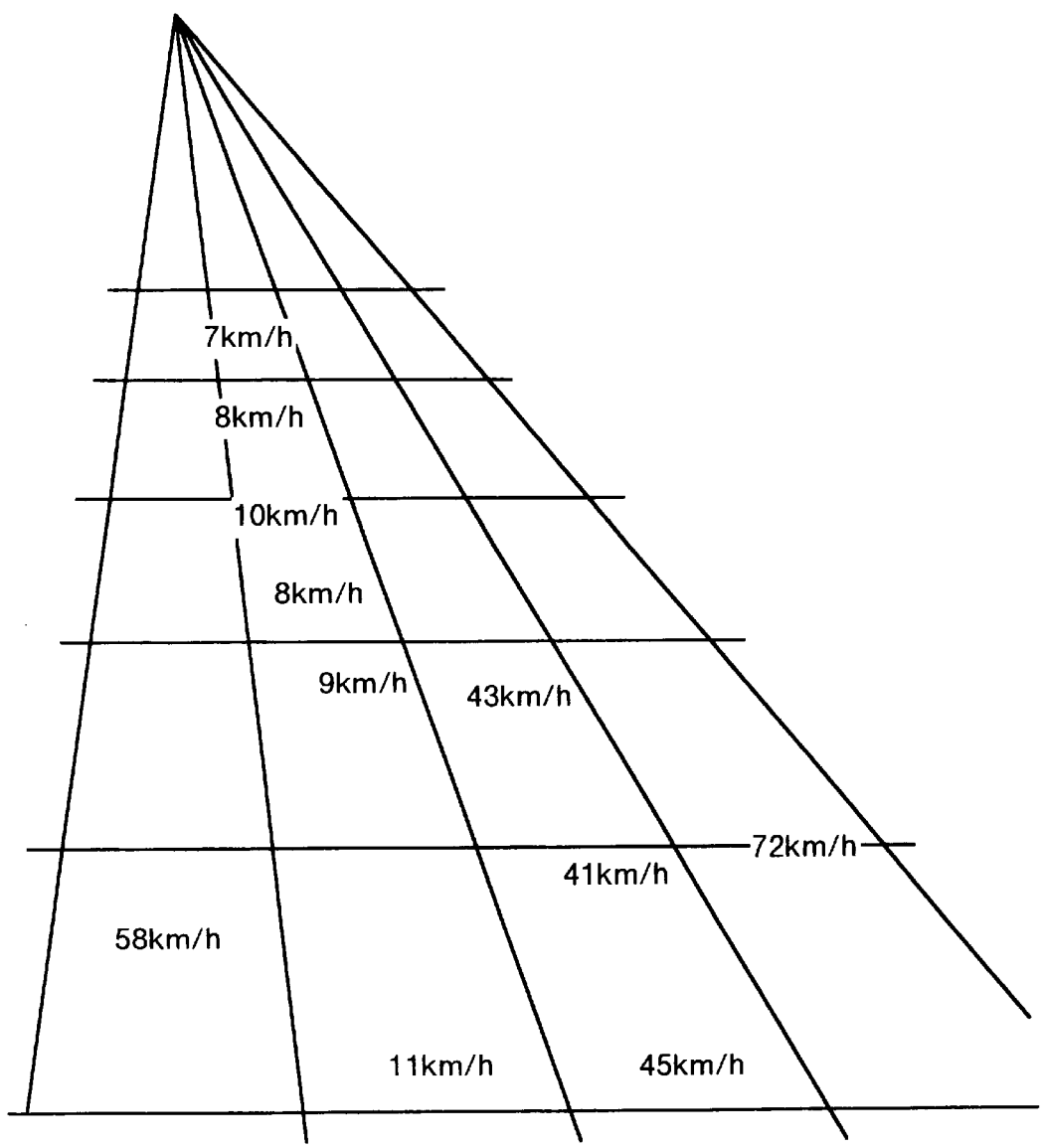
FIG. 18 is a view showing an example in which the speed fields of vehicles overlapping the small areas in FIG. 15 are displayed.

FIG. 17 is a view showing an example in which the speed fields of vehicles overlapping the overlooked road image of the four-lane road in FIG. 12 are displayed. FIG. 18 is a view showing an example in which the instantaneous speeds of vehicles overlapping the small areas in FIG. 15 are displayed.

Since the instantaneous speed fields described above instantaneously change, in order to use traffic indexes as the instantaneous speed fields, the speed fields are smoothed and averaged by a filter process within a predetermined period of time, and stable speed fields must be obtained.

A speed field filter process to obtain stable speed fields will be described below.

FIGS. 19(a) to 19(c) are views showing the speed field process of a certain small area on a road which is monitored. In FIG. 19(a), the instantaneous speed fields at time t1, t2, . . . are represented by p1, p2, . . . , respectively. The instantaneous speed fields are obtained by the above method. Here, the instantaneous speed fields are multiplied by a median filter to obtain q3, q4, . . . As the median filter, for example, a filter which outputs a central value among the instantaneous speed field p3 at time t3 and the past instantaneous speed fields p1 and p2 as q3 is used. The pitch of time t1, t2, . . . is set to be about 1 second. Since occurrence or elimination of traffic jam can be sufficiently detected in units of minutes, the one-minute average of the filter process speed fields q3, q4, . . . is calculated. FIG. 19(b) is a table expressing the one-minute averages of filter process speed fields. For example, a 1-average speed field r62 at time t62 is an average value among the past one-minute filter process speed fields q3, q4, . . . , q62. As a time cycle, in addition to a second, image input cycles of the TV image input 101 or several seconds may be used. In place of the one-minute average speed, 3- or 5-minute average speed field may be used depending on an application. FIG. 19(c) is a table showing a speed field, a filter process speed field, and a one-minute average speed field. In this case, although the window width of the filter is set to be 3, this window width is only an example, and the present invention is not limited to the window width.

Figure 20:
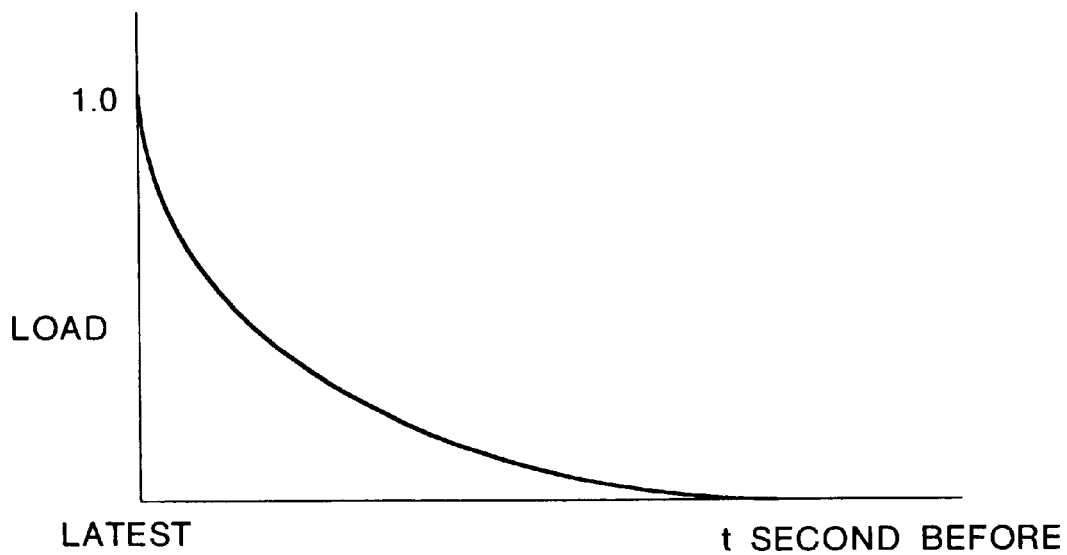
FIG. 20 is a graph showing an example of an exponential function having a minus coefficient and used in a weighting operation.

In order to make the speed of a response to traffic jam of the one-minute average field high, an average process which is lightly weighted is used for an old filter process speed field, and an average process which is heavily weighted is used for a new filter process speed field. As a weight, as shown in FIG. 20, an exponential function having a minus coefficient is properly used.

According to these processes, the speed field of each small area arranged on a road is measured, and the presence/absence of traffic jam of each small area can be determined on the basis of the magnitude of the speed field. On a main lane of a highway, when a speed field is 40 km/h or lower, for example, traffic jam is determined. On the other hand, at an entrance ramp or an exit ramp, when a speed field is 20 km/h or lower, traffic jam is determined.

Figure 21:
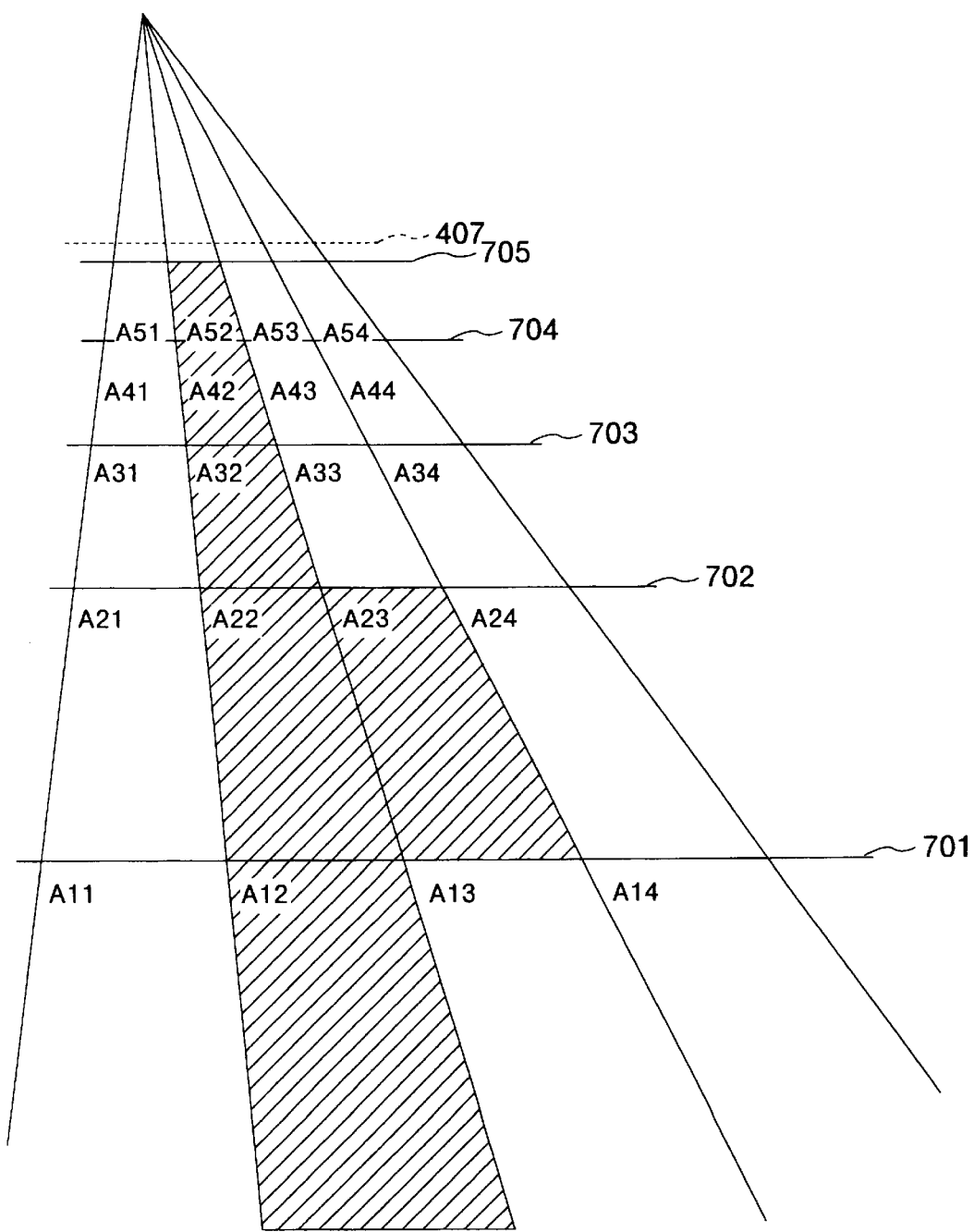
FIG. 21 is a view showing an example of a display of a display means 306 in FIG. 11.

FIG. 21 is a view showing an example of a display of a display means 306 in FIG. 11. On the display screen, the small areas A11 to A54 are displayed, and the small areas A12, A22, A23, A32, A42, and A52 in which traffic jam occurs may be classified by colors, or the integrated distance of the small areas A12, A22, A32, and A52 may be displayed.

Figure 22:
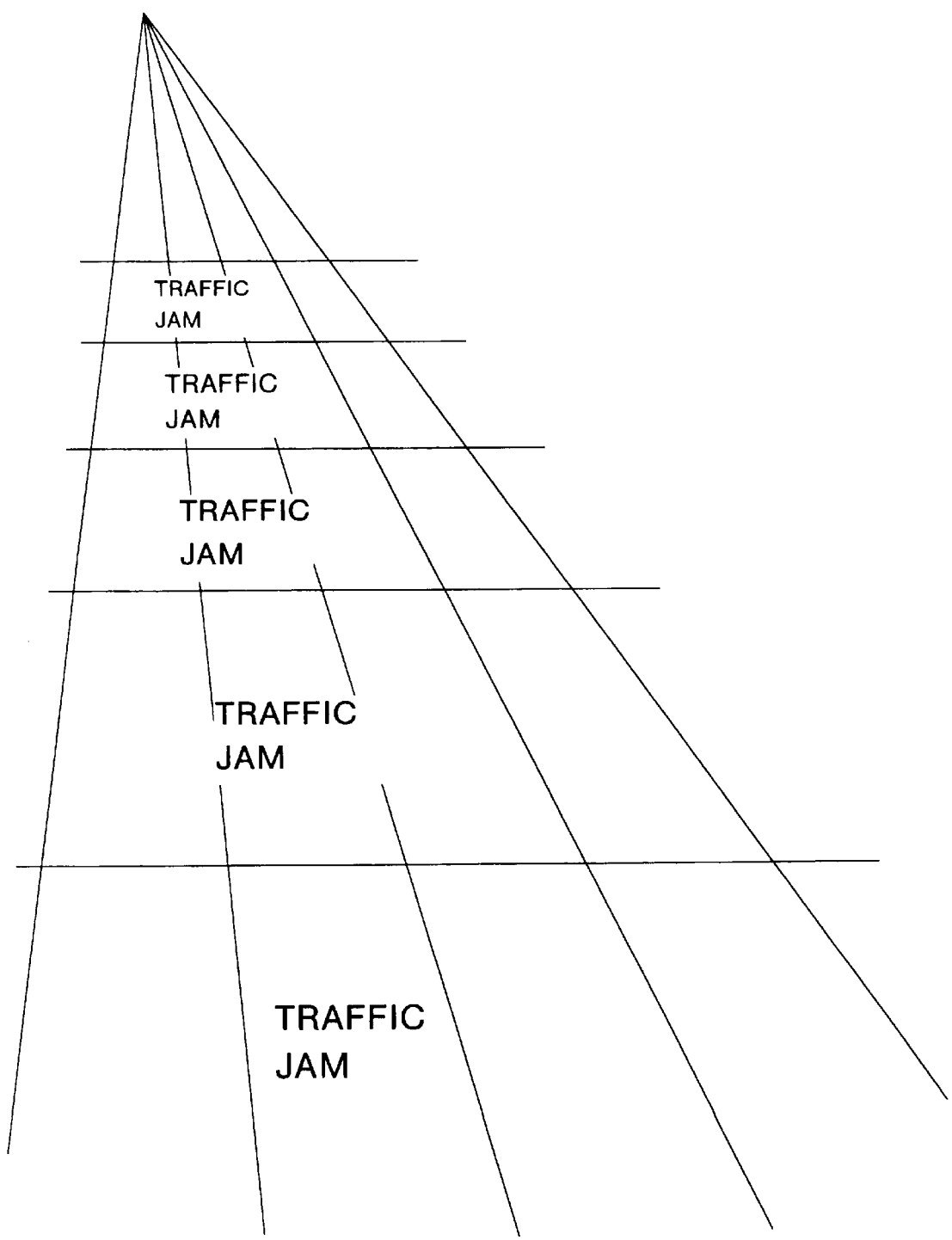
FIG. 22 is a view showing another example of a display of the display means 306 in FIG. 11.

As shown in FIG. 22, for example, a letter "jam" which means traffic jam can also be displayed.

The details of a vehicle tracking process will be described below.

FIG. 23 is a view showing an example of a tracking management table. Any one of INDEX1 to INDEXN is given to each object to be tracked to allocate one column, thereby recognizing the state of the object to be tracked. The INDEX1 to INDEXN of the column correspond to vehicles in tracking, respectively. More specifically, when a vehicle is tracked, the same column is used in the operations from a template initializing operation to an updating operation for a template in tracking.

A tracking state flag of each column indicates whether a column is used for tracking a vehicle. If the flag is 0, the column is not used, and a new vehicle can be tracked. If the tracking state flag is 2, a state in which a template initial registration candidate is held is set, a template cut candidate area in the initial registration coordinates is subjected to template initial registration by the template initial registration 103, and the tracking state flag is set to 1. If the tracking state flag is 1, since it is indicated that the template initial registration has been completed, the template tracking 104 and the template updating 105 are used as targets.

Initial registration time is time at which an image used for initial registration is input. Latest image input time represents time at which the latest image is input, and coordinates on the latest image represents pattern detection coordinates as a vehicle on the latest image. The latest image input time and the coordinates on the latest image are valid when the tracking state flag is 1. A latest existence lane holds a lane number to which a vehicle in tracking, i.e., the coordinates on the latest image belong. Although input times of p images input from image input time 1 cycle before to image input time p cycles before and the vehicle detection coordinates of the p images from vehicle detection coordinates 1 cycle before to vehicle detection coordinates p cycles before are used to calculate instantaneous speeds, the input times and the vehicle detection coordinates will be described later.

The details of a processing procedure of the traffic flow monitor apparatus according to Embodiment 2 will be described below. Referring to FIG. 10, in the TV image input 101, overlooked road images are input through the TV camera 300 at cycles and converted into digital data to be held. In the image analysis 102, an image analysis area crossing a road is formed in an image held by the TV image input 101, the luminance distribution in this area is analyzed to capture a portion of the rear or front portion of the vehicle having a large change in luminance, i.e., a rear shield, tail lamps, a front grill, a windshield, headlights, or the like as an initial registration area. The position of the template is determined on the basis of the coordinates of a detected vehicle candidate, and the tracking state flag is set to 2.

When the tracking state flag is 2, the condition 112 is true, and control branches to the template initial registration 103. In the template initial registration 103, initial registration coordinates are checked. When the initial registration coordinates are not close to the initial registration coordinates of another column in tracking and the coordinates on the latest image as a vehicle, the corresponding area of the processed image is cut at the initial registration coordinates, and the area is held in the image memory 205 as a template. Image input time is recorded as initial registration time, and the tracking state flag is set to 1 to indicate that the initial registration has been completed. On the other hand, when the initial registration coordinates are close to the coordinates on the latest image of another column, the initial registration coordinates are not registered, and the tracking state flag is kept 0. In this process, the initial registration coordinates are not employed as a template.

When the tracking state flag is 1, the condition 113 is true, and control branches to the template tracking 104. In the T.P. tracking 104, a pattern matching process is performed by the template of the corresponding column, vehicle detection coordinates are recorded as coordinates on the latest image, and time at which the processed image is input is recorded as latest image input time. A lane to which the vehicle belongs is determined on the basis of the coordinates on the latest image to record the lane number as the latest existence lane of the column. For example, when the coordinates on the latest image are (xp,yp), if equations 1 to 5 are used, the x-coordinates of the lane division lines 402 to 406 are expressed by equations 6 to 10. Here, xp1, xp2, xp3, xp4, and xp5 indicate the x-coordinates of the lane division lines 402 to 406, respectively.

When the values xp, xp1, xp2, xp3, xp4, and xp5 are compared with each other in magnitude, xp, i.e., a lane to which the vehicle belongs can be determined. In addition, times from the image input time 1 cycle before and the input time p cycles before of the corresponding column, coordinates from the vehicle detection coordinates 1 cycle before to the vehicle detection coordinates p cycle before, and lanes from the lane existence lane 1 cycle before to the lane existence lane q cycles before are updated.

In the pattern matching process, when a rectangular frame serving as a portion to be tracked sticks out from the image, or the degree of similarity is low, the tracking state flag of the corresponding column is set to 0. When the column is set in an idle state and then initialized, a new vehicle can be tracked.

In the pattern matching process of the template tracking 104, a target image is scanned by a template image, and the difference between both the images or the degree of similarity between both the images is calculated, and a portion closest to the template image in the target image is found. As the method of calculating the difference, a method expressed by equation 1 is used. Note that D represents the difference between the target image and the template image at coordinates (x, y); m and n represent the number of pixels in the horizontal direction of the template and the number of pixels in the vertical direction of the template, respectively; x and y represent variables used when the target image is scanned by the template, respectively; and i and g are variables used when the difference is calculated, respectively. Coordinates (x, y) at which the difference D is minimum are the coordinates of the vehicle to be tracked.

As a method of calculating the degree of similarity, a method using density normalization correlation represented by equation (12) is used. Symbol S represents correlation between the target image and the template image at the coordinates (x, y), and is set to a value ranging from 0 to 1. The correlation S is 1 when the target image completely coincides with the template image, and the correlation S is 0 when the target image completely incoincides with the template image. In equation 12, m and n represent the number of pixels in the horizontal direction of the template and the number of pixels in the vertical direction of the template, respectively; x and y represent variables used when the target image is scanned by the template, respectively; and i and j are variables used when the correlation is calculated, respectively. Coordinates (x, y) at which the correlation S is maximum are the coordinates of a vehicle to be tracked.

When the tracking state flag is 1, the condition 114 is true, and control branches to the template updating 105. In the template updating 105, an image having a template size is cut from a position indicated by the coordinates on the latest image by the template tracking 104, and the image is held in the image memory 205 in FIG. 2 as a new template.

The sizes of vehicles on the respective images increase or decrease when the vehicles leave from the position near the TV camera 300 to the position distanced from the TV camera 300 or approach the TV camera 300 from the position distanced from the TV camera 300. The template size must be also reset to an appropriate size during template updating.

Figures 6A, 6B:
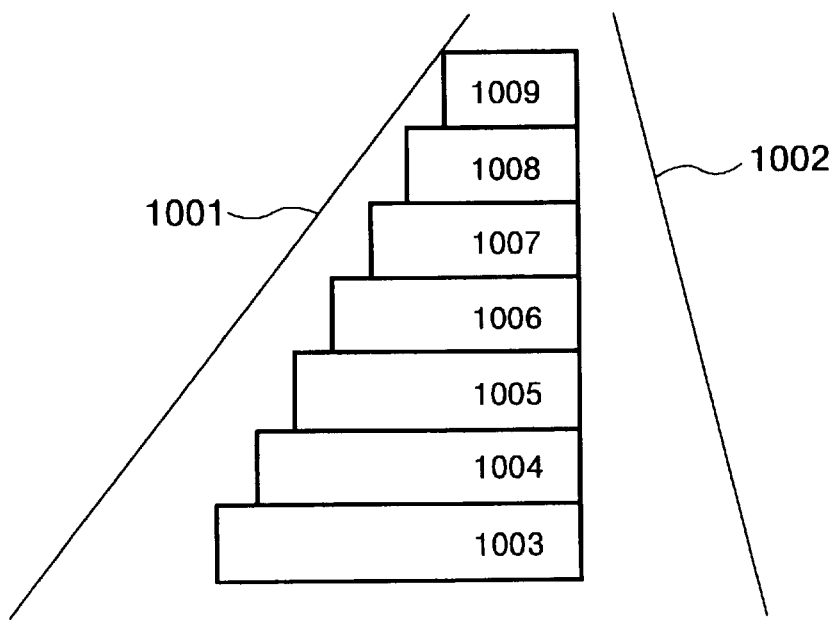
FIGS. 6(a) and 6(b) are views for explaining an enlargement or reduction process of a template size when a template is updated in the traffic flow monitor apparatus according to the present invention.

FIGS. 6(a) and 6(b) are views showing an embodiment of a method of resetting a template size during template updating. FIG. 6(a) shows a lane division line 1001, a lane division lane 1002, and template frames 1003 to 1009. Although the actual lane division lines 1001 and 1002 are parallel to each other, the lanes decrease in width upward on the screen. The template frames 1003 to 1009 are obtained such that a certain template frame is enlarged or reduced depending on the interval between the lane division line 1001 and the lane division lane 1002. For example, the size of the template registered near the TV camera 300, i.e, the lower portion of the screen is equal to that of the template frame 1003, and the template frames 1004, 1005, ..., 1009 gradually decrease in size toward the position distanced from the camera. The size of a template registered at the position distanced from the TV camera 300, i.e., the upper portion of the screen is equal to that of the template frame 1009, and the template frames 1008, 1007, . . . , 1003 gradually increase in size toward the position close to the camera. When the template sizes corresponding to the positions on the screen are calculated in advance and held as shown in FIG. 6(*b*), a calculation amount can be reduced, and high-speed processing can be performed.

In this manner, according to the present invention, since the size of the template is reset to an appropriate size during template updating, a vehicle can be tracked in the wide range from the position near the TV camera 300 to the position distanced from the TV camera 300.

In the condition branch 115 in FIG. 10, when the tracking state flag is 1, control branches to the instantaneous speed measurement 106. In the instantaneous speed measurement 106, the instantaneous speed of a vehicle in tracking is calculated.

FIG. 7 is a flow chart showing a procedure of calculating an instantaneous speed.

Step 1101: The difference between the "latest image input time" of the tracking management table in FIG. 23 and the "image input time 1 cycle before" is used to calculate a speed measurement time.

Step 1102: It is determined that the speed measurement time is a predetermined period of time or longer. If the speed measurement time is the predetermined period of time or longer, the flow shifts to step 1104. On the other hand, if the speed measurement time is shorter than the predetermined period of time, the flow shifts to step 1103.

Step 1103: The flow returns to step 1101 to calculate the latest image input time of the tracking management table in FIG. 23 and the image input time 2 cycles before to calculate a speed measurement time. Similarly, the flow goes back to by the p cycles, a speed measurement time is set to be the predetermined period of time or longer.

Step 1104: The movement distance of a vehicle is calculated on the basis of a vehicle position on the image used for calculating the speed measurement time and the vehicle position on the latest image.

Step 1105: The instantaneous speed of the vehicle is calculated on the basis of the speed measurement time and the movement distance.

As described above, since speed measurement is performed on the basis of the movement distance for the predetermined period of time or longer, an instantaneous speed can be obtained at stable precision. This predetermined period of time is several hundred seconds with respect to a vehicle near the TV camera 300, and is several seconds with respect to a vehicle at a position distanced from the TV camera 300.

If the condition 131 in FIG. 10 is true, control branches to the speed field calculation for each area 130, and the speed field, the speed field subjected to a filter process, and the weighted average value of the speed field are calculated. The condition 131 is that a predetermined period of time has elapsed, and calculated every 1 second. Also, control branches to calculation of all small areas, and the calculation can be made every cycle.

If the condition 119 in FIG. 10 is true, control branches to the measurement result communication 110, and the calculated speed field and/or the length of traffic jam are communicated. The condition 119 is that a predetermined period of time has elapsed, and performs communication every one, five, or several minute.

According to Embodiment 2 of the present invention, the characteristic portions of a vehicle or a vehicle group are tracked by pattern matching to measure an instantaneous speed, and a speed field of each small area is calculated. For this reason, traffic jam on a high way or the like on which no vehicle is not stopped can be detected.

In the traffic flow monitor system according to the present invention, the measured speed field is multiplied by a median filter and subjected to an averaging process for past 1 minute or several minutes. For this reason, the speed field and traffic jam can be stably determined.

In the averaging process for the speed fields, when the speed fields are weighted depending on the newness of the measured speed fields, response to a traffic state change such as occurrence or elimination of traffic jam is high.

Embodiment 3

A traffic monitor apparatus according to Embodiment 3 of the present invention will be described below will be described below ith reference to FIGS. 2 to 33.

FIG. 11 is a block diagram showing an example of a system arrangement of a traffic flow monitor system to which the present invention is to be applied. A traffic flow monitor apparatus 301 in Embodiment 3 processes an overlooked road image photographed by a TV camera 300 set on the upper portion of a pole built along the road, measures traffic events or traffic indexes of vehicles such as the number of passing vehicles, speeds, lengths of the vehicles, the presence/absence of lane changes or measures the average speeds of the small areas in each lane as speed fields to the presence/absence of traffic jam of the small areas in each lane, transmits a traffic jam measurement result to a traffic control room 307 through a traffic event communication means 304, and displays the result on a display means 306.

FIG. 2 is a block diagram showing the arrangement of the traffic flow monitor apparatus according to Embodiment 3 of the present invention. The traffic flow monitor apparatus 301 according to Embodiment 3 comprises a CPU 201, a man-machine interface 202 used to allow an operator to operate the CPU 201, a main memory 203 serving as a memory for storing a program of the CPU 201 therein and also serving as an operation memory, an image processing means 204 for processing an image under the control of the CPU 201, and an image memory 205 which holds a digital image obtained by the image input means 206 and also serves as an operation memory for the image processing means 204. The image processing means 204 image-analyzes an image analysis area (to be described later), detects a luminance pattern of the front or rear portion of a vehicle, and performs a pattern matching process by using the luminance pattern as a template.

Figure 24:
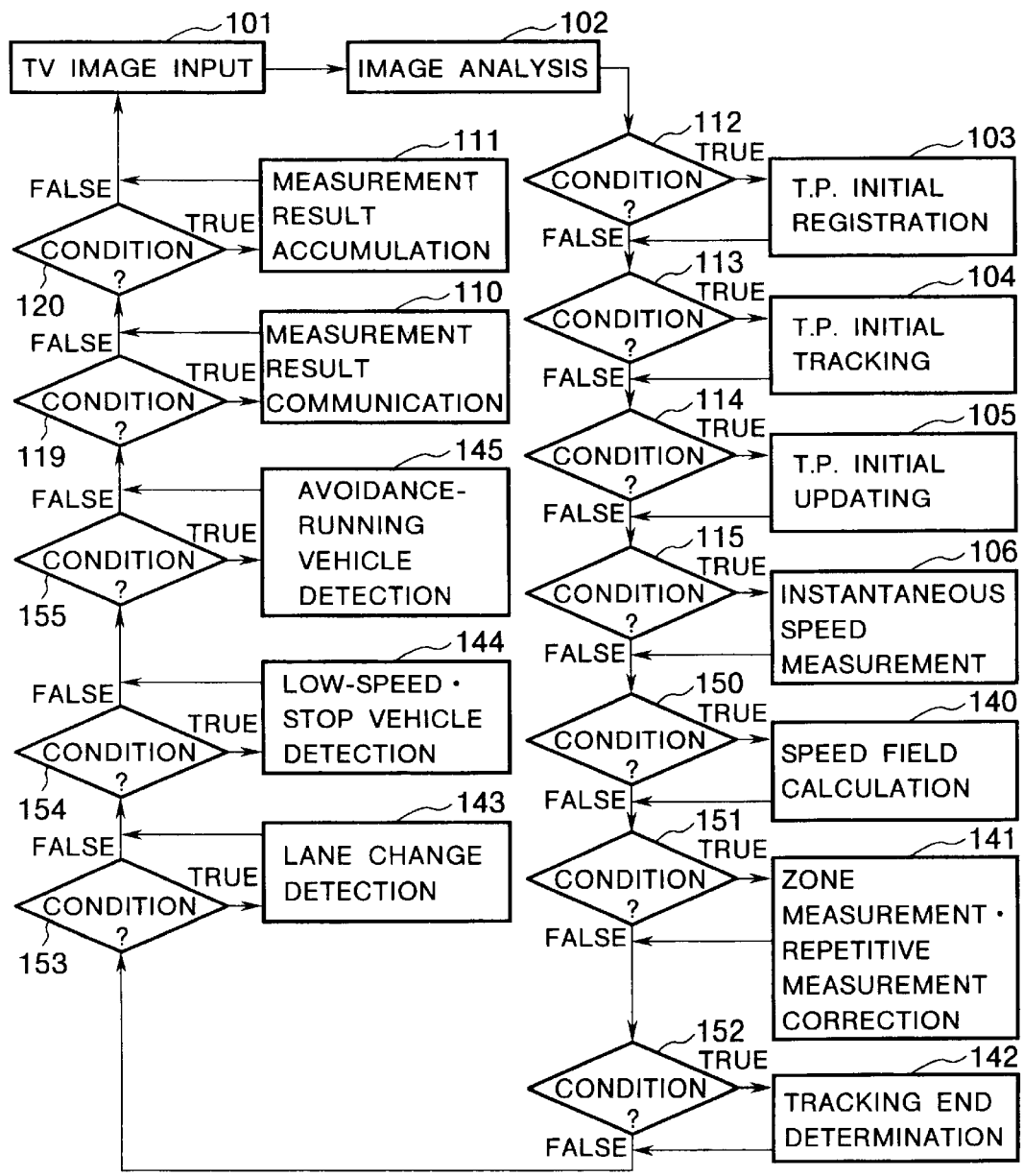
FIG. 24 is a flow chart showing an example of a processing procedure in the traffic flow monitor apparatus according to Embodiment 3 of the present invention.

FIG. 24 is a flow chart showing an example of a processing procedure in the traffic flow monitor apparatus according to Embodiment 3 of the present invention. Basically, TV image input 101 and image analysis 102 are cyclically repeated. Meanwhile, there are condition branches 112 to 115, 150 to 155, 119, and 120. When a predetermined condition is satisfied, the control branches to template initial registration (T.P. initial registration) 103, template tracking (T.P. tracking) 104 similar to vehicle tracking, template updating (T.P. updating) 105, instantaneous speed measurement 106, speed field calculation 140, zone measurement·overlapping measurement correction 141, tracking end determination 142, lane change detection 143, low-speed·stop vehicle detection 144, avoidance-running vehicle detection 145, measurement result communication 110, and measurement result accumulation 111. The condition branches 112 to 115, 150 to 155, 119, and 120 will be described later together with the process of the traffic flow monitor apparatus according to Embodiment 3.

Figure 25:
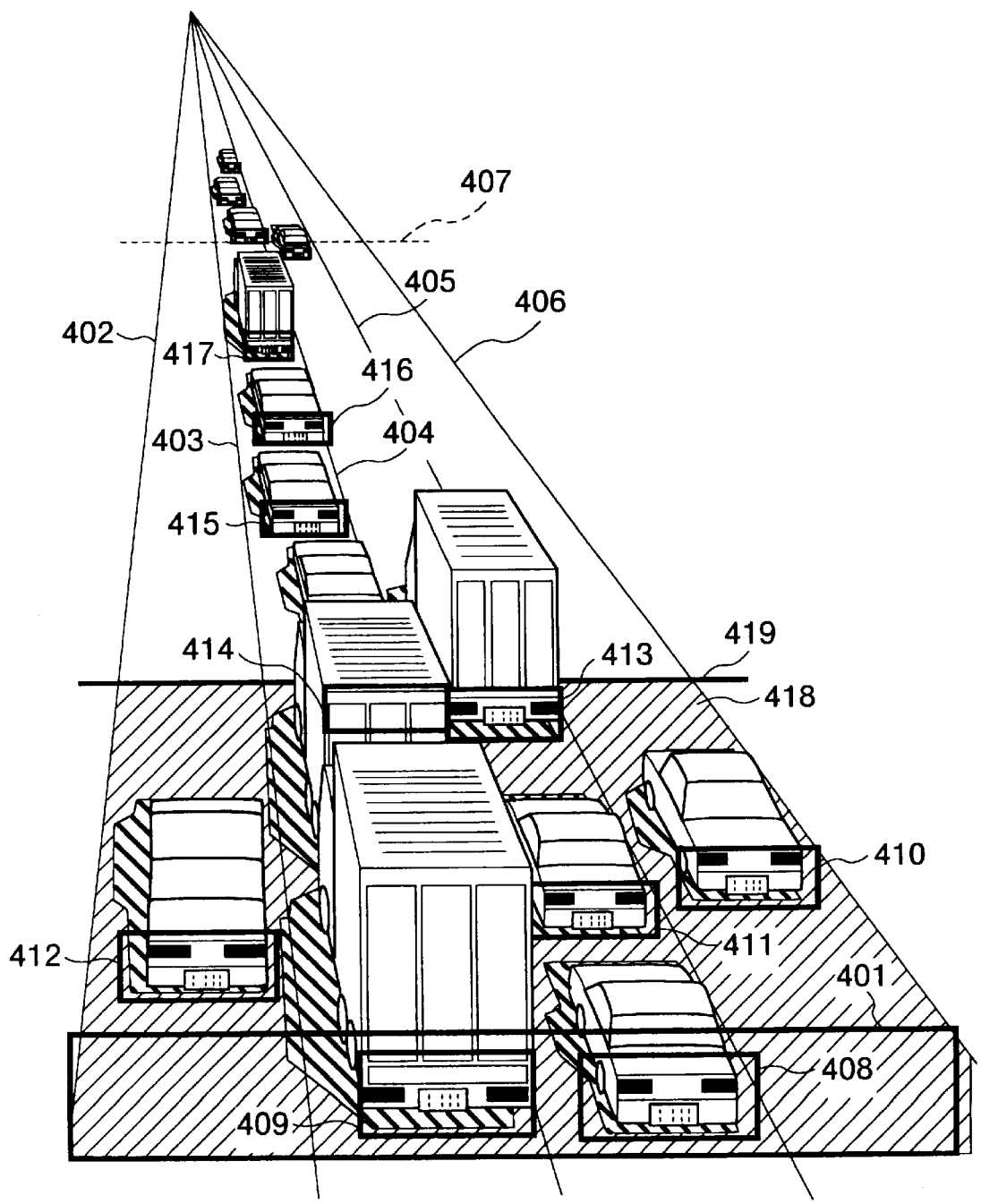
FIG. 25 is a view showing an example of an overlooked road image of a four-lane road.

FIG. 25 is a view showing an example of an overlooked road image of a four-lane road. FIG. 25 is a view showing an example of an image analysis method for capturing the front or rear portion of a vehicle by image analysis. An image analysis area 401 crossing the road is set at the lower portion of the drawing. In this case, the four-lane road is divided by lane division lines 402 to 406 into the first, second, third, and fourth lanes which are arranged from the left side of the drawing. The lane division lines 402 to 406 are held in the main memory 203 in FIG. 2 as a primary approximate expression or a polynomial approximate expression. Here, for example, it is assumed that the lane division lines 402 to 406 are held as primary equation 1 to equation 5. In these equations, x is a coordinate in the horizontal direction on the screen, and y is a coordinate in the vertical direction on the screen. In addition, a1, a2, a3, a4, and a5 are inclinations of the straight lines of the lane division lines 402 to 406, and b1, b2, b3, b4, and b5 are y-intercepts of the straight lines of the lane division lines 402 to 406.

When a vehicle passes through the image analysis area 401 crossing the road, vehicle tracking is started. Rectangular frames 408 to 417 of the rear portions of the respective vehicles indicates portions which are tracked by pattern matching for the vehicles in tracking. The tracking limit line 407 indicates a limit line of vehicle tracking performed by pattern matching. When a vehicle in tracking passes through the tracking limit line 407, the tracking is ended. This is because, when the vehicle is to be tracked over the trackina limit line, many matching errors and incorrect tracking occur. On the basis of the movement distances of the rectangular frames 408 to 417 and time information, the instantaneous speeds of vehicles passing through the position can be calculated. A portion hatched with right-up lines at the lower portion of the screen is a measurement zone 418, and the average speed of a vehicle passing through the zone 418 is measured as a zone speed. A measurement zone boundary 419 is a horizontal line indicating the furthest boundary of the measurement zone 418. When vehicles pass through the measurement zone boundary 419, the vehicles are counted as the number of passing vehicles in each existence lane.

FIGS. 13(a) to 13(c) are views showing an example of an image analysis method for capturing the rear portion of a vehicle by image analysis, and show a waveform 1504 obtained when vehicles 1501 and 1502 enter the image analysis area 401. The waveform 1504 is made one-dimensional data such that data differentiated in the vertical direction in the image analysis area 401 are projected in the vertical direction to be added to each other. The one-dimensional data increases when the number of horizontal edges the lights of the rear portion of the vehicle or a boundary between the rear shield and the roof is large. When a threshold value 1511 is determined with respect to the waveform 1504, portions higher than the threshold value are indicated by k1 to k2 and k3 to k4. When a template which tracks the vehicle 1501 at the position having a maximum value 1505 in the zone between k1 and k2 as a center is cut, the horizontal position of an area 1509. When a template which tracks the vehicle 1502 at the position having a maximum value 1506 in the zone between k3 and k4 as a center is cut, the horizontal position of an area 1510 is determined. Positioning of the template cut area 1509 or 1510 in the vertical direction is performed in the following manner. That is, vertically differentiated images in the zone between k1 and k2 and the zone between k3 and k4 are projected in the horizontal direction to form waveforms 1507 and 1508, and the maximum values of the waveforms 1507 and 1508 are determined as centers. This image analysis method is suitable for a situation having brightness at which a vehicle can be sufficiently seen.

When the body cannot be easily seen at night, and almost vehicles turn on lights, a method of capturing the pair of left and right lights of each vehicle is effective. When the pair of lights are to be captured, in the image analysis area 401, as a preprocess, a minimum value filter is multiplied several times, and the maximum value filter is multiplied the same number of times to calculate the difference between the image and the original image. When this preprocess is performed, light spreading by road reflection can be effectively removed.

FIGS. 14(a) to 14(c) are views showing a process for capturing a pair of lights. FIG. 14(a) shows a state in which vehicles 1601 and 1602 enter the image analysis area 401. At night, only four lights 1605 to 1608 of two vehicles appear on an actual image. When the luminance distributions of the light images are projected and added to each other in the vertical direction in the image analysis area 401, a waveform 1609 can be obtained, and four peaks corresponding to the lights 1605 to 1608 are generated. At this time, when the above preprocess is performed, i.e., the minimum filter and the maximum filter are used, light spreading by road reflection can be effectively removed, and contrast among the four peaks can be increased. FIG. 14(b) shows a waveform obtained by differentiating the light 1609 in the horizontal direction once. Positive and negative peak pairs 1611 to 1614 are generated in correspondence with the lights 1605 to 1608. The horizontal coordinate of each light coincides with the coordinate of the zero crossing of each peak pair. FIG. 14(c) shows a process of confirming the vertical coordinate of a light whose horizontal coordinate is determined. For example, luminance is projected and added in the horizontal direction near the horizontal coordinate of a light 1605 to obtain a waveform 1615, and the peak of the waveform 1615 is set as a vertical coordinate. Similarly, the luminance is projected and added in the horizontal direction near the horizontal coordinate of the light 1608 to obtain a waveform 1616, and the peak of the waveform 1616 is set as a vertical coordinate.

In the descriptions of the image processes in FIGS. 13 and 14, a vehicle is photographed from the back of the vehicle to perform image analysis of the characteristics of the rear portion of the vehicle. However, it will be apparent that the vehicle may be photographed from the front of the vehicle to perform image analysis of the characteristics of the front portion of the vehicle. The process in daytime shown in FIG. 13 and the process at night shown in FIG. 14 may be performed at once without any problem. However, the daytime and night of the screen is determined on the basis of the luminance distribution on the road surface, and the process in the daytime and the process at night may be switched to each other depending on the determination.

FIG. 15 is a view showing an example of the arrangement of small areas for calculating a speed field with respect to a vehicle which is subjected to image analysis and tracked. Small areas A11, A12, ..., A53, and A54 are partitioned by lane division lines 402 to 406 and lines 701 to 705. FIG. 15 also shows the tracking limit line 407 and rectangular frames for tracking vehicles. The details of a procedure of calculating instantaneous speeds a1, b1, i1, and j1 of the rectangular frames will be described later. Referring to FIG. 15, the instantaneous speed fields in the small areas A11, A12, A14, A22, A23, and A32 are instantaneous speeds a1, b1, e1, f1, g1, and h1, the instantaneous speed field in the small area A13 is the average between the instantaneous speeds d1 and c1, and the instantaneous speed field in the small area A42 is the average between the speeds i1 and j1.

FIG. 16 is a view showing rectangular frames in tracking several seconds before. In this case, the instantaneous speed fields of the small areas A21, A23, A24, A33, and A52 are updated to a2, c2, e2, g2, and j2, respectively, and the instantaneous speed fields of the small areas A13, A22, and A42 are updated to the average between d2 and k2, the average between b2 and f2, and the average between h2 and i2.

Figure 26:
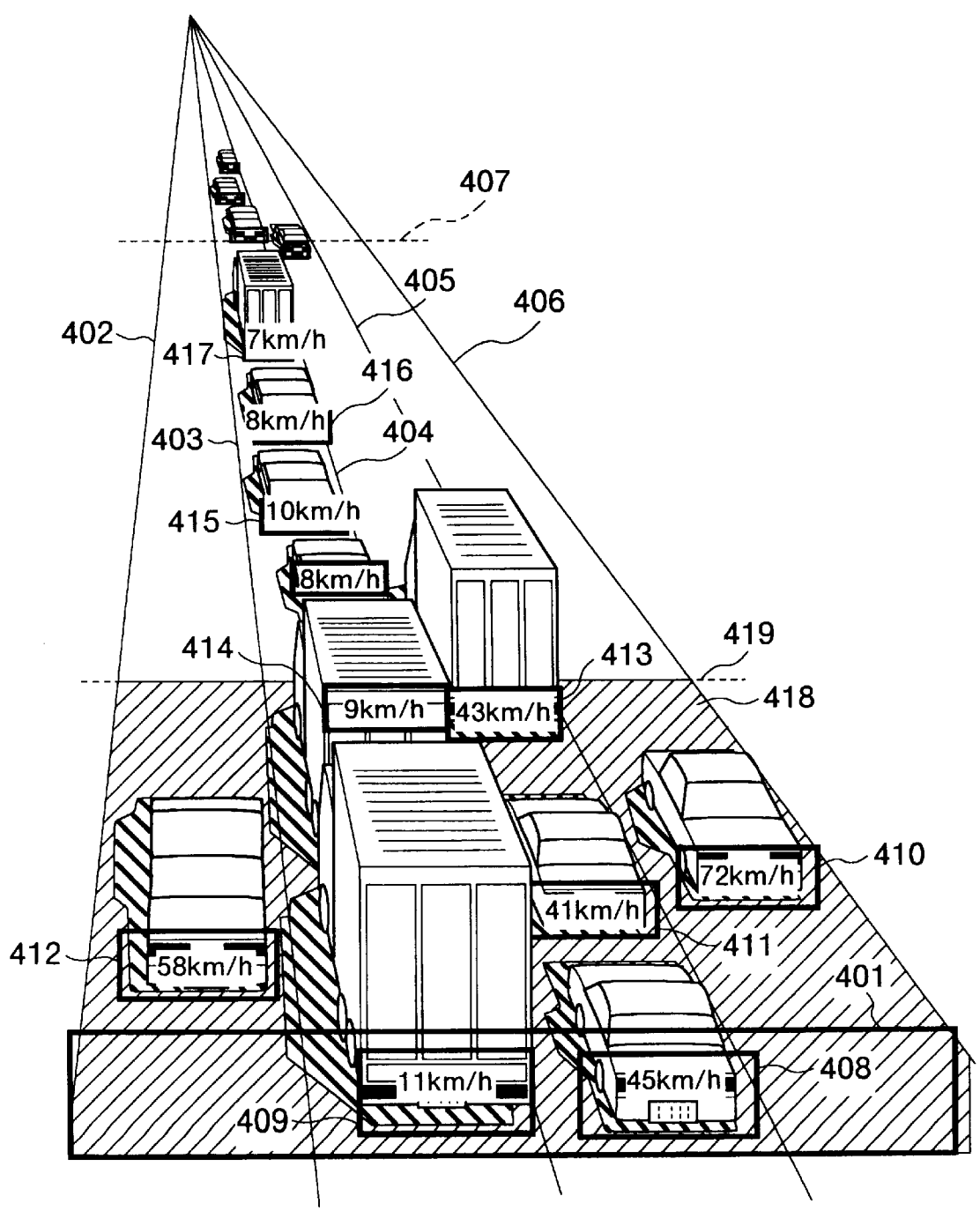
FIG. 26 is a view showing an example in which the instantaneous speeds of vehicles overlapping the overlooked road image of the four-lane road in FIG. 25 are displayed.

FIG. 26 is a view showing an example in which the instantaneous speeds of vehicles overlapping the overlooked road image of the four-lane road in FIG. 25 are displayed. Since the instantaneous speed frequently changes for several seconds, the instantaneous speed is improper as an index for traffic control or traffic information present. Therefore, in Embodiment 3, an average speed field for at least one minute is calculated to be used as a traffic index.

A filter process and an averaging process of an instantaneous speed field for obtaining a stable one-minute average speed field will be described below.

FIGS. 19(a) to 19(c) are views showing the filter process and the averaging process for the instantaneous speed fields in small areas on a road which is monitored. In FIG. 19(a), the instantaneous speed fields at time t1, t2, . . . are represented by p1, p2, . . . , respectively. The instantaneous speed fields are obtained by the above method. Here, the instantaneous speed fields are multiplied by a median filter to obtain q3, q4, . . . As the median filter, for example, a filter which outputs a central value among the instantaneous speed field p3 at time t3 and the past instantaneous speed fields p1 and p2 as q3 is used. The pitch of time t1, t2, . . . is set to be about 1 second. Since occurrence or elimination of traffic jam can be sufficiently detected in units of minutes, the one-minute average of the filter process speed fields q3, q4, . . . is calculated. FIG. 19(b) is a table expressing the one-minute averages of filter process speed fields. For example, a 1-average speed field r62 at time t62 is an average value among the past one-minute filter process speed fields q3, q4, . . . , q62. As a time cycle, in addition to a second, image input cycles of the TV image input 101 or several seconds may be used. In place of the one-minute average speed, 3- or 5-minute average speed field may be used depending on an application. FIG. 19(c) is a table showing a speed field, a filter process speed field, and a one-minute average speed field. In this case, although the window width of the filter is set to be 3, this window width is only an example, and the present invention is not limited to the window width. In order to make the speed of a response to traffic jam of the one-minute average field high, an average process which is lightly weighted is used for an old filter process speed field, and an average process which is heavily weighted is used for a new filter process speed field.

As a weight, as shown in FIG. 20, an exponential function having a minus coefficient is properly used.

Figure 27:
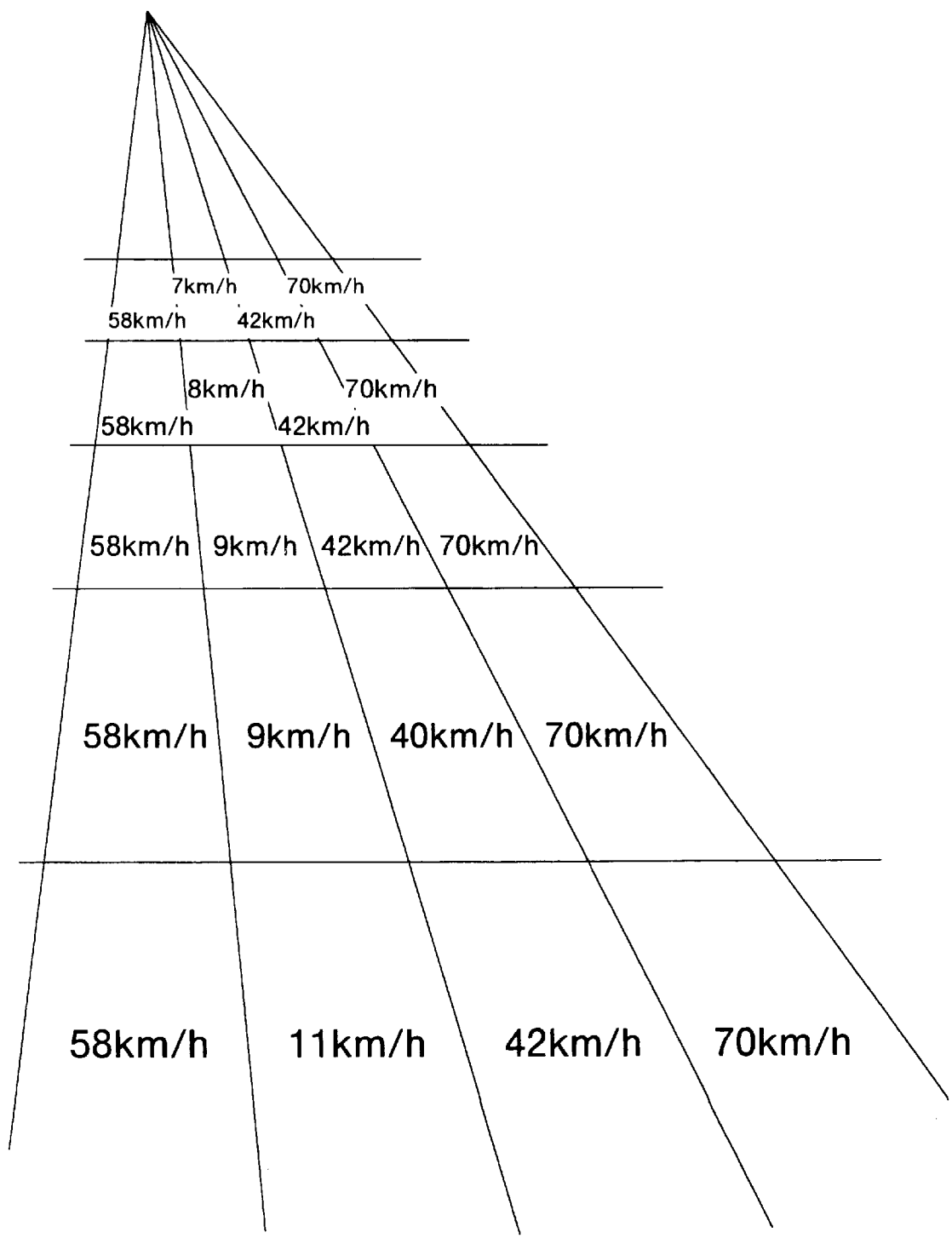
FIG. 27 is a view showing an example in which one-minute average speed fields overlapping the small areas in FIG. 15 are displayed.

FIG. 27 is a view showing an example in which one-minute average speed fields overlapping the small areas in FIG. 15 are displayed. Since the speed field is obtained by performing the above process to an instantaneous speed, the speed field does not coincide with the instantaneous speed field and expresses the manner of a flow of a vehicle in each road area.

According to these processes, the speed field of each small area arranged on a road is measured, and the presence/absence of traffic jam of each small area can be determined on the basis of the magnitude of the speed field. On a highway, when a speed field is 40 km/h or lower, for example, traffic jam is determined.

FIG. 21 is a view showing an example of a display of a display means 306 in FIG. 11. On the display screen, the small areas A11 to A54 are displayed, and the small areas A12, A22, A32, A42, and A52 in which traffic jam occurs may be classified by colors, or the integrated distance of the small areas A12, A22, A32, A42, and A52 may be displayed.

As shown in FIG. 22, for example, a letter "jam" which means traffic jam can also be displayed.

The details of a vehicle tracking process will be described below.

FIG. 28 is a view showing an example of a tracking management table the traffic flow monitor apparatus according to Example 3 of the present invention. Any one of INDEX1 to INDEXN is given to each object to be tracked to allocate one column, thereby recognizing the state of the object to be tracked. The INDEX1 to INDEXN of the column correspond to vehicles in tracking, respectively. More specifically, when a vehicle is tracked, the same column is used in the operations from a template initializing operation to the end of the tracking operation through an updating operation for a template in tracking.

A "tracking state flag" of each column indicates whether a column is used for tracking a vehicle. If the flag is 0, the column is not used, and the column can be used for tracking a new vehicle. If the "tracking state flag" is 2, a state in which a template initial registration candidate is held, but initial registration has not been performed is set, a template cut candidate area in the "initial registration coordinates" is subjected to template initial registration by the template initial registration 103, and the "tracking state flag" is set to 1. If the "tracking state flag" is 1, since it is indicated that the template initial registration has been completed, the template tracking 104 and the template updating 105 are used as targets to be processed. If an "in-tracking flag" is 1, the flag indicates that the vehicle is being tracked. When the "in-tracking flag" is 0, the flag indicates that the vehicle is not being tracked, e.g., the end or step of vehicle tracking.

"Initial registration time" is time at which an image used for initial registration is input. "Latest image input time" represents time at which the latest image is input, and "coordinates on the latest image" represents the detection coordinates of a vehicle pattern on the latest image. The latest image input time and the coordinates on the latest image are valid if the "tracking state flag" is 1. A "latest existence lane" holds a lane number to which a vehicle in tracking, i.e., the coordinates on the latest image belong. Although input times of images of p cycles input from "image input time 1 cycle before" to "image input time p cycles before" and the vehicle detection coordinates of the images of p cycles from "vehicle detection coordinates 1 cycle before" to "vehicle detection coordinates p cycles before" are used to calculate instantaneous speeds, the input times and the vehicle detection coordinates will be described later. The vehicle existence lanes of images of q cycles from "vehicle existence lane 1 cycle before" to "vehicle existence lane q cycles before" are used to determine zigzag running of a vehicle or running for avoiding an obstacle. The details of the vehicle existence lanes will be described later.

The "instantaneous speed" is updated each time the instantaneous speed is calculated during vehicle tracking.

The "instantaneous speed valid flag is OFF in the initial state. When an instantaneous speed is calculate only once during vehicle tracking, and the "instantaneous speed" is updated, the "instantaneous valid flag" is turned on to indicate that the contents of the "instantaneous speed" are valid. A zone measurement completion flag is OFF in the initial state. A vehicle in tracking passes through the measurement zone, the corresponding vehicle is counted as the number of passing vehicles, and the average zone speed is measured. In this case, the zone measurement completion flag is turned on. A "lane change flag" is OFF in the initial state. However, when a lane change is detected in the lane change detection 143 in FIG. 24, the "lane change flags" is turned on; when no lane change is detected, the "lane change flags" is turned off. A "abnormal speed flag" is 0 in the initial state. If the "instantaneous speed valid flag" is OFF, the "abnormal speed flag" is forcibly set in the initial state. If the "instantaneous speed valid flag" is ON, and the "instantaneous speed" is lower than a predetermined speed and higher than a second predetermined speed, the "abnormal speed flag" becomes 1 to indicate that the vehicle runs at a low speed. In addition, if the "instantaneous speed valid flag" is ON, and the "instantaneous speed" is lower than the second predetermined speed, the "abnormal speed flag" becomes 2 to indicate that the vehicle is stopped.

On a highway, the predetermined speed is properly set to 40 km/h, and the second predetermined speed is properly set to 5 km/h. In addition, −5 km/h is set as a third predetermined speed, the state between the second predetermined speed and the third predetermined speed is set as a stop state, and the speed lower than the third predetermined speed is set as running in the reverse direction. In this case, a reversely running vehicle can also be detected on the highway. The details from the "instantaneous speed" to the "abnormal speed flag" will be described later. The contents of columns are initialized when this apparatus is started, and the corresponding columns are updated to respective values during vehicle tracking.

Upon completion of vehicle tracking, the columns are initialized. In the initial state, the "tracking state flag" and the "in-tracking flag" are 0, and the "instantaneous speed valid flag" and the "zone measurement completion flag" are OFF.

As described above, a rectangular frame for vehicle tracking and a column of the tracking management table have an one-to-one correspondence, and are closely related to each other. For this reason, a rectangular flag for vehicle tracking is called a column hereinafter.

The processing procedure of the traffic flow monitor apparatus according to Embodiment 3 will be described below. In the TV image input 101 in FIG. 24, overlooked road images are cyclically input through the TV camera 300 in FIG. 11 and converted into digital data, and the digital data are held. In the image analysis 102, an image analysis area crossing the road in the image is formed in the image held by the TV image input 101, a luminance distribution in the area is analyzed to capture a portion of the rear or front portion of the vehicle having a large change in luminance, i.e., a rear shield, tail lamps, a front grill, headlights, or the like as an initial registration area. The position of the template is determined on the basis of the coordinates of a detected vehicle candidate, and the tracking state flag is set to 2.

In the condition branch 112, if the column having a "tracking state flag" of 2 is true, control branches to the template initial registration 103. In the template initial registration 103, "initial registration coordinates" are checked. When the initial registration coordinates are not excessively close to the "coordinates on latest image" of another in-tracking column, the corresponding area of the processed image is cut at the initial registration coordinates, and the area is held in the image memory 205. Accordingly, image input time is recorded as initial registration time, and the "tracking state flag" is set to 1 to indicate that an in-tracking state has been set.

When the initial registration coordinates are excessively close to the coordinates on the latest image of another column, the "tracking state flag" and the "in-tracking flag" are set to 0 without performing a registration operation. With this process, the "initial registration coordinates" are not employed as a template.

The condition branch 113 is true with respect to the column having the "tracking state flag" of 2 or 1 and the "in-tracking flag" of 1, and control branches to the template tracking 104. In the template tracking, if the "tracking state flag" is 2, a template is formed on the basis of the latest image. For this reason, a template cut position is the same as a detection position. Therefore, the "tracking state flag" is set to 1 without performing a pattern matching process, and the process of the template tracking 104 is ended. On the other hand, if the "tracking state flag" is 1, in this column, times from "image input time 1 cycle before" to "image input time p cycles before", vehicle detection coordinates from "vehicle detection coordinates 1 cycle before" to "vehicle detection coordinates p cycles before", and vehicle existence lanes from "lane existence lane 1 cycle before" and "vehicle existence lane p cycles before" are updated.

As a result, the contents of the latest image input time, the coordinates on the latest image, and the latest existence lane are written in the "image input time 1 cycle before", the "vehicle detection coordinate 1 cycle before", and the "vehicle existence lane 1 cycle before". Subsequently, a pattern matching process is performed by using the template of this column, the vehicle detection coordinates are recorded on the "coordinates on latest image", and time at which a processed image is input is recorded on the "latest image input time". A lane to which the vehicle belongs is determined on the basis of the "coordinates on the latest image", and the lane is recorded on the "latest existence lane". For example, when the "coordinates on latest image" are (xp,yp), if equations 1 to 5 are used, the x-coordinates of the lane division lines 402 to 406 are expressed by equations 6 to 10. Here, xp1, xp2, xp3, xp4, and xp5 indicate the x-coordinates of the lane division lines 502 to 506, respectively.

When the values xp, xp1, xp2, xp3, xp4, and xp5 are compared with each other in magnitude, a lane to which the vehicle belongs can be determined.

In the pattern matching process, when the template frame sticks out from the image or crosses the tracking limit line 407, or the degree of similarity is low because of hinderance caused by the vehicle, the "in-tracking flag" of the column is set to 0 to indicate the end of the tracking operation. In the column in which the tracking operation is ended, the "tracking state flag" is set to 0 by the condition branch 152 in the tracking end determination 142. At the same time, the contents of the column are initialized. The column can track a new vehicle again.

The pattern matching process in the template tracking 104 is a process in which a target image is scanned by a template image, the difference or degree of similarity between both the images, and a portion of the target image closest to the template image is found out. As a method of calculating the difference, a method expressed by equation 11. Note that D represents the difference between the target image and the template image at coordinates (x, y); m and n represent the number of pixels in the horizontal direction of the template and the number of pixels in the vertical direction of the template, respectively; x and y represent variables used when the target image is scanned by the template, respectively; and i and g are variables used when the difference is calculated, respectively. Coordinates (x, y) at which the difference D is minimum are the coordinates of the vehicle to be tracked.

As a method of calculating the degree of similarity, a method using density normalization correlation using equation 12 is used. Symbol S represents correlation between the target image and the template image at the coordinates (x, y), and is set to a value ranging from 0 to 1. The correlation S is 1 when the target image completely coincides with the template image, and the correlation S is 0 when the target image completely incoincides with the template image. In equation 12, m and n represent the number of pixels in the horizontal direction of the template and the number of pixels in the vertical direction of the template, respectively; x and y represent variables used when the target image is scanned by the template, respectively; and i and j are variables used when the correlation is calculated, respectively. Coordinates (x, y) at which the correlation S is maximum are the coordinates of a vehicle to be tracked.

The condition branch 114 is true with respect to the column having the "tracking state flag" of 1 and the "in-tracking flag" of 1, and control branches to the template tracking 105. In the template updating 105, an image having a template size is cut from a position indicated by the coordinates on the latest image by the template tracking 104, and the image is held in the image memory 205 in FIG. 2 as a new template. The vehicle may leave from a position near the TV camera 300 or approaches the TV camera 300 from a position distanced from the camera. The size of the vehicle on the image decreases or increases accordingly. The template size must be also reset to an appropriate size during template updating.

FIGS. 6(a) and 6(b) are views for explaining an enlargement (reduction) process of a template size when a template is updated in the traffic flow monitor apparatus according to Embodiment 3. FIG. 6(a) shows a lane division line 1001, a lane division lane 1002, and template frames 1003 to 1009. The template frames 1003 to 1009 are obtained such that a certain template frame is enlarged or reduced depending on the interval between the lane division line 1001 and the lane division lane 1002. For example, the size of the template registered near the TV camera 300, i.e, the lower portion of the screen is equal to that of the template frame 1003, and the template frames 1004, 1005, . . . , 1009 gradually decrease in size toward the position distanced from the camera. The size of a template registered at the position distanced from the TV camera 300, i.e., the upper portion of the screen is equal to that of the template frame 1009, and the template frames 1008, 1007, . . . , 1003 gradually increase in size toward the position close to the camera.

When the template sizes corresponding to the positions on the screen are calculated in advance and held as shown in FIG. 6(b), a calculation amount can be reduced, and high-speed processing can be performed.

In Embodiment 3 of the present invention, in order to sequentially reset the size of the template frame to an appropriate size in template updating, a vehicle can be tracked at high precision over the wide range from the position near the camera to the position distanced from the camera.

If the condition branch 115 in FIG. 24 is true with respect to a column having a "tracking state flag" of 1 and an "in-tracking flag" of 1, control branches to the instantaneous speed measurement 106 to calculate the instantaneous speed of the vehicle in tracking.

Figure 29:
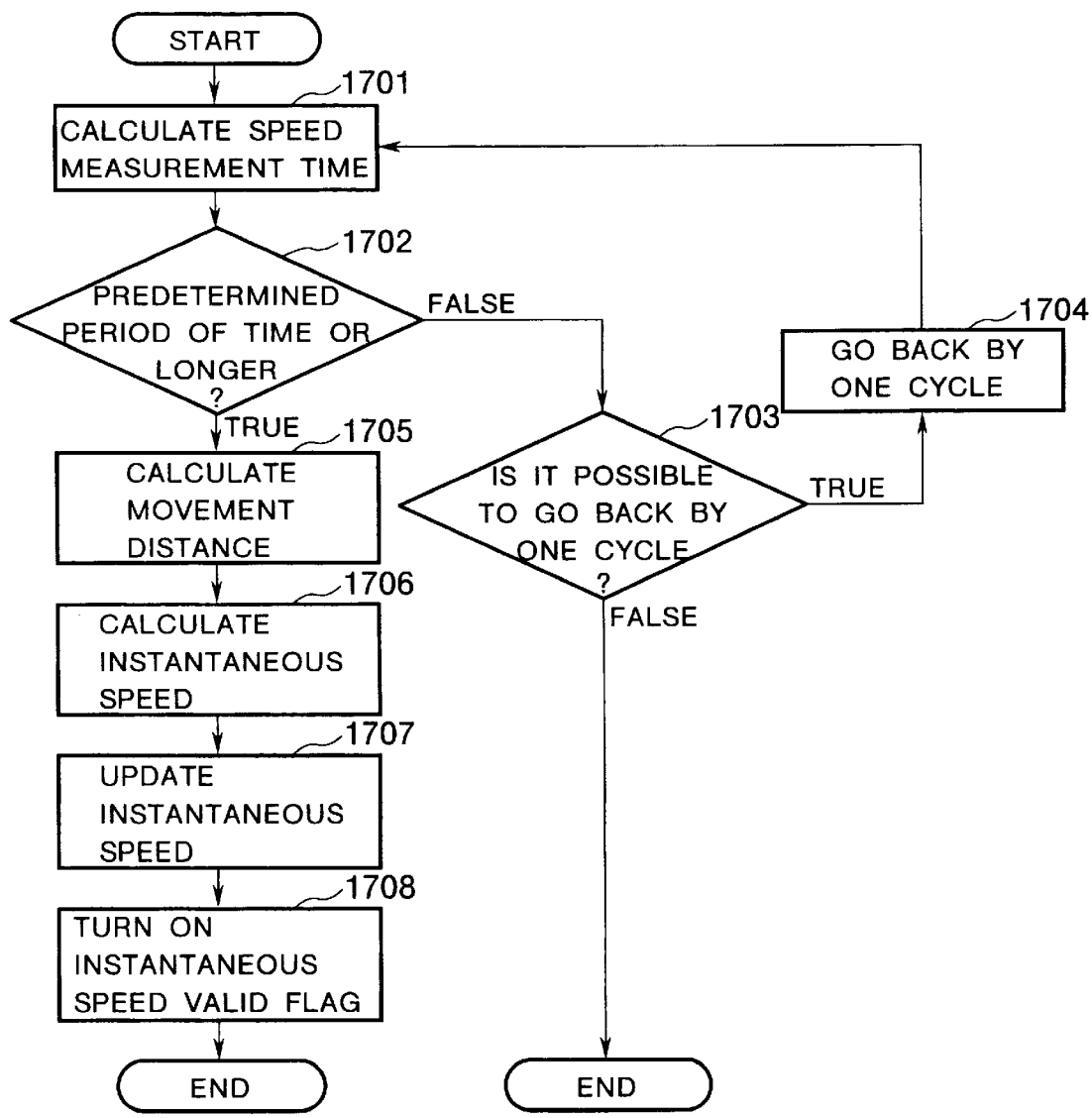
FIG. 29 is a flow chart showing a procedure for calculating an instantaneous speed according to Embodiment 3.

FIG. 29 is a flow chart showing a procedure of calculating an instantaneous speed according to Embodiment 3.

Step 1701: The difference between the "latest image input time" of the tracking management table in FIG. 28 and the "image input time 1 cycle before" is used to calculate a speed measurement time.

Step 1702: The speed measurement time and a predetermined period of time are compared with each other. If the speed measurement time is equal to or longer than the predetermined period of time, the flow shifts to step 1705. If the speed measurement time is shorter than the predetermined period of time, the flow returns to step 1701 through step 1703 and step 1704.

Step 1703: The number of backward cycles is managed, control branches when the speed measurement time is shorter than the predetermined period of time within p cycles, and the process in FIG. 29 is ended without updating the instantaneous speed. The upper limit number of cycles at this time is determined to be a smaller one of the number of cycles assured in the tracking management table in advance and the number of cycles corresponding to the vehicle tracking time. More specifically, even if a large space is assured in the tracking management table, the number of backward cycles is not large immediately after the vehicle tracking is started. When the number of backward cycles is 1, the flow shifts to step 1704.

Step 1704: The difference between the "latest image input time" in the tracking management table FIG. 28 and "image input time 2 cycles before" is used to calculate the speed measurement time in step 1701. Similarly, the flow goes back to by the maximum of p cycles through steps 1702 to step 1704 and step 1701, so that the speed measurement time is set to be the predetermined period of time or longer.

Step 1705: The movement distance of a vehicle is calculated on the basis of the vehicle position on the image used for calculating the speed measurement time.

Step 1706: The instantaneous speed of the vehicle is calculated on the basis of the speed measurement time and the movement distance.

Step 1707: The instantaneous speed of the corresponding column of the tracking management table is updated by the above instantaneous speed.

Step 1708: The instantaneous speed valid flag of the corresponding column of the tracking management table is turned on, and this process is ended.

As described above, in the traffic flow monitor apparatus according to Embodiment 3, the speed is measured in the movement distance within a period of time longer than the predetermined period of time. For this reason, the instantaneous speed can be obtained at stable precision. Here, the predetermined period of time is preferably set to several hundred milliseconds with respect to a vehicle located near the camera, and the predetermined period of time is properly set to several seconds with respect to a vehicle located at a position distanced from the camera.

In the condition branch 150 in FIG. 24, a period of time of each cycle is measured, control branches to the speed field calculation 140 for each predetermined time interval, and a speed field of each small area is updated. Although the predetermined time interval is properly set to 1 to several seconds, control branches to the speed field calculation 140 every cycle, and the speed field may be updated. In the speed field calculation 140, the "tracking state flag" in the tracking management table and the "in-tracking flag" are 1. As described above, an average speed field for one minute or several minutes is calculated with reference to the "instantaneous speed" of the column in which the "instantaneous speed valid flag" is ON, and the speed field is updated by using the average speed field.

In the condition branch 151 in FIG. 24, the coordinates on the latest image are checked with respect to a column in which the "tracking state flag" and the "in-tracking flag" are 1, and it is apparent that a vehicle passes through the measurement zone boundary 419 in FIG. 25. In addition, when the zone measurement completion flag is OFF, the condition branch 151 is true, and control branches to the zone measurement-overlapping measurement correction 141. In the zone measurement-overlapping measurement correction 141, columns passing through the measurement zone boundary 419 are arranged by lanes, the zone passing speed is measured, and the passing vehicles are counted. A column which is tracked simultaneously with the above column is made invalid, and overlapping measurement is corrected. In the zone measurement-overlapping measurement correction 141, columns passing through the measurement zone boundary 419 are arranged as shown in FIG. 30.

FIG. 30 is a view showing a method of arranging measurement data in a buffer of the traffic flow monitor apparatus according to Embodiment 3. Respective columns are classified depending on lanes used when the columns pass through the measurement zone boundary 419, and an invalid flag, the passing time and passing speed of the measurement zone boundary 419, the time difference and speed difference between the column and a column which previously passes through the same lane are temporarily recorded. Pieces of column information which are temporarily recorded is sequentially transmitted to the traffic control room 307 by the measurement result communication 110 through the traffic event communication means 304 in order of oldness of passing time of the columns every cycle of image input or every predetermined time. At the same time, as needed, the pieces of column information are recorded on a recording medium by the measurement result accumulation 111 in order of oldness of passing time of the columns. The numbers of columns appearing in FIG. 30 are added to each other for a predetermined period of time, e.g., 1 minute or 5 minutes, and the resultant value is transmitted to the traffic control room 307 as the number of passing vehicles for each predetermined time, or may be recorded on the magnetic medium. The columns which have been subjected to communication, recording, counting are removed from the record, and new column are sequentially and temporarily recorded. This buffer process is executed in the main memory 203 in FIG. 2. FIG. 30 shows an example in which six column are stored for each lane. With respect to each lane, an old column may be held until a new column appears. A holding time may be managed, and record may be erased every several seconds or every several minutes.

An invalid flag following each column will be described below.

Figure 31A:
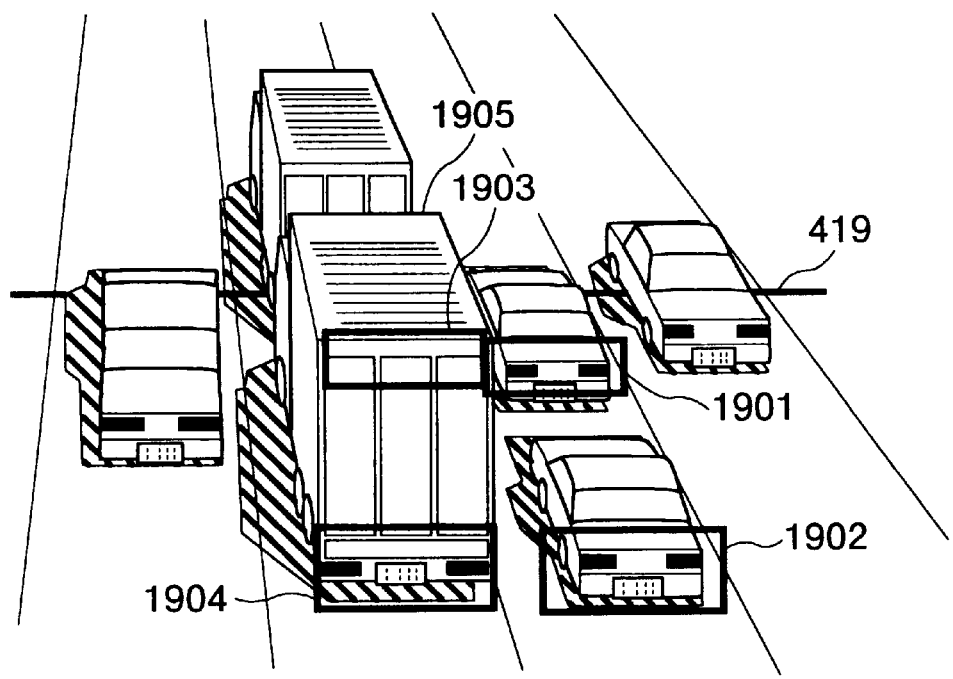
FIGS. 31(a) and 31(b) are views showing a manner in which a plurality of columns follows one vehicle.
Figure 31B:
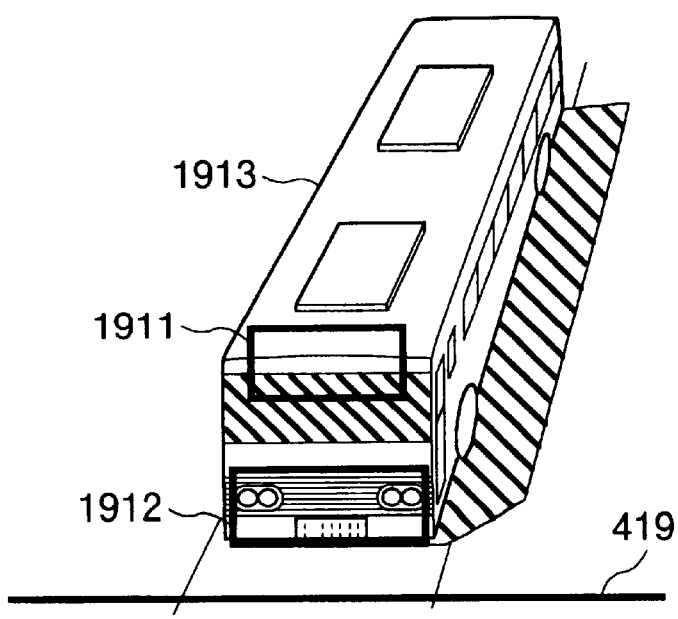

FIGS. 31(*a*) and 31(*b*) are views showing columns following vehicles. FIG. 31(*a*) shows a case wherein a vehicle leaving from the camera is tracked, and FIG. 31(*b*) shows a case wherein a vehicle approaching the camera is tracked. A column 1901 and a column 1902 track different small vehicles, respectively. On the other hand, a column 1903 and a column 1904 track one large vehicle 1905. When these columns are counted, and one large vehicle 1905 passes through a detection position, passing vehicles are counted as 2 by the columns 1903 and the column 1904. As a result, the measurement is erroneously performed.

Therefore, in order to assure measurement precision, it is checked whether respective columns track different vehicles or whether the same column is tracked by a plurality of columns to discriminate the columns from columns which are not related to measurement. The columns which are not related to measurement must be made invalid. A procedure of detecting the invalid column will be described first, and a correction procedure for a measurement result of the invalid column will be described next.

With respect to the horizontal direction of an image, a predetermined value is determined on the basis of the width of one vehicle. When the distance between columns in tracking in the horizontal direction is equal to or larger than the predetermined value, it is determined that the same vehicle is tracked by a plurality of columns, and tracking of columns other than one column is stopped. On the other hand, with respect to the vertical direction of the screen, i.e., the depth direction and the height direction of the screen, tracking cannot be determined by only a distance. As shown in FIG. 31(*a*), the vertical distance between the column 1901 and the column 1902 is almost equal to the vertical distance between the column 1903 and the column 1904. Different vehicles are tracked by two previous columns, and the same vehicle is tracked by two subsequent columns.

Since each portion of the screen is caused to correspond to a height from the ground, the speed of the column 1904 is equal to the speed of the vehicle 1905 in tracking. On the other hand, the speed of the column 1903 is considerably higher than that of the vehicle 1905 in tracking due to geographical geometrical relationship therebetween. Therefore, in determination in the vertical direction of the screen, a time interval in which a plurality of columns passes through the measurement zone boundary 419, i.e., when it is expressed by vehicles, a time interval between the rear ends of the vehicles. If the time interval between the rear ends of the vehicles is short, and the speed difference between the corresponding columns is large, it is determined that portions having different heights of the same vehicle are tracked, and the invalid flag in FIG. 30 is turned on.

Referring to FIGS. 31(*a*) and 31(*b*), columns are close to each other. In the second lane in FIG. 31(*a*), the columns 1903 and the column 1904 sequentially pass through the measurement zone boundary 419, and the columns are recorded on the buffer in FIG. 30. In this case, although the time interval between the rear ends of the vehicles is short, the time difference is large. For this reason, the previous column 1903 is made invalid.

In the third lane in FIG. 31(*a*), the column 1901 and the column 1902 are sequentially recorded on the buffer in FIG. 30. In this case, the time interval between the rear ends of the vehicles is short, and the time difference is small. For this reason, both the columns are valid. As in the third lane, when the two vehicles run while being close to each other, it is impossible that the speeds of the vehicles are considerably different from each other.

In the FIG. 31(*b*) showing a vehicle 1913 approaching the TV camera 300, a column 1912 and a column 1911 sequentially pass through the measurement zone boundary 419, and these columns are recorded on the buffer in FIG. 30. In this case, although the time interval between the front ends of the vehicles is short, the speed difference is large. For this reason, the subsequent column 1911 is made invalid.

Figure 32:
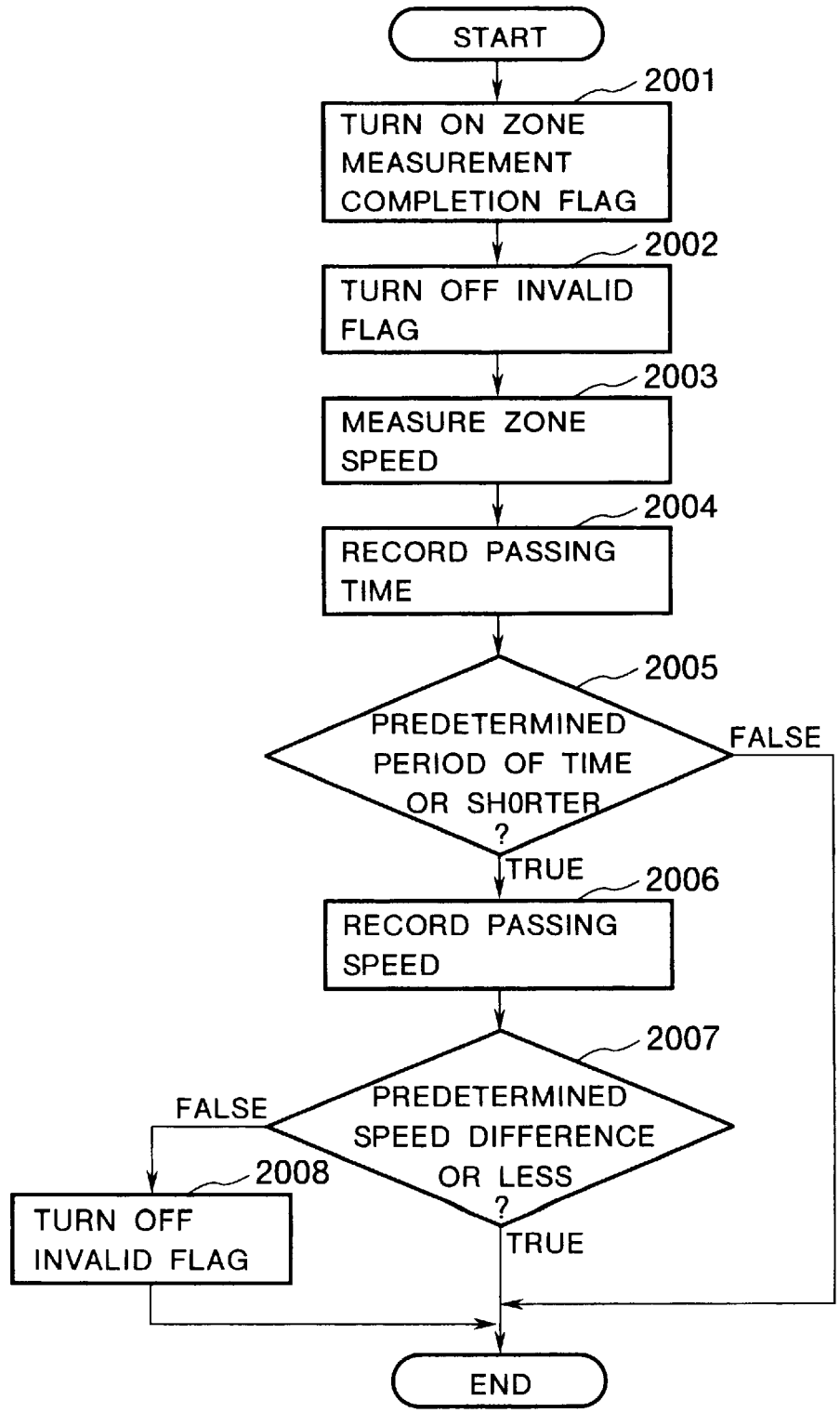
FIG. 32 is a flow chart showing a procedure for managing and checking a time difference and a speed difference between columns in the buffer shown in FIG. 30.

FIG. 32 is a flow chart showing a procedure for managing and checking a time difference and a speed difference between columns in the buffer shown in FIG. 30 according to the above consideration.

Step 2001: The "zone measurement completion flag" of the corresponding column in the tracking management table in FIG. 28 is turned on. The "zone measurement completion flag" indicates that the corresponding column has been measured.

Step 2002: A column recording area is assured in a lane which coincides with the "latest existence lane" of the corresponding column of the buffer in FIG. 30, and the invalid flag is turned off, so that initialization is performed.

Step 2003: A passing speed of the measurement zone 418 is calculated. A tracking distance on the measurement zone 418 is calculated on the basis of the "initial registration coordinates" and the "coordinates on latest image" of the corresponding column in the tracking management table, a tracking period of time is calculated on the basis of the "initial registration time" and the "latest image input time", and the passing speed of the measurement zone 418 is calculated on the basis of the tracking distance and the tracking time. The passing speed is recorded on the corresponding recording area of the buffer in FIG. 30.

Step 2004: "Latest image input time" of the corresponding column in the tracking management table is recorded on the corresponding recording area of the buffer in FIG. 30 as passing time. In addition, the difference between the passing time of the corresponding column and the passing time of the previous column on the same lane is recorded as a time difference.

Step 2005: When the time difference is longer than a predetermined period of time, it is determined that one independent vehicle is being tracked, and the operation is ended. When the time difference is equal to or shorter than the predetermined period of time, the same vehicle as that tracked by the previous column may be tracked. For this reason, the speed difference between the corresponding column and the previous column is checked in step 2006. As the predetermined period of time, about 1 second is properly used. However, depending on the speed of the corresponding column, the predetermined period of time may be long when the speed of the corresponding column is low, and the predetermined period of time may be short when the speed of the corresponding column is high.

Step 2006: The difference between the passing speed measured in step 2003 with respect to the corresponding column and the passing speed of the previous column in the same lane is recorded on the corresponding recording area of the buffer in FIG. 30 as a speed difference.

Step 2007: When the speed difference recorded in step 2006 is equal to or smaller than a predetermined value, it is determined that the corresponding column is tracking one independent vehicle, and the operation is ended.

Step 2008: When the speed difference is larger than the predetermined value, it is determined that the corresponding column tracks the same vehicle which is tracked by the previous column, the invalid flag is turned on, the operation is ended.

Handling of the invalid flag of the buffer in FIG. 30 when a measurement result is transmitted or accumulated will be described below. In a traffic flow monitor apparatus for tracking a vehicle leaving from a camera, as shown in FIG. 31(*a*), the column 1904 is caused to correspond to the vehicle 1905, and the column 1903 must be neglected. This is because the speed of the column 1904 and the speed of the vehicle 1905 are equal to each other. Therefore, in communication or accumulation of the measurement result, in the buffer in FIG. 30, a column subsequent to a column in which an invalid flag is ON may be neglected.

In a traffic flow monitor apparatus for tracking a vehicle approaching a camera, as shown in FIG. 31(*b*), the column 1912 is caused to correspond to the vehicle 1913, and the column 1911 must be neglected. This is because the speed of the column 1912 and the speed of the vehicle 1913 are equal to each other. Therefore, in communication or accumulation of the measurement result, in the buffer in FIG. 30, a column in which an invalid flag is ON may be neglected.

When a vehicle leaves from or approaches the camera, the column to be neglected is measured at a speed considerably higher than a correct speed. For this reason, a high-speed column of close columns may be neglected.

In the condition branch 152, control branches to the tracking end determination 142 with respect to a column in which the "tracking state flag" is 1 and the "in-tracking flag" is 0 in the tacking management table in FIG. 28, all the contents of the corresponding column are initialized. The "tracking state flag" and the "in-tracking flag" are set to 0. In this state, the corresponding column can track a new vehicle again.

In the condition branch 153 in FIG. 24, control branches to the lane change detection 143 with respect to a column in which the "tracking state flag" and the "in-tracking flag" in the tracking management table in FIG. 28 are 1. In the lane change detection 143, the "latest existence lane" and lanes between the "vehicle existence lane 1 cycle before" and the "vehicle existence lane q cycles before" in the tracking management table in FIG. 28 are searched to check the presence/absence of a change in lane. If the change in lane is present, the "lane change flag" of the corresponding column is turned on. If the change in lane is absent, the "lane change flag" is turned off. On the basis of the determination result, the corresponding column on the screen is caused to flicker, or the corresponding column is transmitted to the traffic control room 307 or recorded on a recording medium.

In the condition branch 154 in FIG. 24, control branches to the low-speed·stop vehicle detection 144 with respect to a column in which the "tracking state flag" and the "in-tracking flag" in the tracking management table in FIG. 28 are 1. In the low-speed·stop vehicle detection 144, if the "instantaneous valid flag" of the corresponding column in the tracking management table in FIG. 28 is ON, and the "abnormal speed flag" is 1, the corresponding vehicle is determined as a vehicle running at a low speed. If the "abnormal speed flag" is 2, the vehicle is determined as a vehicle which is stopped. On the basis of the determination result, the corresponding column on the screen flickers to inform the user, or the corresponding column is transmitted to the traffic control room 307 or recorded on a recording medium.

In the condition branch 155 in FIG. 24, control branches to the avoidance-running vehicle detection 145 with respect to a column in which the "tracking state flag" and the "in-tracking flag" in the tracking management table in FIG. 28 are 1. In particular, on a highway, when a change in lane is performed in low-speed running, it can be considered that the vehicle avoids any hinderance. Therefore, in the avoidance-running vehicle detection 145, if the "instantaneous speed valid flag" and the "lane change flag" of the corresponding column in the tracking management table in FIG. 28 are ON, and the "abnormal speed flag" is 1, the vehicle is determined as an avoidance-running vehicle. On the basis of the determination result, the corresponding column on the screen is caused to flicker, or the corresponding column is transmitted to the traffic control room 307 or recorded on a recording medium.

In the traffic flow monitor apparatus according to the present invention, as needed, the above traffic indexes can be transmitted to the traffic control room 307 or recorded on a recording medium.

In the condition branch 119 in FIG. 24, a period of time of each cycle is measured, and control branches to the measurement result communication 110 every predetermined time interval. In the measurement result communication 110, the contents of the buffer in FIG. 30, are sequentially transmitted to the traffic control room 307 in order of the oldness of the columns.

In the condition branch 120 in FIG. 24, a period of time of each cycle is measured, and control branches to the measurement result communication 111 every predetermined time interval. In the measurement result accumulation 111, the contents of the buffer in FIG. 30, are sequentially recorded on the recording medium in order of the oldness of the columns.

Figure 33:
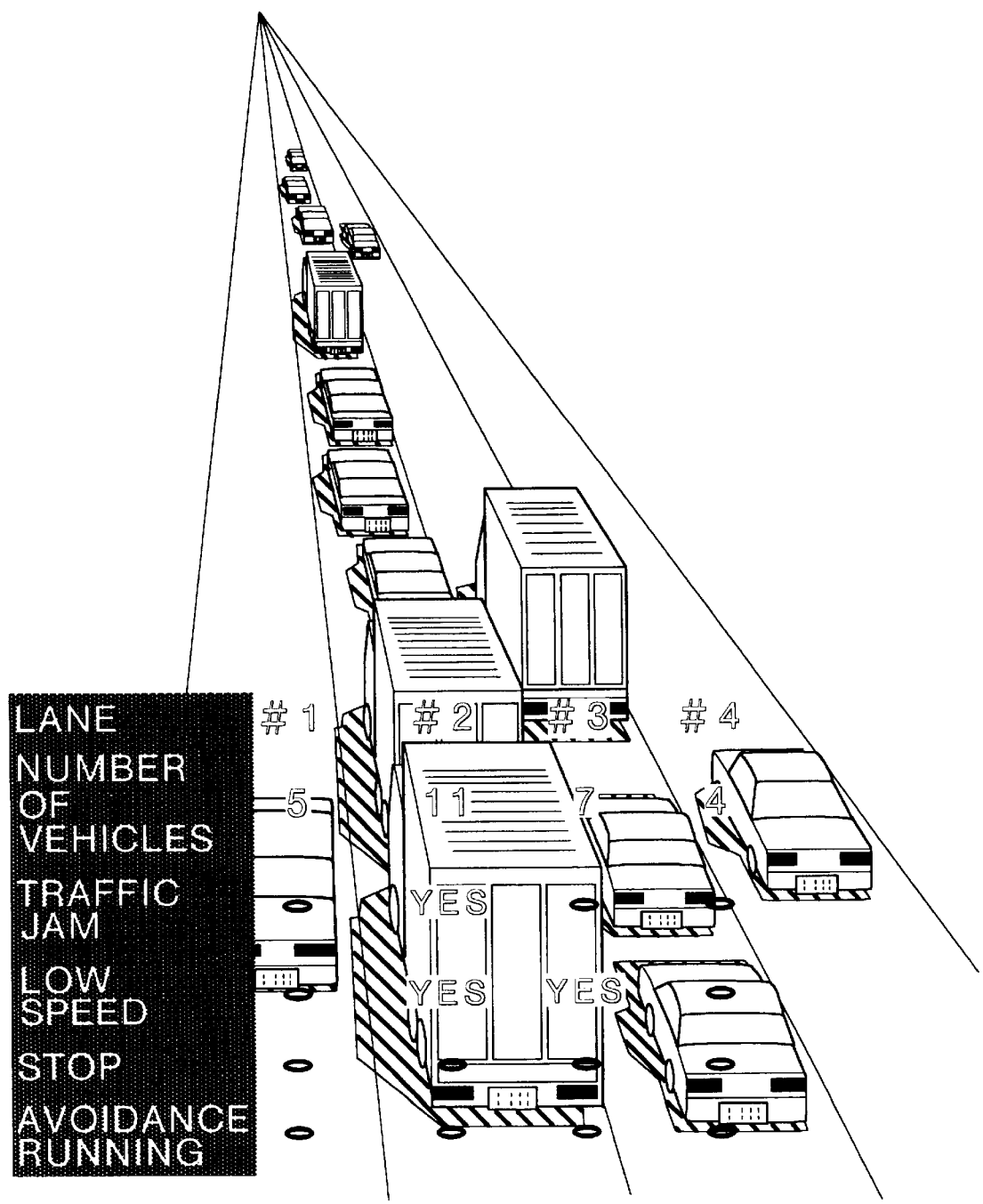
FIG. 33 is a view showing a state in which measurement results overlapping a video are displayed as an example of a display of the display means 306 in FIG. 11.

A video from the TV camera 300 is sent to the traffic control room 307 through an analog circuit or a digital circuit. An observer can see the video from the TV camera 300 by means of the display means 306 of the traffic control room 307. A video sent to the traffic control room 307 may be a live video or a digitally compressed/expanded video. When a video is displayed on the display means 306, traffic indexes sent from the traffic flow monitor apparatus 301 can be simultaneously displayed together with each other through the traffic event communication means 304. The traffic indexes include the number of passing vehicles for a predetermined period of time, a passing speed, the presence/absence of traffic jam in each of the small areas, a vehicle which performs a change in lane, the presence/absence of a low-speed·stop vehicle, the presence/absence of an avoidance-running vehicle, and the like. FIG. 33 is a view showing an example of an overlapping display. This display shows the number of passing vehicles in each lane for one minute, the occurrence/elimination of traffic jam, the presence/absence of a low-speed vehicle, the presence/absence of a stop vehicle, and the presence/absence of an avoidance-running vehicle.

According to Embodiment 1 of the present invention, a characteristic portion such as the front or end portion of a vehicle is captured, and tracking is performed by pattern matching. For this reason, a reference image of a road portion in which no vehicle exist is not required, and influence of approaching or overlapping of another vehicle can be reduced. Therefore, a vehicle can be tracked at a high speed regardless of deserted traffic or crowded traffic, and a traffic flow can be monitored at high precision. In template updating, a template size is enlarged or reduced by using an interval between lane division lines. For this reason, vehicles can be stably tracked by using a template having an appropriate size in the range from the near position to the distant position.

According to Embodiment 2 of the present invention, the characteristic portion of a vehicle or a vehicle group is tracked by pattern matching to measure an instantaneous speed, and a speed field can be calculated for each small area. For this reason, detection of traffic jam which is free from a stop vehicle on a highway can be performed. In the traffic flow monitor system according to the present invention, measured speed fields are multiplied by a median filter, and an averaging process is performed for past one minute or several minutes. For this reason, the speed field and traffic jam can be stably determined. In addition, in the averaging process for speed fields, when the speed fields are weighted depending on the newness of the measured speed fields, response to a traffic state change such as occurrence or elimination of traffic jam is high.

According to Embodiment 3, when it is detected on the basis of the position and speed relationships between templates that the same vehicle is tracked by a plurality of templates, one template related to the corresponding vehicle is made valid, and the other templates are made invalid. For this reason, overlapping measurement can be prevented.

What is claimed is:

1. A traffic flow monitor apparatus comprising:

image-pickup means for photographing a road in an overlooking manner;

means for analyzing a luminance distribution of an image analysis area crossing a road of overlooked road images received every predetermined cycle;

means for performing template registration to a luminance pattern of a part or whole of a vehicle in the image analysis area as a characteristic portion of the vehicle;

tracking means for calculating the degree of similarity between the template and the luminance pattern of the overlooked road image by correlation calculation to track a luminance pattern having a high degree of similarity as a vehicle which is subjected to template registration; and monitor means for monitoring zigzag running, a sudden change in speed, excessively low-speed running and excessively high-speed running, and on the basis of a change in vehicle position in the overlooked road images received every predetermined cycle.

2. A traffic flow monitor apparatus according to claim 1, comprising means for calculating, on the basis of a movement distance of a vehicle moving between two images having a time difference not shorter than a predetermined period of time of the overlooked road images received every predetermined cycle, an instantaneous speed of the vehicle;

wherein said monitor means is monitor means for monitoring a suddenly change in speed, excessively low-speed running, and excessively high-speed running, on the basis of the instantaneous speed.

3. A traffic flow monitor apparatus according to claim 1 wherein said means for performing template registration to the characteristic portion of the vehicle has a plurality of templates corresponding to the number of vehicles to be monitored; and said tracking means is tracking means for s imultaneously tracking a plurality of vehicles which differently move by using the plurality of templates.

4. A traffic flow monitor apparatus according to claim 3, wherein said tracking means has a tracking management table for each template, independently registers templates in columns of each tracking management table, independently adds or erases information to independently track different movements of the respective vehicles.

5. A traffic flow monitor apparatus according to claim 1, comprising:

means for holding a lane division line as a primary approximate expression or a polynomial approximate expression, means for calculating a lane to which the vehicle belongs by using a vehicle position in the overlooked road image received every predetermined cycle and the primary approximate expression or the polynomial approximate expression, and means for determining a change in lane by the change of the belonging lane.

6. A traffic flow monitor apparatus according to claim 1, comprising:

means for calculating a lane width on a screen at a position where a template is subjected to initial registration by using the primary approximate expression or the polynomial approximate expression to define the lane width as a reference lane width, calculating a lane width on a screen at a position after the template has moved by using the primary approximate expression or the polynomial approximate expression to define the lane width as a detection position lane width, and enlarging or reducing the size of the template in the initial registration such that a ratio of the detection position lane width to the reference lane width is equal to a ratio of the size of the template in initial registration to the size of the template after the template has moved, thereby determining the size of the template after the template has moved.

7. A traffic flow monitor apparatus according to claim 1, comprising:

means for forming a measurement zone crossing the road of the overlooked road images received every predetermined cycle, counting vehicles passing through the measurement zone for each lane, and measuring an average speed of each vehicle passing through the measurement zone.

8. A traffic flow monitor apparatus according to claim 1, comprising:

means for arranging at least one road surface luminance pattern collation area for each lane on a road surface of the overlooked road images received every predetermined cycle, evaluating the degree of similarity between the road surface luminance pattern of the collation area which is held as a template in advance and an actual luminance pattern on the basis of correlation calculation between the road surface luminance pattern and the actual luminance pattern, determining that no vehicle exist in the collation area when the degree of similarity is high, and determining that a vehicle exists in the collation area when the degree of similarity is low.

9. A traffic flow monitor apparatus according to claim 8, comprising:

means for measuring the length of the vehicle on the basis of relative positions of the collation area and the front and rear portions of the vehicle when the vehicle passes through the collation area.

10. A traffic flow monitor apparatus comprising a keyboard, a man-machine interface such as a display unit, a CPU having a main memory, image input means which receives an overlooked road image from image-pickup means under the control of said CPU to convert the image into a digital value, image processing means for processing the converted digital image under the control of said CPU, and an image memory for the digital image, wherein said image processing means is means for analyzing a luminance distribution in an image analysis area crossing a road of overlooked road images received every predetermined cycle, and said CPU serves as means for performing template registration to a luminance pattern of a part or whole of a vehicle in the image analysis area as a characteristic portion of the vehicle; tracking means for recognizing at least initial registration coordinates, initial registration time, latest image input time, a vehicle existence position in the latest image, a lane number in the vehicle in the latest image exists, time at which images are input in a plurality of cycles, a position of a vehicle pattern in the image input in the plurality of cycles for each vehicle and calculating the degree of similarity between the template and the luminance pattern of the overlooked road image by correlation calculation to track a luminance pattern having a high degree of similarity as a vehicle which is subjected to template registration; and monitor means for monitoring abnormal running such as zigzag running, a suddenly change in speed, excessively low-speed running, or excessively high-speed running, on the basis of a change in vehicle position in the overlooked road images received every predetermined cycle, recording time and position of occurrence of abnormal running and contents of the abnormal running, and informing of the time, position, and contents of the abnormal running.

11. A traffic flow monitor system in which a traffic flow monitor apparatus according to claim 1 receives the overlooked road image through a video distributor to process the image, stores a traffic event or a traffic index such as an instantaneous speed or change in lane in a traffic event accumulation means, transmits the traffic event or the traffic index to a control room through traffic event communication means, and, on the control room side, video overlapping means overlaps the traffic event obtained through said traffic event communication means and an overlooked road image obtained through said video distributor to display the resultant image on display means, wherein said traffic flow monitor apparatus monitors an instantaneous speed and a change in existence lane for each vehicle and transmits data such as detection time, detection position, and contents of a change in lane according to avoidance running or zigzag running of the vehicle and excessively low-speed or high-speed running of the vehicle to said control room to accumulate the data in a storage unit in said control room.

12. A traffic flow monitor system according to claim 11, wherein said image-pickup means is a color TV camera;

said traffic flow monitor apparatus receives the overlooked road image as a monochrome image; and said display means in said control room is means for overlap-displaying a color image from said image-pickup means and monochrome monitor data generated by said traffic flow monitor apparatus on the basis of the monochrome image.

13. A traffic flow monitor apparatus comprising:

means for digitally processing a road image received every predetermined cycle to track passing vehicles;

means for measuring an instantaneous speed of the passing vehicles;

means for dividing the road image into small areas by lanes and distances and calculating a small-area speed representing average speeds of the passing vehicles for each small area; and means for determining the presence/absence of traffic jam and/or the degree of traffic jam for each small area on the basis of the magnitude of the small-area speed.

14. A traffic flow monitor apparatus according to claim 13, wherein said passing vehicle tracking means is means for tracking a characteristic portion such as a portion having a large change in luminance of the passing vehicle by shading pattern matching.

15. A traffic flow monitor apparatus according to claim 13, wherein said passing vehicle tracking means is means, having a plurality of templates, for simultaneously tracking a plurality of vehicles which differently move by using the plurality of templates.

16. A traffic flow monitor apparatus according to claim 13, wherein said instantaneous speed measurement means is means for calculating an instantaneous speed of the vehicle on the basis of the vehicle moves between two images, having time different not longer than a predetermined period of time, of the road images received every predetermined cycles.

17. A traffic flow monitor apparatus according to claim 13, wherein said small-area speed calculation means is means for holding a line division line as a primary approximate expression or a polynomial approximate expression, applying the primary approximate expression or the polynomial approximate expression to a vehicle position in the road images received every predetermined cycles, and calculating a lane to which the vehicle belongs.

18. A traffic flow monitor apparatus according to claim 13, wherein tracking management tables are arranged for templates, the templates are independently registered on columns of the tracking management tables, information is added or erased from each column, and different movements of respective vehicles are independently monitored.

19. A traffic flow monitor apparatus according to claim 18, wherein said passing vehicle tracking means is means for calculating a lane width on a screen at a position where a template is subjected to initial registration by using the primary approximate expression or the polynomial approximate expression to define the lane width as a reference lane width, calculating a lane width on a screen at a position after the template has moved by using the primary approximate expression or the polynomial approximate expression to define the lane width as a detection position lane width, enlarging or reducing the size of the template in the initial registration such that a ratio of the detection position lane width to the reference lane width is equal to a ratio of the size of the template in initial registration to the size of the template after the template has moved, thereby determining the size of the template after the template has moved.

20. A traffic flow monitor apparatus according to claim 13, wherein said traffic jam determination means is means for calculating an average value of instantaneous speeds of all vehicles existing in the small area within a predetermined period of time to define the average value as a small-area speed, and determining the presence/absence of traffic jam or the degree of traffic jam for each small area on the basis of the magnitude of the small-area speed.

21. A traffic flow monitor apparatus according to claim 13, wherein said traffic jam determination means is means for performing a smoothing process to the instantaneous speeds of vehicles existing in the small area within the predetermined period of time by using a filter, calculating an average value to define the average value as a small-area speed, and determining the presence/absence of traffic jam or the degree of traffic jam for each small area on the basis of the magnitude of the small-area speed.

22. A traffic flow monitor apparatus according to claim 20, wherein said traffic jam determination means is means for calculating a weighting average value for giving a weight which is proportional to the newness of measurement time to the instantaneous speed to define the average value as a small-area speed, and determining the presence/absence of traffic jam or the degree of traffic jam for each small area on the basis of the magnitude of the small-area speed.

23. A traffic flow monitor apparatus according to claim 13, wherein said traffic jam determination means is means for, when areas which are determined as traffic jam areas with respect to lanes are adjacent to each other, measuring the length of the connected traffic jam areas to define the length as the length of traffic jam.

24. A traffic flow monitor apparatus comprising a keyboard, a man-machine interface such as a display unit, a CPU having a main memory, image input means which receives an overlooked road image from image-pickup means under the control of said CPU to convert the image into a digital value, image processing means for processing the converted digital image under the control of said CPU, and an image memory for the digital image, wherein said image processing means is means for arranging at least one image analysis area crossing a road of the road image received every predetermined cycle, and analyzing a luminance distribution in the image analysis area, and said CPU serves as means for performing template registration to a luminance pattern of a front portion or a rear portion of a vehicle in the image analysis area or a luminance pattern of a part or whole of the vehicle in the image analysis area as a characteristic portion of the vehicle; passing vehicle tracking means for searching the vehicle pattern from an image received in a next cycle by a pattern matching process by using the template, updating the vehicle pattern as a new template, and recognizing at least initial registration coordinates, initial registration time, latest image input time, a vehicle existence position in the latest image, a lane number in which the vehicle in the latest image exists, time at which images are input in a plurality of cycles, a position of a vehicle pattern in the image input in the plurality of cycles for each vehicle; instantaneous speed measurement means for calculating an instantaneous speed of each vehicle; and means for arranging small areas divided by lanes and distances from a camera in the road, smoothing instantaneous speeds of vehicles existing in the small areas within a predetermined period of time by using a filter, calculating a weighted means value of loads which are proportional to the newness of the instantaneous speeds according to measurement time of the instantaneous speeds as small-area speeds of the small areas, and determining the presence/absence of traffic jam in each small area on the basis of the magnitude of the small-area speeds.

25. A traffic flow monitor apparatus according to claim 24, wherein said display unit is means for displaying the arrangement of the small areas to overlap the arrangement and the road image and a schematic view, and changing a small area portion determined as a small area portion having traffic jam in luminance or color to display a traffic jam length or a traffic jam end.

26. A traffic flow monitor apparatus comprising:

template registration means for holding a luminance pattern of a front portion or a rear portion of a vehicle existing in road images received by image-pickup means every predetermined cycle as a template of the vehicle;

tracking means for performing a pattern matching process to the template and the luminance pattern to track the vehicle;

instantaneous speed measurement means for measuring an instantaneous speed of the vehicle on the basis of a reception interval between the road images and a movement distance of the vehicle between the road images; and overlapping measurement correction means for, when at least two vehicles pass, calculating a passing time difference and a speed difference between the two vehicles, determining that different portions of one vehicle are tracked by a plurality of templates when the passing time difference is not larger than a predetermined time difference and when the speed difference is not smaller than a predetermined speed difference, and making only one template related to the vehicle valid and the other templates invalid.

27. A traffic flow monitor apparatus according to claim 26, wherein said overlapping measurement correction means is means for making, of the plurality of templates, only a template in which the instantaneous speed is the lowest speed valid, and the other templates invalid.

28. A traffic flow monitor apparatus according to claim 26, wherein the predetermined time difference and the predetermined speed difference are proportional to the instantaneous speed.

29. A traffic flow monitor apparatus according to claim 26, comprising:

means for arranging a belt-like measurement zone crossing a road of the overlooked road image and counting vehicles for each lane to which the vehicle in tracking belongs when the vehicle passes through the measurement zone;

means for measuring a zone speed of the vehicle on the basis of a difference between time at which the vehicle flows into the measurement zone and time at which the vehicle flows our of the measurement zone;

a buffer for recording flow-out times and zone speeds of the vehicle in order of flowing of the vehicle into a lane in which the vehicle flows out of the measurement zone;

means for recording, in said buffer, the flow-out time and zone speed of the vehicle, and a difference between flow-in time of a vehicle which is previously recorded by one in the same lane as that of the above vehicle and flow-out time of the vehicle as a "time difference"; and means for recording, in said buffer, a difference between the zone speed of the vehicle and a zone speed of a vehicle which is previously recorded by one in the same lane as that of the above vehicle as a "speed difference".

30. A traffic flow monitor apparatus according to claim 29, wherein the flow-out time and zone speed of the vehicle, a time difference, a speed difference, and a 1-bit invalid flag are stored in said buffer; and the invalid flag is turned on when the time difference is small and the speed difference is large, and the invalid flag is turned off except when the time difference is small and the speed difference is large.

31. A traffic flow monitor apparatus according to claim 29, comprising:

means for erasing vehicle information recorded on said buffer in order of oldness, counting passing vehicles, recording the number of passing vehicles and the zone speed on a recording unit, and/or transmitting the number of passing vehicles and the zone speed to a control room.

32. A traffic flow monitor apparatus according to claim 29, comprising:

means for, of vehicles having the small time difference and the large speed difference, making only a vehicle having the lowest zone speed valid, and making the other vehicles invalid to except the other vehicles from measurement targets.

33. A traffic flow monitor apparatus according to claim 30, comprising:

means for calculating passing vehicles leaving from a near position on the overlooked road image except for a vehicle preceding a vehicle having the invalid flag which is ON in said buffer, recording the number of passing vehicles and the zone speed on said recording unit, and/or transmitting the number of passing vehicles and the zone speed to said control room.

34. A traffic flow monitor apparatus according to claim 30, comprising:

means for calculating passing vehicles approaching a near position on the overlooked road image except for a vehicle having the invalid flag which is ON in said buffer, recording the number of passing vehicles and the zone speed on said recording unit, and/or transmitting the number of passing vehicles and the zone speed to said control room.

35. A traffic flow monitor apparatus according to claim 26, comprising:

means for recording a lane number to which the vehicle belongs during the vehicle tracking on the tracking management table;

means for comparing a past belonging lane number and a present belonging lane number with each other;

means for determining that a change in lane is made when the lane numbers are different from each other;

means for determining a low-speed running vehicle when the instantaneous speed obtained by said instantaneous speed measurement means is not higher than a predetermined speed; and means for determining an avoidance-running vehicle when a low-speed running vehicle makes a change in line.

* * * * *

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| Abstract | 9 | Change "(enlarge)" to --(enlarged)--. |
| 1 | 14 | Change "as" to --such as a--. |
| 2 | 3 | After "Therefore" change "an" to --the--. |
| 2 | 5 | Change "thereby preventing" to --prevents--. |
| 2 | 30 | Change "as" to --such as a--. |
| 2 | 45 | Change "suddenly" to --sudden--; change "excessively" to --excessive--. |
| 2 | 46 | Change "excessively" to --excessive--. |
| 2 | 57 | Change "suddenly" to --sudden--; change "excessively" to --excessive--. |
| 2 | 58 | Change "excessively" to --excessive--. |

UNITED STATES PATENT AND TRADEMARK OFFICE
CERTIFICATE OF CORRECTION

PATENT NO. : 5,999,877

DATED : 7 December 1999

INVENTOR(S) : Kazuya TAKAHASHI et al.

It is certified that error appears in the above-identified patent and that said Letters Patent is hereby corrected as shown below:

| Column | Line | |
|---|---|---|
| 2 | 62 | Change "inumber" to --number--. |
| 3 | 44 | Change "vehicle" to --vehicles--. |
| 4 | 4 | Change "in the vehicle" to --for the vehicle--. |
| 4 | 5 | Delete "exists". |
| 4 | 12 | Change "suddenly" to --sudden--. |
| 4 | 13 | Change "excessively" (both occurrences) to --excessive--. |
| 5 | 17 | Change "an" to --the--. |
| 5 | 27 | Change "shading" to --shaded--. |
| 5 | 31 | Change "differently move" to --move differently--. |
| 5 | 44 | Change "cycles" to --cycle--. |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 5 | 50 | Change "monitor" to --monitors--. |
| 5 | 51 | Delete "independently monitored". |
| 6 | 47 | Change "searching" to --analyzing--. |
| 7 | 47 | Change "speed valid" to --valid speed--. |
| 7 | 59 | Change "our" to --out--. |
| 8 | 22 | Change "except" to --exclude--; change "from" to --as--. |
| 8 | 49 | Change "line" to --lane--. |
| 8 | 57 | Change "suddenly" to --sudden--; change "excessively" to --excessive--. |
| 8 | 58 | Change "excessively" to --excessive--. |
| 8 | 64 | Change "differently move" to --move differently--. |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 9 | 47 | After "value" insert --of--. |
| 11 | 62 | Change "DESCRIPTION DETAILED" to --DETAILED DESCRIPTION--. |
| 17 | 23 | Change "flags" to --flag--. |
| 20 | 30 | Before "vehicles" insert --all--. |
| 23 | 2 | Change "represents" to --represent--. |
| 23 | 63 | After "before" delete "of". |
| 24 | 30 | Change "completely incoincides" to --does not coincide--. |
| 25 | 35 | Delete "by". |
| 26 | 6 | Delete "not". |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 26 | 20 | Delete "will be described below". |
| 26 | 21 | Change "ith" to --with--. |
| 26 | 31 | After "fields" insert --as--. |
| 27 | 28 | Change "indicates" to --indicate--. |
| 27 | 33 | Change "trackina" to --tracking--. |
| 27 | 51 | Change "is made" to --is expressed as--. |
| 27 | 63 | After "1509" insert --is determined--. |
| 28 | 9 | After "almost" insert --all--. |
| 28 | 48 | Delete "of the vehicle". |
| 28 | 51 | Delete "of the vehicle". |
| 30 | 18 | After "table" insert --of--. |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 31 | 2 | Change "calculate" to --calculated--. |
| 31 | 13 | Change "flags" to --flag--. |
| 31 | 15 | Change "flags" to --flag--. |
| 31 | 17 | Change "forcibly" to --automatically--. |
| 33 | 2 | After "method" insert --is--. |
| 34 | 40 | Delete "by". |
| 35 | 39 | Change "is" to --are--. |
| 35 | 42 | Change "in order of oldness" to --in the order--. |
| 35 | 47 | Change "order of oldness" to --the order--. |
| 35 | 55 | Change "column" to --columns--. |
| 35 | 57 | Change "column" to --columns--. |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 38 | 3 | Change "neglected" to --ignored--. |
| 38 | 8 | Change "neglected" to --ignored--. |
| 38 | 12 | Change "neglected" to --ignored--. |
| 38 | 16 | Change "neglected" to --ignored--. |
| 38 | 20 | Change "neglected" to --ignored--. |
| 38 | 24 | Change "tacking" to --tracking--. |
| 39 | 19 | Change "order of the oldness" to --chronological order-- |
| 39 | 25 | Change "order of the oldness" to --chronological order-- |
| 39 | 48 | Change "stop" to --stopped--. |
| 39 | 54 | Change "exist" to --exists--. |
| 40 | 2 | Change "stop" to --stopped--. |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 40 | 36 | After "running" insert --,--. |
| 40 | 37 | Delete "and". |
| 40 | 49 | Change "suddenly" to --sudden--; change "excessively" to --excessive--. |
| 40 | 50 | Change "excessively" to --excessive--. |
| 40 | 58 | Change "differently move" to --move differently--. |
| 42 | 11 | After "lane number" change "in" to --for--. |
| 42 | 12 | Delete "exists". |
| 42 | 21 | Change "suddenly" to --sudden--. |
| 42 | 22-23 | Change "excessively" to --excessive-- (both occurrences). |

UNITED STATES PATENT AND TRADEMARK OFFICE
CERTIFICATE OF CORRECTION

PATENT NO. : 5,999,877
DATED : 7 December 1999
INVENTOR(S) : Kazuya TAKAHASHI et al.

It is certified that error appears in the above-identified patent and that said Letters Patent is hereby corrected as shown below:

| Column | Line | |
|---|---|---|
| 43 | 12 | Change "differently move" to --move differently--. |
| 43 | 18 | Change "time different" to --a time difference--. |
| 43 | 20 | Change "cycles" to --cycle--. |
| 43 | 29 | Change "cycles" to --cycle--. |
| 45 | 48 | Change "our" to --out--. |

Signed and Sealed this

Seventeenth Day of April, 2001

Attest:

NICHOLAS P. GODICI

Attesting Officer      Acting Director of the United States Patent and Trademark Office